US012425794B2

(12) United States Patent
Kronlachner

(10) Patent No.: US 12,425,794 B2
(45) Date of Patent: Sep. 23, 2025

(54) SYSTEMS AND METHODS FOR RENDERING SPATIAL AUDIO USING SPATIALIZATION SHADERS

(71) Applicant: SYNG, Inc., Marina del Ray, CA (US)

(72) Inventor: Matthias Kronlachner, Venice, CA (US)

(73) Assignee: SYNG, Inc., Marina del Ray, CA (US)

( * ) Notice: Subject to any disclaimer, the term of this patent is extended or adjusted under 35 U.S.C. 154(b) by 25 days.

(21) Appl. No.: 18/055,796

(22) Filed: Nov. 15, 2022

(65) Prior Publication Data

US 2024/0056758 A1 Feb. 15, 2024

Related U.S. Application Data

(60) Provisional application No. 63/264,089, filed on Nov. 15, 2021.

(51) Int. Cl.
*H04S 7/00* (2006.01)

(52) U.S. Cl.
CPC ................ *H04S 7/303* (2013.01); *H04S 7/40* (2013.01); *H04S 2400/11* (2013.01); *H04S 2400/15* (2013.01)

(58) Field of Classification Search
CPC .... H04S 2400/15; H04S 2400/11; H04S 7/40; H04S 7/302; H04S 7/303; H04R 29/001; H04R 29/002
(Continued)

(56) References Cited

U.S. PATENT DOCUMENTS 5,757,927 A 5/1998 Gerzon et al.
8,107,631 B2 1/2012 Merimaa et al.
(Continued)

FOREIGN PATENT DOCUMENTS

CN 104604257 A 5/2015
CN 113853803 A 12/2021
(Continued)

OTHER PUBLICATIONS

International Search Report and Written Opinion for International Application No. PCT/US2022/079902, Search completed Aug. 30, 2023, Mailed Sep. 29, 2023, 15 Pgs.
(Continued)

*Primary Examiner* — Disler Paul
(74) *Attorney, Agent, or Firm* — KPPB LLP

(57) ABSTRACT

Systems and methods spatial audio rendering using spatialization shaders in accordance with embodiments of the invention are illustrated. One embodiment includes a spatial audio system, including a plurality of loudspeakers, where each loudspeaker includes at least one driver, a processor, and a memory containing a spatial audio rendering application, where the spatial audio rendering application directs the processor to obtain a plurality of audio stems, obtain a position and a rotation of each loudspeaker in the plurality of loudspeakers, obtain a relative location for each audio stem to be rendered, calculate a plurality of tuning parameters for each loudspeaker in the plurality of loudspeakers, provide the plurality of tuning parameters, the position and rotation of each loudspeaker to a spatialization shader, generate a driver feed for each driver in the plurality of loudspeakers using the spatialization shader, and render each audio stem at their respective location using the loudspeakers.

14 Claims, 45 Drawing Sheets

(58) Field of Classification Search
USPC ....................... 381/58–59, 17, 303, 306–307
See application file for complete search history.

(56) References Cited

U.S. PATENT DOCUMENTS

| | | | |
|---|---|---|---|
| 9,942,686 B1 | 4/2018 | Family et al. | |
| 10,425,733 B1 | 9/2019 | Choisel et al. | |
| 10,609,484 B2 | 3/2020 | Family et al. | |
| 11,190,899 B2 | 11/2021 | Stringer et al. | |
| 11,206,504 B2 | 12/2021 | Stringer et al. | |
| 11,399,255 B2 * | 7/2022 | Johnson | H04S 7/305 |
| 11,722,833 B2 | 8/2023 | Stringer et al. | |
| 12,003,927 B2 * | 6/2024 | Revelli | H04R 29/001 |
| 2002/0146134 A1 | 10/2002 | Gierl et al. | |
| 2007/0025559 A1 | 2/2007 | Mihelich et al. | |
| 2007/0160225 A1 | 7/2007 | Seydoux | |
| 2011/0069856 A1 | 3/2011 | Blore et al. | |
| 2011/0081024 A1 | 4/2011 | Soulodre | |
| 2014/0119581 A1 | 5/2014 | Tsingos et al. | |
| 2014/0133683 A1 | 5/2014 | Robinson et al. | |
| 2014/0219455 A1 | 8/2014 | Peters et al. | |
| 2015/0222994 A1 | 8/2015 | Soulodre | |
| 2015/0245157 A1 | 8/2015 | Seefeldt | |
| 2015/0350804 A1 | 12/2015 | Crockett et al. | |
| 2016/0021476 A1 | 1/2016 | Robinson et al. | |
| 2016/0021481 A1 | 1/2016 | Johnson et al. | |
| 2017/0125030 A1 | 5/2017 | Koppens et al. | |
| 2017/0223447 A1 | 8/2017 | Johnson et al. | |
| 2017/0238090 A1 | 8/2017 | Johnson et al. | |
| 2017/0264995 A1 | 9/2017 | Lippitt et al. | |
| 2017/0325043 A1 | 11/2017 | Jot et al. | |
| 2017/0374465 A1 | 12/2017 | Family et al. | |
| 2018/0098171 A1 | 4/2018 | Family et al. | |
| 2018/0098172 A1 | 4/2018 | Family et al. | |
| 2018/0352325 A1 | 12/2018 | Family et al. | |
| 2018/0352331 A1 | 12/2018 | Kriegel et al. | |
| 2018/0352334 A1 | 12/2018 | Family et al. | |
| 2019/0014434 A1 | 1/2019 | Johnson et al. | |
| 2019/0208347 A1 | 7/2019 | Baker et al. | |
| 2019/0222931 A1 | 7/2019 | Kriegel et al. | |
| 2019/0253801 A1 | 8/2019 | Arteaga et al. | |
| 2019/0297424 A1 | 9/2019 | O'brien et al. | |
| 2019/0356985 A1 | 11/2019 | Milne et al. | |
| 2020/0007987 A1 | 1/2020 | Woo et al. | |
| 2020/0367009 A1 | 11/2020 | Family et al. | |
| 2020/0396560 A1 | 12/2020 | Family et al. | |
| 2021/0168552 A1 * | 6/2021 | Walther | H04S 7/303 |
| 2022/0159404 A1 | 5/2022 | Stringer et al. | |
| 2023/0370796 A1 | 11/2023 | Vetter et al. | |
| 2024/0015459 A1 * | 1/2024 | Franco | H04S 7/301 |
| 2024/0107258 A1 | 3/2024 | Stringer et al. | |
| 2024/0129681 A1 * | 4/2024 | Munoz | H04S 7/30 |

FOREIGN PATENT DOCUMENTS

| | | | |
|---|---|---|---|
| EP | 3949438 | A1 | 2/2022 |
| EP | 4434031 | A2 | 9/2024 |
| JP | 2022528138 | A | 6/2022 |
| KR | 10-2021-0148238 | A | 12/2021 |
| WO | 2017118552 | A1 | 7/2017 |
| WO | 2020206177 | A1 | 10/2020 |
| WO | 2021021707 | A1 | 2/2021 |
| WO | 2023087031 | A2 | 5/2023 |
| WO | 2023087031 | A3 | 11/2023 |

OTHER PUBLICATIONS

Extended European Search Report for European Application No. 20783235.3, Search completed Jan. 18, 2023, Mailed Jan. 26, 2023, 9 Pgs.

International Preliminary Report on Patentability for International Application PCT/US2020/026471, issued Sep. 28, 2021, Mailed Oct. 14, 2021, 14 Pgs.

International Search Report and Written Opinion for International Application No. PCT/US2020/026471, Search completed Jun. 26, 2020, Mailed Aug. 19, 2020, 26 Pgs.

"Audiorama 9000 User Manual", Grundig, 2008, 68 pgs.

"Backwards-compatible object audio carriage using Enhance AC-3", European Telecommunications Standards Institute, Technical Specification, (ETSI TS) 103 420, Oct. 2018, 83 pgs.

"Das GRUNDIG Audiorama-Programm", Radiomuseaum.org: Grundig (Radio-Vertrieb, RVF, Radiowerke) Audiorama 7000 HiFi, 1975, 2 pgs.

"Grundig Audiorama 7000", hifi wiki, Retrieved from: https://www.hifi-wiki.de/index.php/Grundig_Audiorama_7000, Printed Feb. 12, 2021, Last edited Mar. 11, 2019, 3 pgs.

"Grundig Audiorama 9000 Spherical Speaker System", DesignisthisBLOG, Jan. 29, 2013, 6 pgs.

"Harmonic Design 2019 Catalogue", Harmonic Design, 2019, 27 pgs.

Arnold, "Ambisonic Audio and Virtual Reality", Mat Arnold Sound Design, Retrieved from: http://matarnoldaudio.com/vr-audio/ambisonic-audio-and-virtual-reality/, Jun. 14, 2018, Accessed: Aug. 16, 2019, 7 pgs.

Arteaga, "Introduction to Ambisonics", Audio 3D—Grau en Enginyeria de Sistemes Audiovisuals, Universitat Pompeu Fabra, Lecture Notes, Jun. 2015, 25 pgs.

Benjamin et al., "Localization in Horizontal-Only Ambisonic Systems", Presented at the 121st Convention, Audio Engineering Society, San Francisco, CA, USA, Oct. 8, 2006, 13 pgs.

Buffoni, "Ambisonics as an Intermediate Spatial Representation (for VR)", Audiokinetic Blog, Retrieved from: https://blog.audiokinetic.com/ambisonics-as-an-intermediate-spatial-representation-for-vr/ on Jul. 16, 2021, 6 pgs.

Cook et al., "N>>2: Multi-speaker Display Systems for Virtual Reality and Spatial Audio Projection", Proceedings of the 5th International Conference on Auditory Display, Nov. 1-4, 1998, 5 pgs.

Fazi, "Sound Field Reproduction", PhD Thesis, University of Southampton, Feb. 2010, 312 pgs, presented in 4 parts.

Gerzon, "General Metatheory of Auditory Localisation", Presented at the 92nd Convention, Audio Engineering Society, Vienna, No. 3306, Mar. 24-27, 1992, 64 pgs.

Gerzon, "Periphony: With-Height Sound Reproduction", Journal of the Audio Engineering Society, vol. 21, No. 1, Feb. 1973, 7 pgs.

Guldenschuh, "Transaural Beamforming", Diploma Thesis, Graz University of Technology, Sep. 2009, 77 pgs.

Habets, "Room Impulse Response Generator", Technische Universiteit Eindhoven, Tech. Rep., Sep. 20, 2010, 21 pgs.

Heller et al., "The Ambisonic Decoder Toolbox: Extensions for Partial-Coverage Loudspeaker Arrays", Linux Audio Conference, May 2014, 9 pgs.

Hollerweger, "An Introduction to Higher Order Ambisonic", Oct. 2008, 13 pgs.

Kolundzija, "Spatial Acoustic Signal Processing", Thesis, Ecole Polytechnique Federale de Lausanne, Jan. 16, 2012, 182 pgs.

Kostadinov et al., "Evaluation of distance based amplitude panning for spatial audio", Proceedings of the IEEE International Conference on Acoustics, Speech, and Signal Processing (ICASSP), 2010, pp. 285-288.

Lossius et al., "DBAP—Distance-Based Amplitude Panning", Proceedings of the International Computer Music Association, Montreal, Canada, Aug. 16-21, 2009, pp. 489-492.

Lossius et al., "DBAP—Distance-Based Amplitude Panning", Revision of the Proceedings of the International Computer Music Conference, Montreal, Canada, Aug. 16-21, 2009 on Apr. 14, 2011, 4 pgs.

Malham et al., "3-D Sound Spatialization using Ambisonic Techniques", Computer Music Journal, vol. 19, No. 4, 1995, pp. 58-70.

Noisternig et al., "3D Binaural Sound Reproduction using a Virtual Ambisonic Approach", VECIMS 2003—International Symposium on Virtual Environments, Human-Computer Interfaces, and Measurement Systems, Lugann, Switzerland, Jul. 27-29, 2003, pp. 174-178.

Pasqual et al., "A Comparative Study of Platonic Solid Loudspeakers as Directivity Controlled Sound Sources", Proceedings of the

(56) References Cited

OTHER PUBLICATIONS

2nd International Symposium on Ambisonics and Spherical Acoustics, Paris, France, May 6-7, 2010, 6 pgs.
Peng et al., "On the optimization of a mixed speaker array in an enclosed space using the virtual-speaker weighting method", Mechanical Systems and Signal Processing, vol. 102, Mar. 1, 2018, pp. 214-229.
Peters et al., "Towards a Spatial Sound Description Interchange Format (SpatDIF)", Canadian Acoustics, vol. 35, No. 3, Sep. 2007, pp. 64-65.
Poletti et al., "Sound-field reproduction systems using fixed-directivity loudspeakers", The Journal of the Acoustical Society of America, vol. 127, No. 6, Jun. 2010, pp. 3590-3601.
Pulkki, "Virtual Sound Source Positioning Using Vector Base Amplitude Panning", Journal of the Audio Engineering Society, vol. 45, No. 6, Jun. 1997, pp. 456-466.
Szoke et al., "Building and Evaluation of a Real Room Impulse Response Dataset", Journal of Selected Topics in Signal Processing, Nov. 2018, 14 pgs.
Trone, "Carbon Fiber Subwoofer Enclosure", Senior Project Paper, California Polytechnic State University, Industrial and Manufacturing Engineering Department, Dec. 2010, 44 pgs.
Yue et al., "3-D Ambisonics Experience for Virtual Reality", Stanford University, 2017, 7 pgs.
Zotter et al., "All-Round Ambisonic Panning and Decoding", Journal of the Audio Engineering Society, vol. 60, No. 13, Oct. 2012, pp. 807-820.
Zotter et al., "The Virtual T-Design Ambisonics-Rig Using VBAP", Proceedings of the 1st EAA—EuroRegio Congress on Sound and Vibration, Ljubljana, Slovenia, Sep. 15-18, 2010, 4 pgs.
International Preliminary Report on Patentability for International Application PCT/US2022/079902, Report issued May 2, 2024, Mailed on May 30, 2024, 7 Pgs.

* cited by examiner

SYSTEMS AND METHODS FOR RENDERING SPATIAL AUDIO USING SPATIALIZATION SHADERS

CROSS-REFERENCE TO RELATED APPLICATIONS

The current application claims the benefit of and priority under 35 U.S.C. § 119(e) to U.S. Provisional Patent Application No. 63/264,089 entitled "Systems and Methods for Rendering Spatial Audio using Spatialization Shaders" filed Nov. 15, 2021. The disclosure of U.S. Provisional Patent Application No. 63/264,089 is hereby incorporated by reference in its entirety for all purposes.

FIELD OF THE INVENTION

The present invention generally relates to spatial audio rendering techniques, namely systems and methods for automatically changing the rendering of spatial audio based on user input.

BACKGROUND

Loudspeakers, colloquially "speakers," are devices that convert an electrical audio input signal or audio signal into a corresponding sound. Speakers are typically housed in an enclosure which may contain multiple speaker drivers. In this case, the enclosure containing multiple individual speaker drivers may itself be referred to as a speaker, and the individual speaker drivers inside can then be referred to as "drivers." Drivers that output high frequency audio are often referred to as "tweeters." Drivers that output mid-range frequency audio can be referred to as "m ids" or "mid-range drivers." Drivers that output low frequency audio can be referred to as "woofers." When describing the frequency of sound, these three bands are commonly referred to as "highs," "mids," and "lows." In some cases, lows are also referred to as "bass."

Audio tracks are often mixed for a particular speaker arrangement. The most basic recordings are meant for reproduction on one speaker, a format which is now called "mono." Mono recordings have a single audio channel. Stereophonic audio, colloquially "stereo," is a method of sound reproduction that creates an illusion of multi-directional audible perspective by having a known, two speaker arrangement coupled with an audio signal recorded and encoded for stereo reproduction. Stereo encodings contain a left channel and right channel, and assume that the ideal listener is at a particular point equidistant from a left speaker and a right speaker. However, stereo provides a limited spatial effect because typically only two front firing speakers are used. Stereo using fewer or greater than two loudspeakers can result in suboptimal rendering due to either down mixing or up mixing artifacts respectively.

Immersive formats now exist that require a much larger number of speakers and associated audio channels to try and correct the limitations of stereo. These higher channel count formats are often referred to as "surround sound." There are many different speaker configurations associated with these formats such as, but not limited to, 5.1, 7.1, 7.1.4, 10.2, 11.1, and 22.2. However, a problem with these formats is that they require a large number of speakers to be configured correctly, and to be placed in prescribed locations. If the speakers are offset from their ideal locations, the audio rendering/reproduction can degrade significantly. In addition, systems that employ a large number of speakers often do not utilize all of the speakers when rendering channel-based surround sound audio encoded for fewer speakers.

Audio recording and reproduction technology has consistently striven for a higher fidelity experience. The ability to reproduce sound as if the listener were in the room with the musicians has been a key promise that the industry has attempted to fulfill. However, to date, the highest fidelity spatially accurate reproductions have come at the cost of large speaker arrays that must be arranged in a particular orientation with respect to the ideal listener location. Systems and methods described herein can ameliorate these problems and provide additional functionality by applying spatial audio reproduction principals to spatial audio rendering.

SUMMARY OF THE INVENTION

Systems and methods spatial audio rendering using spatialization shaders in accordance with embodiments of the invention are illustrated. One embodiment includes a spatial audio system, including a plurality of loudspeakers capable of rendering spatial audio, where each loudspeaker includes at least one driver, a processor, and a memory containing a spatial audio rendering application, where the spatial audio rendering application directs the processor to obtain a plurality of audio stems, obtain a position and a rotation of each loudspeaker in the plurality of loudspeakers, obtain a relative location for each audio stem to be rendered, calculate a plurality of tuning parameters for each loudspeaker in the plurality of loudspeakers, provide the plurality of tuning parameters, the position and rotation of each loudspeaker to a spatialization shader, generate a driver feed for each driver in the plurality of loudspeakers using the spatialization shader, and render each audio stem at their respective location using the plurality of loudspeakers and the tuning parameters.

In another embodiment, the plurality of tuning parameters includes a source focus parameter that defines energy distribution between loudspeakers in the plurality of loudspeakers and directivity behavior for each loudspeaker in the plurality of loudspeakers.

In a further embodiment, the plurality of tuning parameters includes a delay parameter and a gain parameter.

In still another embodiment, to calculate the delay parameter and the gain parameter when the locations of the positions of three given loudspeakers in the plurality of loudspeakers form a scalene triangle, the spatial audio rendering application directs the processor to determine a position $d_{max}$ as the longest distance from a listener position to any of the three given loudspeakers, calculate the delay parameter for each of the three given loudspeakers as distance from the given loudspeaker to the listening position minus $d_{max}$, all divided by the speed of sound in air, and calculate the gain parameter for each of the three given loudspeakers as distance from the given loudspeaker to the listening position divided by $d_{max}$.

In a still further embodiment, the plurality of tuning parameters includes a bass-crossfeed parameter.

In yet another embodiment, the spatial audio rendering application further directs the processor to track a listener position, and move the location of each audio stem to maintain relative position to the tracked listener position.

In a yet further embodiment, the spatial audio rendering application further directs the processor to regularize the loudspeaker positions in a virtual map, calculate a minimum bounding box for the regularized loudspeaker positions in the virtual map, denote the center of the minimum bounding box as a reference position, where the reference position reflects the centroid of a polygon defined by the positions of the loudspeakers, and use the reference position to translate the virtual space of a user interface to the location of the loudspeaker positions.

In another additional embodiment, a method for spatial audio rendering, includes obtaining a plurality of audio stems, obtaining a position and a rotation for each loudspeaker in a plurality of loudspeakers, where each loudspeaker has at least one driver, obtaining a location for each audio stem is to be rendered, calculating a plurality of tuning parameters for each loudspeaker in the plurality of loudspeakers, providing the plurality of tuning parameters, the position and rotation of each loudspeaker to a spatialization shader, generating a driver feed for each driver in the plurality of loudspeakers using the spatialization shader, and rendering each audio stem at their respective location using the plurality of loudspeakers and the tuning parameters.

In a further additional embodiment, the plurality of tuning parameters includes a source focus parameter that defines energy distribution between loudspeakers in the plurality of loudspeakers and directivity behavior for each loudspeaker in the plurality of loudspeakers.

In another embodiment again, the plurality of tuning parameters includes a delay parameter and a gain parameter.

In a further embodiment again, calculating the delay parameter and the gain parameter when the locations of the positions of three given loudspeakers in the plurality of loudspeakers form a scalene triangle includes determining a position $d_{max}$ as the longest distance from a listener position to any of the three given loudspeakers, calculating the delay parameter for each of the three given loudspeakers as distance from the given loudspeaker to the listening position minus $d_{max}$, all divided by the speed of sound in air, and calculating the gain parameter for each of the three given loudspeakers as distance from the given loudspeaker to the listening position divided by $d_{max}$.

In still yet another embodiment, the plurality of tuning parameters includes a bass-crossfeed parameter.

In a still yet further embodiment, the method further includes tracking a listener position, and moving the location of each audio stem to maintain relative position to the tracked listener position.

In still another additional embodiment, the method further includes regularizing the loudspeaker positions in a virtual map, calculating a minimum bounding box for the regularized loudspeaker positions in the virtual map, denoting the center of the minimum bounding box as a reference position, where the reference position reflects the centroid of a polygon defined by the positions of the loudspeakers, and using the reference position to translate the virtual space of a user interface to the location of the loudspeaker positions.

In a still further additional embodiment, a loudspeaker for spatial audio rendering includes at least one driver, a processor, and a memory containing a spatial audio rendering application, where the spatial audio rendering application directs the processor to obtain a plurality of audio stems, obtain a position and a rotation of each loudspeaker in a plurality of secondary loudspeakers communicatively coupled to the loudspeaker, where each secondary loudspeaker includes at least one driver, obtain a location for where each audio stem is to be rendered, calculate a plurality of tuning parameters for each loudspeaker in the plurality of loudspeakers, provide the plurality of tuning parameters, the position and rotation of each loudspeaker to a spatialization shader, generate a driver feed for each driver in the plurality of loudspeakers using the spatialization shader, transmit the driver feed to its respective driver, and render each audio stem at their respective location using the plurality of loudspeakers and the tuning parameters.

In still another embodiment again, the plurality of tuning parameters includes a source focus parameter that defines energy distribution between loudspeakers in the plurality of loudspeakers and directivity behavior for each loudspeaker in the plurality of loudspeakers.

In a still further embodiment again, the plurality of tuning parameters includes a delay parameter and a gain parameter.

In yet another additional embodiment, to calculate the delay parameter and the gain parameter when the locations of the positions of three given loudspeakers in the plurality of secondary loudspeakers form a scalene triangle, the spatial audio rendering application directs the processor to determine a position $d_{max}$ as the longest distance from a listener position to any of the three given loudspeakers, calculate the delay parameter for each of the three given loudspeakers as distance from the given loudspeaker to the listening position minus $d_{max}$, all divided by the speed of sound in air, and calculate the gain parameter for each of the three given loudspeakers as distance from the given loudspeaker to the listening position divided by $d_{max}$.

In a yet further additional embodiment, the spatial audio rendering application further directs the processor to track a listener position, and move the location of each audio stem to maintain relative position to the tracked listener position.

In yet another embodiment again, the spatial audio rendering application further directs the processor to regularize the loudspeaker positions in a virtual map, calculate a minimum bounding box for the regularized loudspeaker positions in the virtual map, denote the center of the minimum bounding box as a reference position, where the reference position reflects the centroid of a polygon defined by the positions of the loudspeakers, and use the reference position to translate the virtual space of a user interface to the location of the loudspeaker positions.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1A:
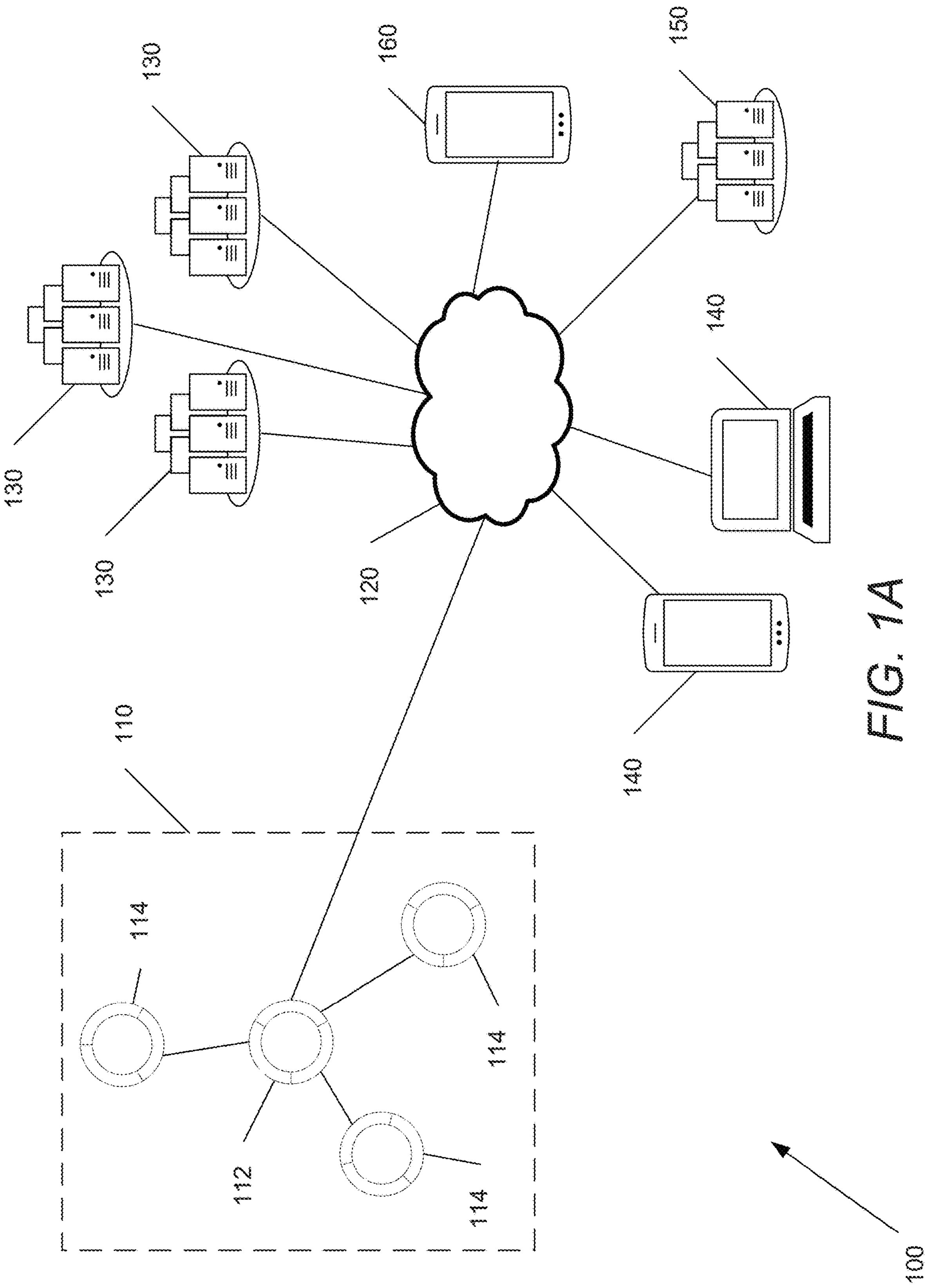
FIG. 1A is an example system diagram fora spatial audio system in accordance with an embodiment of the invention.

Turning now to the drawings, systems and methods for spatial audio rendering are illustrated. Spatial audio systems in accordance with many embodiments of the invention include one or more network connected speakers that can be referred to as "cells". As described herein, cells are capable of producing directional audio in at least a horizontal plane. In several embodiments, the spatial audio system is able to receive an arbitrary audio source as an input and render spatial audio in a manner determined based upon the specific number and placement of cells in a space. In numerous embodiments, a user interface (UI) can be provided which enables a user to intuitively alter the sound field produced by the spatial audio system. For example, in many embodiments, one or more audio objects can be rendered such that sound associated with an object appears to be emanating from the location of the audio object, where the location of the audio object is not the same location as any of the cells. In several embodiments, the manner in which spatial audio is rendered is interactive. In a number of embodiments, the UI includes at least one affordance that enables movement of one or more audio objects throughout a space, e.g. by dragging them across a digital representation of the space. In certain embodiments, movement of one or more audio objects occurs automatically in response to information concerning the location of one or more listeners within the space. In various embodiments, a listener position can be tracked and used to maintain relative positioning of the user and audio objects.

In order to provide a translation between interactions with the UI and audio object placement, systems and methods described herein utilize "spatialization shaders" to parameterize audio objects for location dependent rendering of spatial audio. In numerous embodiments, an "audio source"

is obtained which provides audio signals from a stream or file playback. The audio source can output one or more "stems," where each stem describes one or more audio objects. In several embodiments, each stem can be visualized via the UI to the user as an object in a virtual space, which can be moved by the user. In numerous embodiments, the stem is visualized as a disk or "puck" which can be dragged around a virtual space in order to change the perceived location of the audio objects associated with the given stem.

In many embodiments, when the puck is moved, cells are directed to modify the location and rendering parameters of spatial audio objects that are provided to the audio rendering pipelines of the cells. Based upon the manner in which the locations and rendering parameters are changed, in many embodiments the listener perceives that the location of the spatial audio objects have changed. In some embodiments, the audio experience can be made to be similar irrespective of the location of the user.

In various embodiments, audio objects are channels in an audio mix. Audio objects can correspond, for example, to a left channel, right channel, center channel, left surround channel, right surround channel, etc. depending on the number of channels for a given mix. In various embodiments, audio objects can represent the audio produced by a single instrument in a mix, e.g. a guitar object, a vocalist object, a percussion object, etc. Spatialization shaders can take the stem position and properties and output real-world positions for each associated audio object belonging to the stem. Depending on the audio source and/or user preference, movement of the puck can differentially modify the placement of sound objects. For example, when the audio source is a television, moving the puck may modify listener position relative to the television in order to place the user at a "sweet spot" for the particular surround sound audio mix. In numerous embodiments, stereo content can be made to sound as if it is rendered from an arbitrary location, or alternatively from multiple locations to generate an immersive stereo experience irrespective of location. Spatial audio systems are described in further detail below before a discussion of spatial shaders.

Spatial Audio Systems

Spatial audio systems are systems that utilize arrangements of one or more cells to render spatial audio for a given space. Cells can be placed in any of a variety of arbitrary arrangements in any number of different spaces, including (but not limited to) indoor and outdoor spaces. While some cell arrangements are more advantageous than others, spatial audio systems described herein can function with high fidelity despite imperfect cell placement. In addition, spatial audio systems in accordance with many embodiments of the invention can render spatial audio using a particular cell arrangement despite the fact that the number and/or placement of cells may not correspond with assumptions concerning the number and placement of speakers utilized in the encoding of the original audio source. In many embodiments, cells can map their surroundings and/or determine their relative positions to each other in order to configure their playback to accommodate for imperfect placement. In numerous embodiments, cells can communicate wirelessly, and, in many embodiments, create their own ad hoc wireless networks. In various embodiments, cells can connect to external systems to acquire audio for playback. Connections to external systems can also be used for any number of alternative functions, including, but not limited to, controlling internet of things (IoT) devices, access digital assistants, playback control devices, and/or any other functionality as appropriate to the requirements of specific applications in accordance with various embodiments of the invention.

Figure 1B:
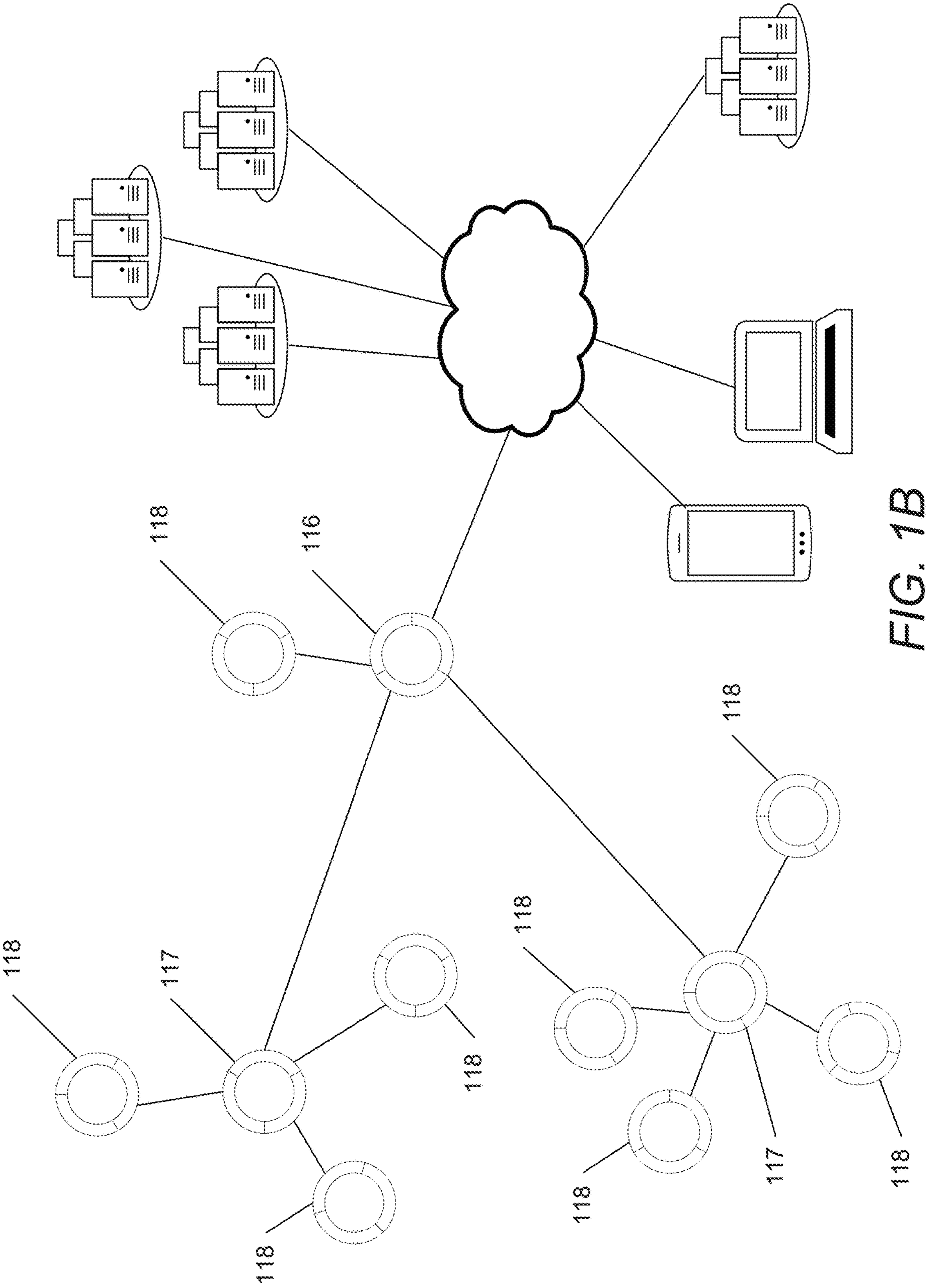
FIG. 1B is an example system diagram for a spatial audio system in accordance with an embodiment of the invention.

An example spatial audio system in accordance with an embodiment of the invention is illustrated in FIG. 1A. Spatial audio system 100 includes a set of cells 110. The set of cells in the illustrated embodiment includes a primary cell 112, and secondary cells 114. However, in many embodiments, the number of "primary" and "secondary" cells is dynamic and depends on the current number of cells added to the system and/or the manner in which the user has configured the spatial audio system. In many embodiments, a primary cell connects to a network 120 to connect to other devices. In numerous embodiments, the network is the internet, and the connection is facilitated via a router. In some embodiments, a cell contains a router and the capability to directly connect to the internet via a wired and/or wireless port. Primary cells can create ad hoc wireless networks to connect to other cells in order to reduce the overall amount of traffic being passed through a router and/or over the network 120. In some embodiments, when a large number of cells are connected to the system, a "super primary" cell can be designated which coordinates operation of a number of primary cells and/or handles the traffic over the network 120. In many embodiments, the super primary cell can disseminate information via its own ad hoc network to various primary cells, which then in turn disseminate relevant information to secondary cells. The network over which a primary cell communicates with a secondary cell can be the same and/or a different ad hoc network as the one established by a super primary cell. An example system utilizing a super primary cell 116 in accordance with an embodiment of the invention is illustrated in FIG. 1B. The super primary cell communicates with primary cells 117 which in turn govern their respective secondary cells 118. Note that super primary cells can govern their own secondary cells. However, in some embodiments, cells may be located too far apart to establish an ad hoc network, but may be able to connect to existing network 120 via alternate means. In this situation, primary cells and/or super primary cells may communicate directly via the network 120. It should be appreciated that a super primary cell can act as a primary cell with respect to a particular subset of cells within a spatial audio system.

Referring again to FIG. 1A, the network 120 can be any form of network, as noted above, including, but not limited to, the internet, a local area network, a wide area network, and/or any other type of network as appropriate to the requirements of specific applications in accordance with various embodiments of the invention. Furthermore, the network can be made of more than one network type utilizing wired connections, wireless connections, or a combination thereof. Similarly, the ad hoc network established by the cells can be any type of wired and/or wireless network, or any combination thereof. Communication between cells can be established using any number of wireless communication methodologies including, but not limited to, wireless local area networking technologies (WLAN), e.g. WiFi, Ethernet, Bluetooth, LTE, 5G NR, and/or any other wireless communication technology as appropriate to the requirements of specific applications in accordance with various embodiments of the invention.

The set of cells can obtain media data from media servers 130 via the network. In numerous embodiments, the media servers are controlled by 3rd parties that provide media streaming services such as, but not limited to: Netflix, Inc. of Los Gatos, California; Spotify Technology S. A. of Stockholm, Sweden; Apple Inc. of Cupertino, California;

Hulu, LLC of Los Angeles, California; and/or any other media streaming service provider as appropriate to the requirements of specific applications in accordance with various embodiments of the invention. In numerous embodiments, cells can obtain media data from local media devices 140, including, but not limited to, cellphones, televisions, computers, tablets, network attached storage (NAS) devices and/or any other device capable of media output. Media can be obtained from media devices via the network, or, in numerous embodiments, be directly obtained by a cell via a direct connection. The direct connection can be a wired connection through an input/output (I/O) interface, and/or wirelessly using any of a number of wireless communication technologies.

The illustrated spatial audio system 100 can also (but does not necessarily need to) include a cell control server 150. In many embodiments, connections between media servers of various music services and cells within a spatial audio system are handled by individual cells. In several embodiments, cell control servers can assist with establishing connections between cells and media servers. For example, cell control servers may assist with authentication of user accounts with various 3rd party services providers. In a variety of embodiments, cells can offload processing of certain data to the cell control server. For example, mapping a room based on acoustic ranging may be sped up by providing the data to a cell control server which can in turn provide back to the cells a map of the room and/or other acoustic model information including (but not limited to) a virtual speaker layout. In numerous embodiments, cell control servers are used to remotely control cells, such as, but not limited to, directing cells to playback a particular piece of media content, changing volume, changing which cells are currently being utilized to playback a particular piece of media content, and/or changing the location of spatial audio objects in the area. However, cell control servers can perform any number of different control tasks that modify cell operation as appropriate to the requirements of specific applications in accordance with various embodiments of the invention. The manner in which different types of user interfaces can be provided for spatial audio systems in accordance with various embodiments of the invention are discussed further below.

In many embodiments, the spatial audio system 100 further includes a cell control device 160. Cell control devices can be any device capable of directly or indirectly controlling cells, including, but not limited to, cellphones, televisions, computers, tablets, and/or any other computing device as appropriate to the requirements of specific applications in accordance with various embodiments of the invention. In numerous embodiments, cell control devices can send commands to a cell control server which in turn sends the commands to the cells. For example, a mobile phone can communicate with a cell control server by connecting to the internet via a cellular network. The cell control server can authenticate a software application executing on the mobile phone. In addition, the cell control server can establish a secure connection to a set of cells which it can pass instructions to from the mobile phone. In this way, secure remote control of cells is possible. However, in numerous embodiments, the cell control device can directly connect to the cell via either the network, the ad hoc network, or via a direct peer-to-peer connection with a cell in order to provide instructions. In many embodiments, cell control devices can also operate as media devices. However, it is important to note that a control server is not a necessary component of a spatial audio system. In numerous embodiments, cells can manage their own control by directly receiving comments (e.g. through physical input on a cell, or via a networked device) and propagate those commands to other cells. However, many control devices can provide user interfaces such as those described below that utilize pucks.

Figure 1C:
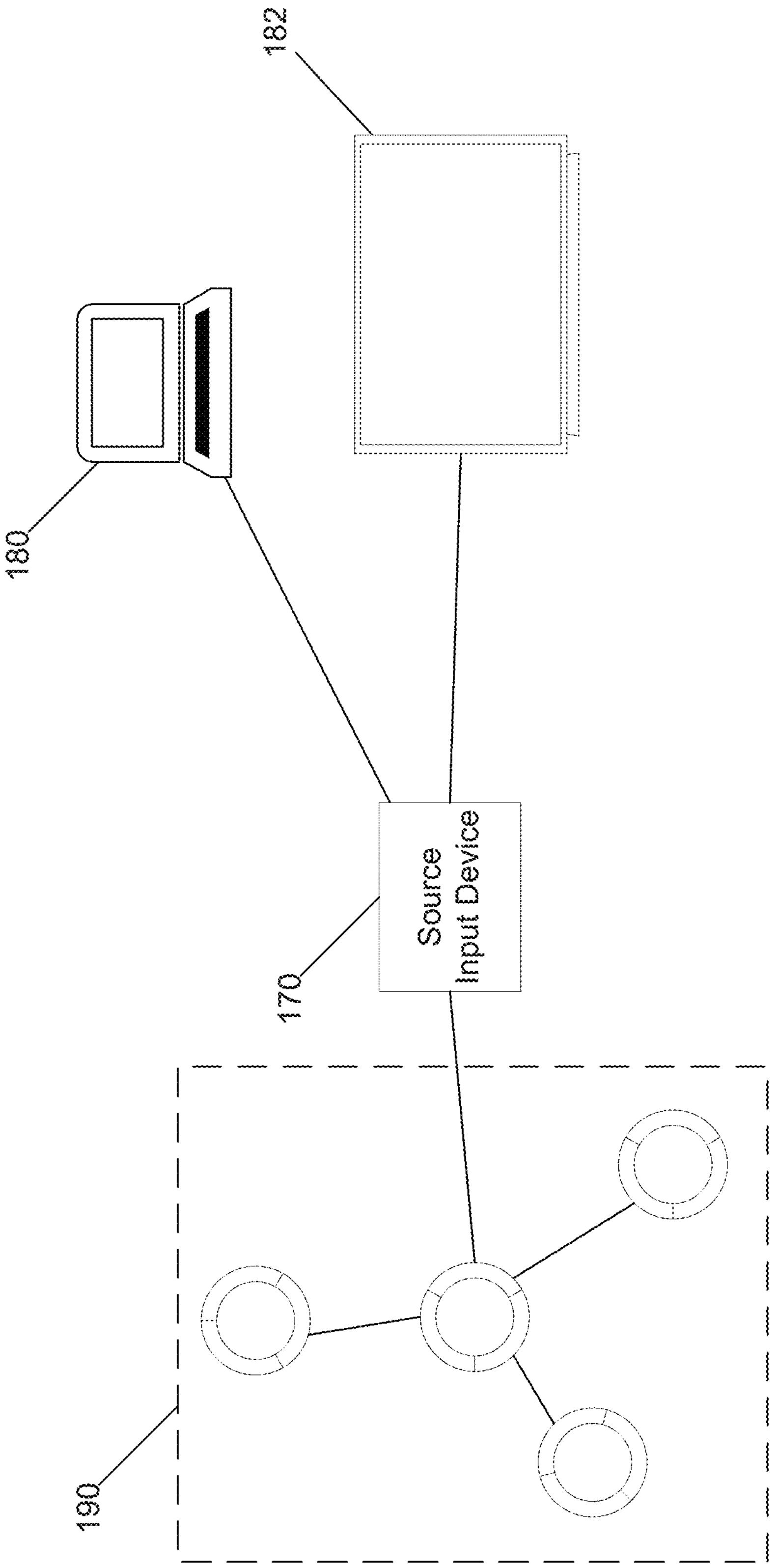
FIG. 1C is an example system diagram for a spatial audio system including a source input device in accordance with an embodiment of the invention.

Further, in numerous embodiments, network connected source input devices can be included in spatial audio systems to collect and coordinate media inputs. For example, a source input device may connect to a television, a computer, a media server, or any number of media devices. In numerous embodiments, source input devices have wired connections to these media devices to reduce lag. A spatial audio system that includes a source input device in accordance with an embodiment of the invention is illustrated in FIG. 1C. The source input device 170 gathers audio data and any other relevant metadata from media devices like a computer 180 and/or a television 182, and unicasts the audio data and relevant metadata to a primary in a cluster of cells 190. However, it is important to note that source input devices can also act as a primary or super primary cell in some configurations. Further, any number of different devices can connect to source input devices, and they are not restricted to communicating with only one cluster of cells. In fact, source input devices can connect to any number of different cells as appropriate to the requirements of specific applications of embodiments of the invention.

While particular spatial audio systems are described above with respect to FIGS. 1A-C, any number of different spatial audio system configurations can be utilized including (but not limited to) configurations without connections to third party media servers, configurations that utilize different types of network communications, configurations in which a spatial audio system only utilizes cells and control devices with a local connection (e.g. not connected to the internet), and/or any other type of configuration as appropriate to the requirements of specific applications in accordance with various embodiments of the invention. As can readily be appreciated, a feature of systems and methods in accordance with various embodiments of the invention is that they are not limited to specific spatial layouts of cells. Accordingly, the specific spatial layouts described below are provided simply to illustrative the flexible manner in which spatial audio systems in accordance with many embodiments of the invention can render a given spatial audio source in a manner appropriate to the specific number and layout of cells that a user has placed within a space. Control of spatial audio systems using spatialization shaders are discussed in further detail below.

Introduction to Spatialization Shaders

Spatialization shaders can be used to generate a set of parameters that define how each cell in a spatial audio system plays back audio to create a desired sound field. In many embodiments, the desired sound field is implicated via a user interface. In numerous embodiments, pre-set sound fields can be used. For example, when playing back audio, a user may want audio to sound like it is emanating from a particular direction and/or location. The user can use a user interface to modify the rendering of the audio source. For example, the user interface can include an affordance that enables the user to indicate a particular direction and/or or location, and a spatialization shader can translate the information from the user interface into a particular set of parameters for each cell.

Figure 2:
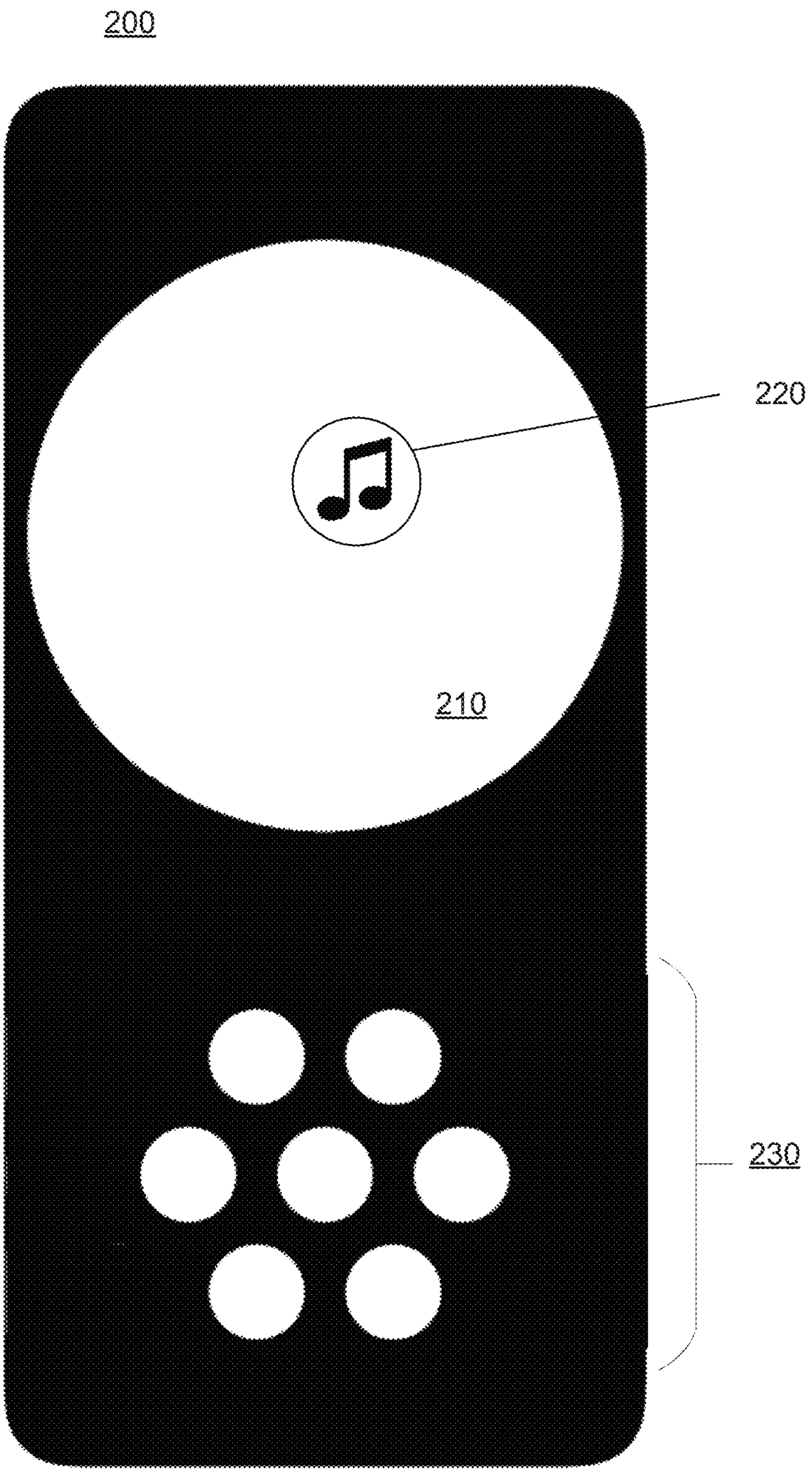
FIG. 2 is an example user interface with a puck in accordance with an embodiment of the invention.

Turning now to FIG. 2, an example user interface in accordance with an embodiment of the invention is illustrated. In the illustrated embodiment, user interface 200 includes a virtual representation of a space 210. In many embodiments, the space 210 is an abstract representation of a real space, i.e. it is not proportionate or indicative of the actual shape of the room in which the cells are located. In numerous embodiments, the shape is representative of an estimated listening area. However, in various embodiments, the virtual representation is rendered to mimic the room in which the cells are located.

A puck 220 user interface affordance is located within the space which has been dragged to a desired position. While the puck 220 is shown in a particular position, as can be readily appreciated the puck can be dragged to any portion of the space, where dragging the puck offsets the sound field. Furthermore, any of a variety of different affordances can be utilized and user interfaces in accordance with various embodiments of the invention should be understood as not limited to puck affordances. In certain embodiments, pucks can be rotated to rotate the sound field. In various embodiments, the puck can be scaled, e.g. made smaller or larger, to change the envelopment and/or spread of the sound field. In numerous embodiments, a number of other pucks 230 are included in the user interface which can be dragged into the space to direct playback of associated content. Modifying tuning parameters in near real-time based on movement of the puck can be achieved using spatialization shaders.

Figure 3:
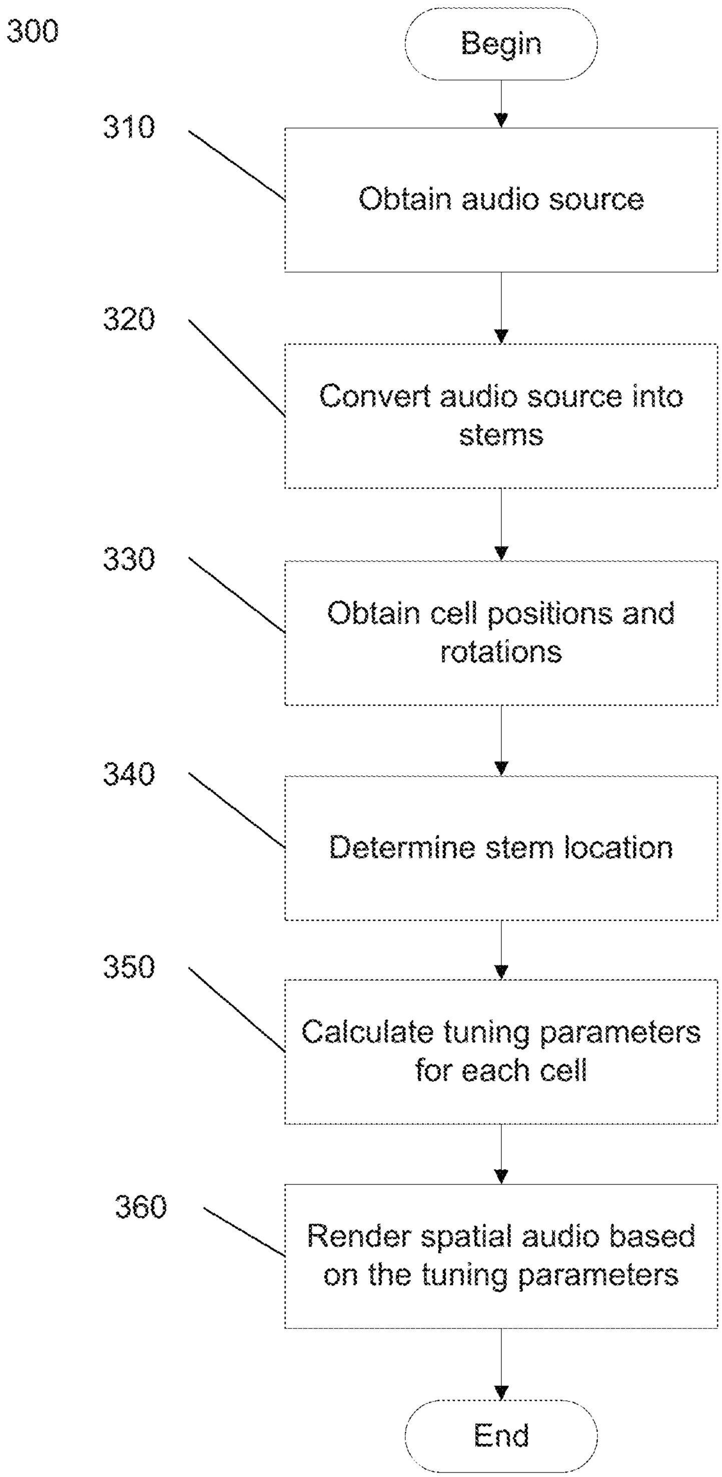
FIG. 3 is a flow chart for rendering spatial audio using tuning parameters in accordance with an embodiment of the invention.

Turning now to FIG. 3, a process utilized by a spatialization shader for generating tuning parameters based on puck position in accordance with an embodiment of the invention is illustrated. Process 300 includes obtaining (310) an audio source. In many embodiments, the audio source is an audio stream generated by playback of an audio file or otherwise obtained via a streaming service. In some embodiments, the audio source is obtained from an HDMI or USB connected device. The audio source is converted (320) into one or more stems. In numerous embodiments, each stem represents one or more channels of audio. In numerous embodiments, a stem represents more channels than the audio source contains, where the channels represented by the stem are the result of upmixing the audio source. For example, in a variety of embodiments, a stereo audio source may be upmixed into 10 channels, although more or fewer than 10 channels are possible.

In a number of embodiments, the number of stems depends on the audio source. For example, an audio source which contains separate channels for each instrument in the mix may be split into a stem representing each different instrument. However, stems can be merged as desired to group certain channels, e.g. guitar and vocal stems can be merged into a single stem. In numerous embodiments, the audio source includes metadata that contains a preferred set of stems. Each stem can be represented by a puck in the user interface.

The locations of cells in the spatial audio system are obtained (330). In numerous embodiments, the locations of cells are defined in a coordinate plane. In many embodiments, cells have multiple directional horns, and therefore the orientation ("rotation") of each cell is associated with each location. The location of any stems is also determined (340). In numerous embodiments, the location of one or more stems are obtained via a user interface. As discussed herein, a puck can be used to determine the location of a stem. In some embodiments, the location of a puck determines the location of the associated stem. In various embodiments, the location of a puck determines the location of a listener at the negated coordinates of the puck, i.e. the location of the puck reflected about the origin.

Based on the location of the stems in the user interface, tuning parameters are generated (350) for each cell. While any number of different tuning parameters can be generated, several of note are the source focus parameter, and the delay and gain parameters, all three of which are discussed at length in subsections below. Other parameters can include (but are not limited to) the coordinates for the position of each audio object associated with the stem, volume, bass-crossfeed, and snapToHorn (if disabled, then allow rotation of the beam continuously; if enabled, allow beams in only directions corresponding to the number of horns). Audio is rendered (360) by each cell in accordance with their specific tuning parameters to generate the desired sound field. In numerous embodiments, volume, source focus, and position of the audio objects are calculated and utilized by spatialization shaders. In some embodiments, bass-crossfeed parameters are used as well. However, as can be readily appreciated, any subset of parameters (or one that includes additional parameters) can be used depending on the scenario as appropriate to the requirements of specific applications of embodiments of the invention.

Figure 4:
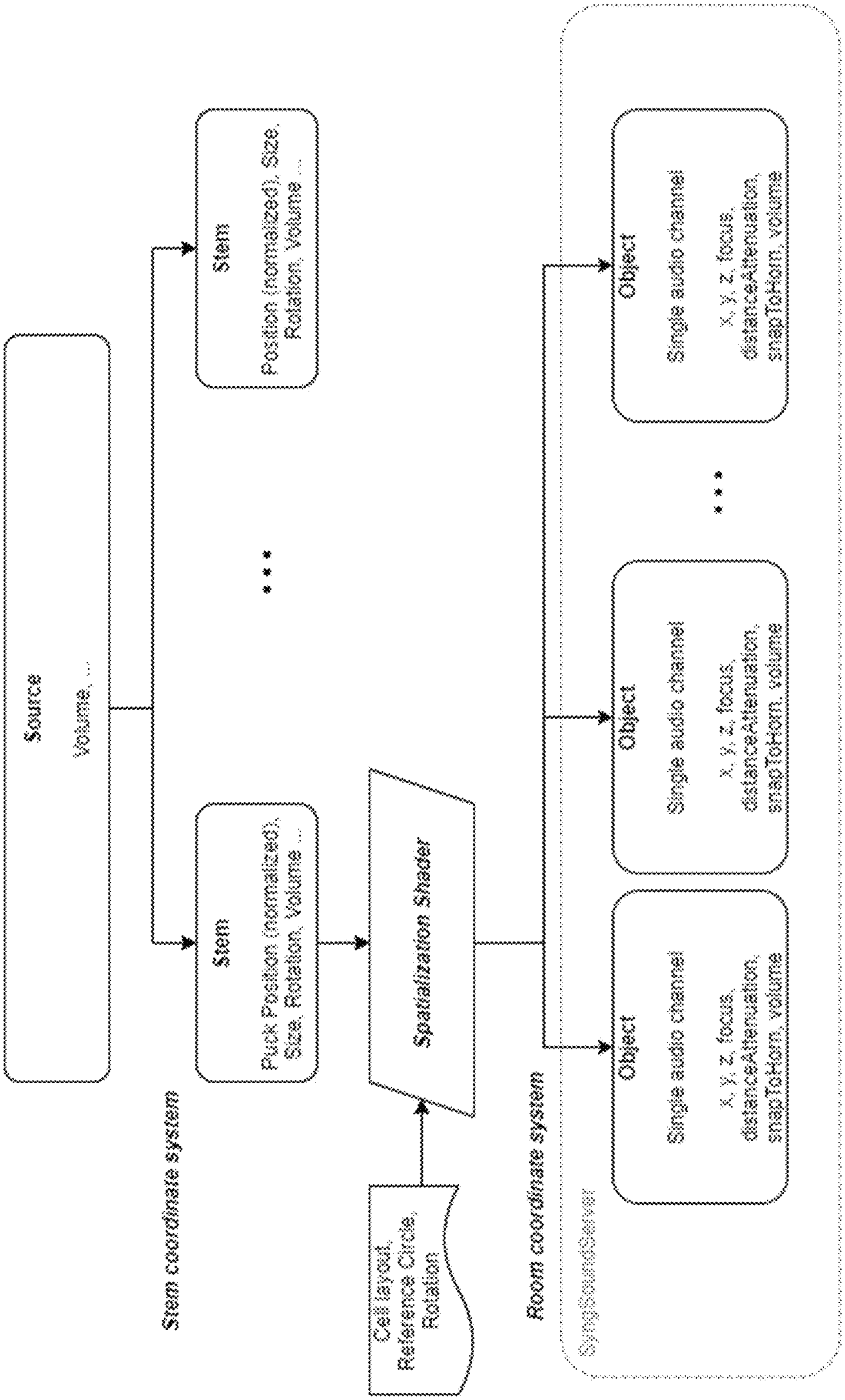
FIG. 4 graphically illustrates a spatialization shader process in accordance with an embodiment of the invention.

While a specific process is illustrated with respect to FIG. 3, any number of different processes that use tuning parameters derived from pucks can be used as appropriate to the requirements of specific applications of embodiments of the invention. For example, a process for using spatialization shaders to playback spatial audio in accordance with an embodiment of the invention is illustrated in FIG. 4. Processes for mapping the virtual space of the UI where pucks reside to real-world cell layouts are discussed below.

Determining Reference Position

In many scenarios, cells are arranged in regular shapes, e.g. 3 cells in an equilateral triangle, 4 cells in a square, etc. However, individual users have the freedom to place cells in arbitrary locations within their homes. While some cell placements may be superior to others, some degree of flexibility is tolerable. In many embodiments, cells can automatically determine their relative locations to each other and construct a coordinate system which includes the relative rotation and location of cells. Once the coordinate is constructed, it can be used to map the UI space to the real-world. In many embodiments, the UI presents a uniform virtual space which has an obvious center, e.g. the center point of a circle. However, the real-world placement may not have such an obvious center. Further, the centroid of the polygon formed by the cell placement may not be the most useful position to consider as the center point of the virtual space. For example outlier cells which fall far away from the rest of the cells can drag the centroid to a position that would result in suboptimal playback. To address this, cell positions can be regularized due to each cell's ability to produce directional audio.

Figure 5:
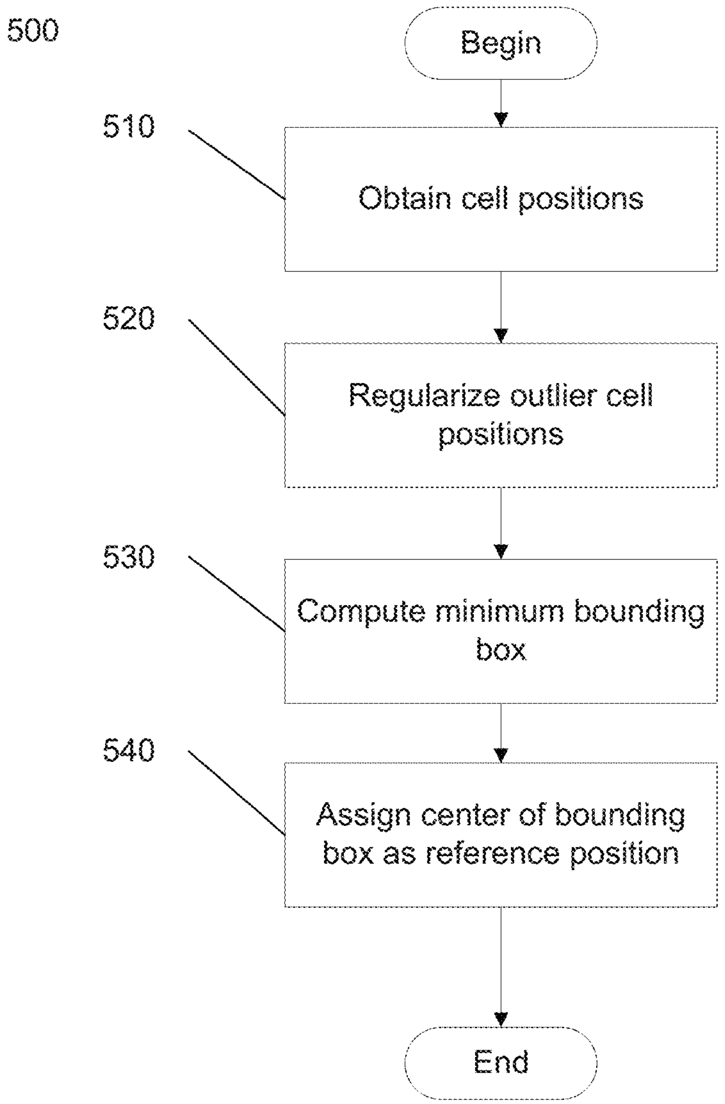
FIG. 5 is a flowchart illustrating a process for determining a reference position in accordance with an embodiment of the invention.
Figure 6:
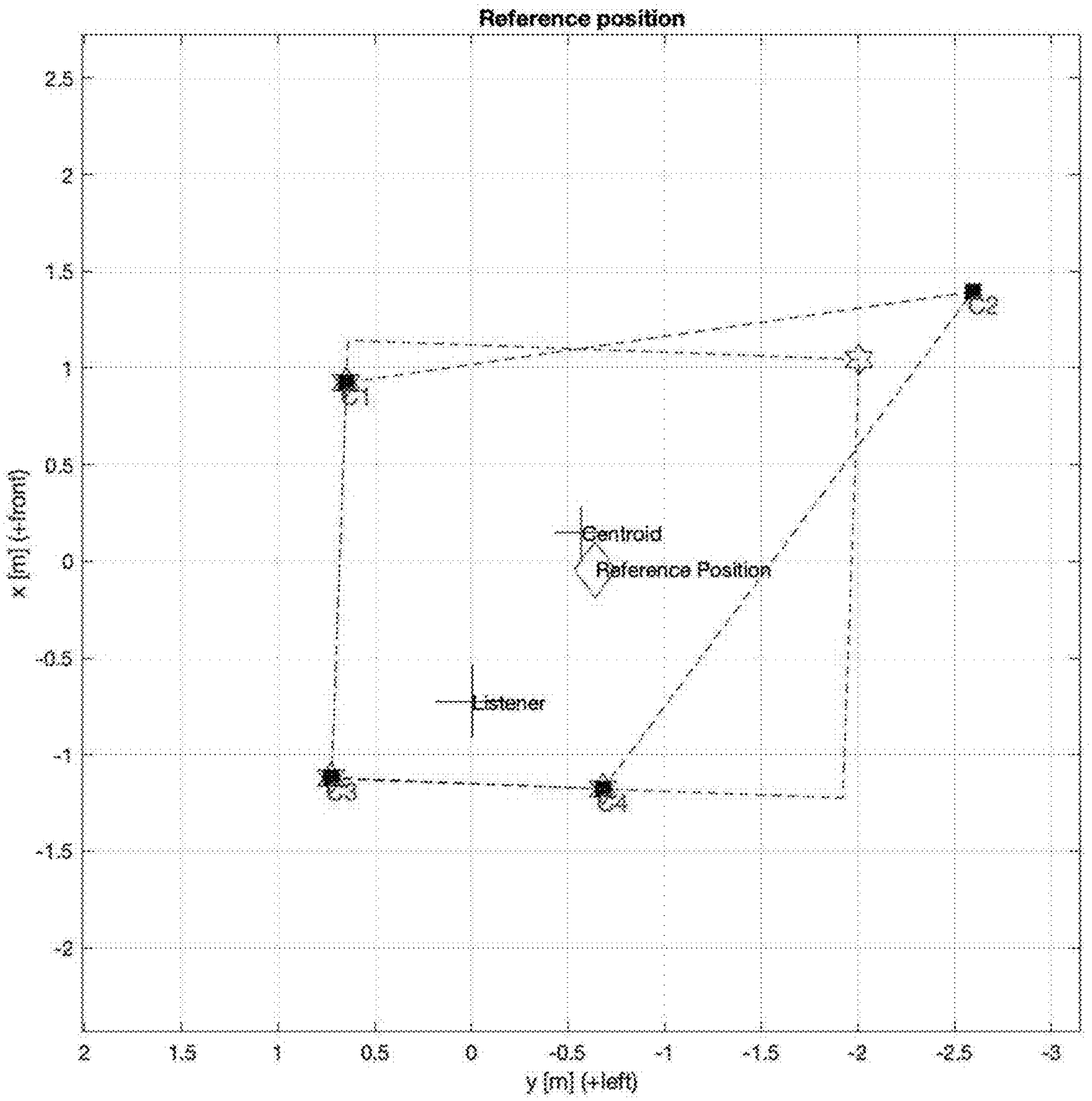
FIG. 6 is a graphical representation of regularizing an outlier cell position in accordance with an embodiment of the invention.
Figure 7:
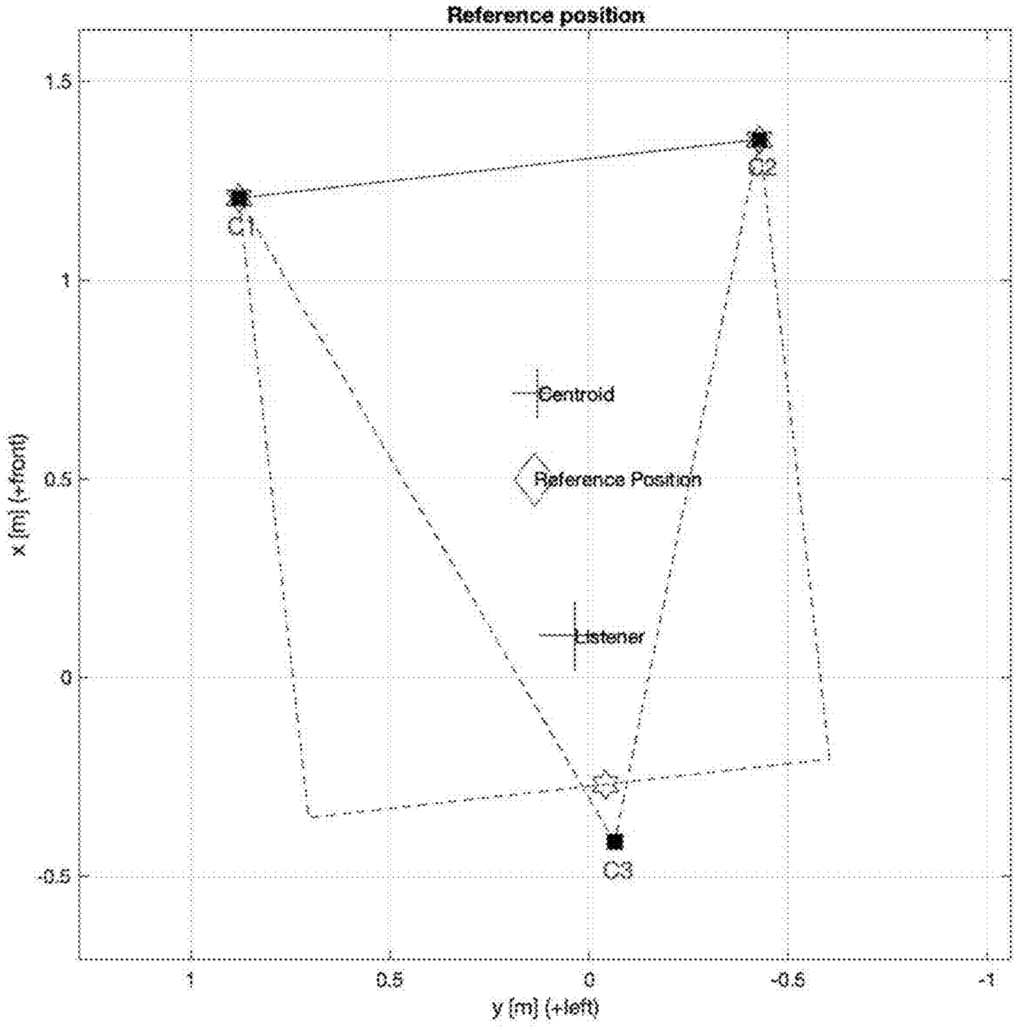
FIG. 7 is a chart illustrating an example reference position for a first arbitrary cell positioning in accordance with an embodiment of the invention.
Figure 8:
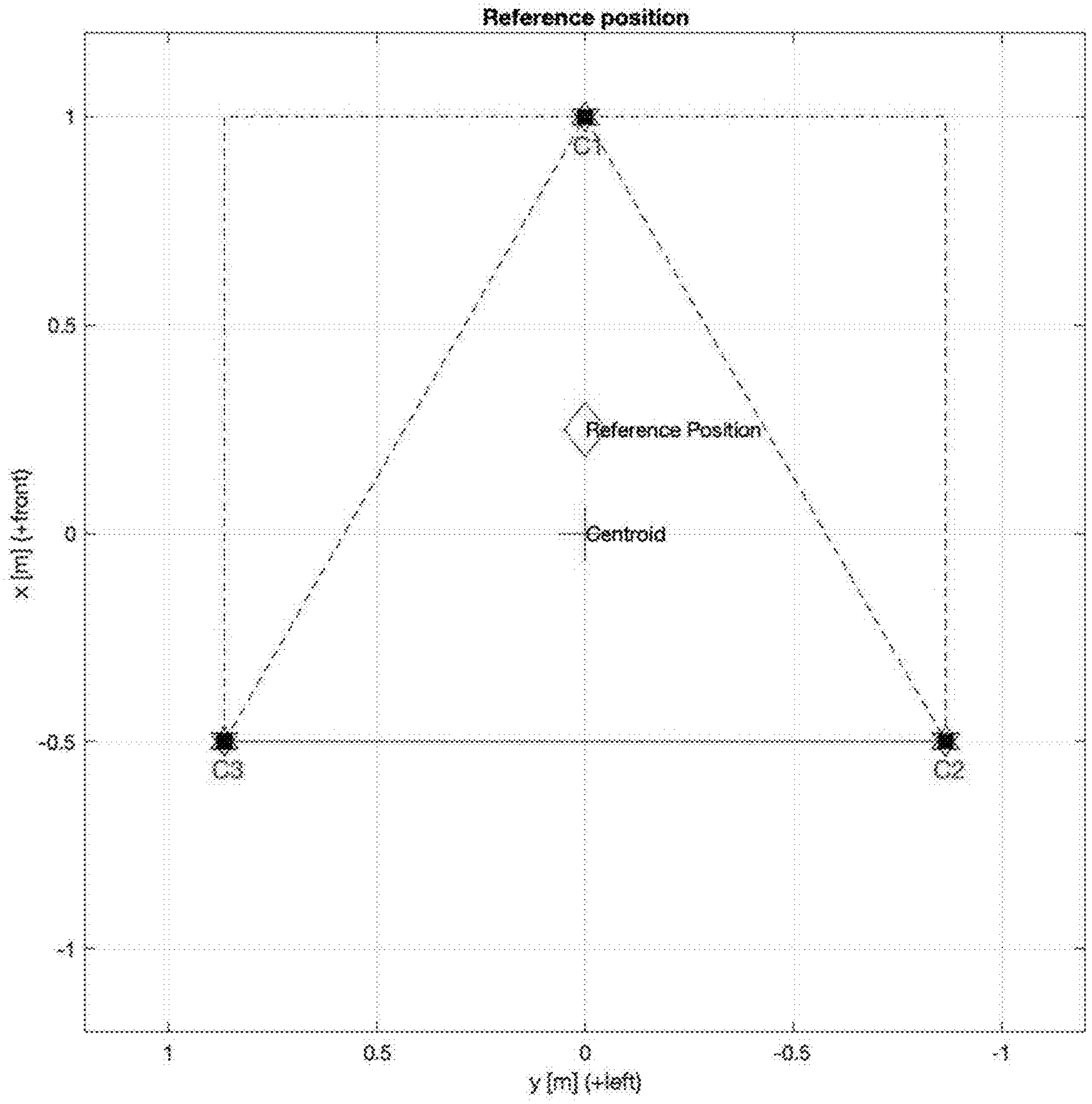
FIG. 8 is a chart illustrating an example reference position for a second arbitrary cell positioning in accordance with an embodiment of the invention.
Figure 9:
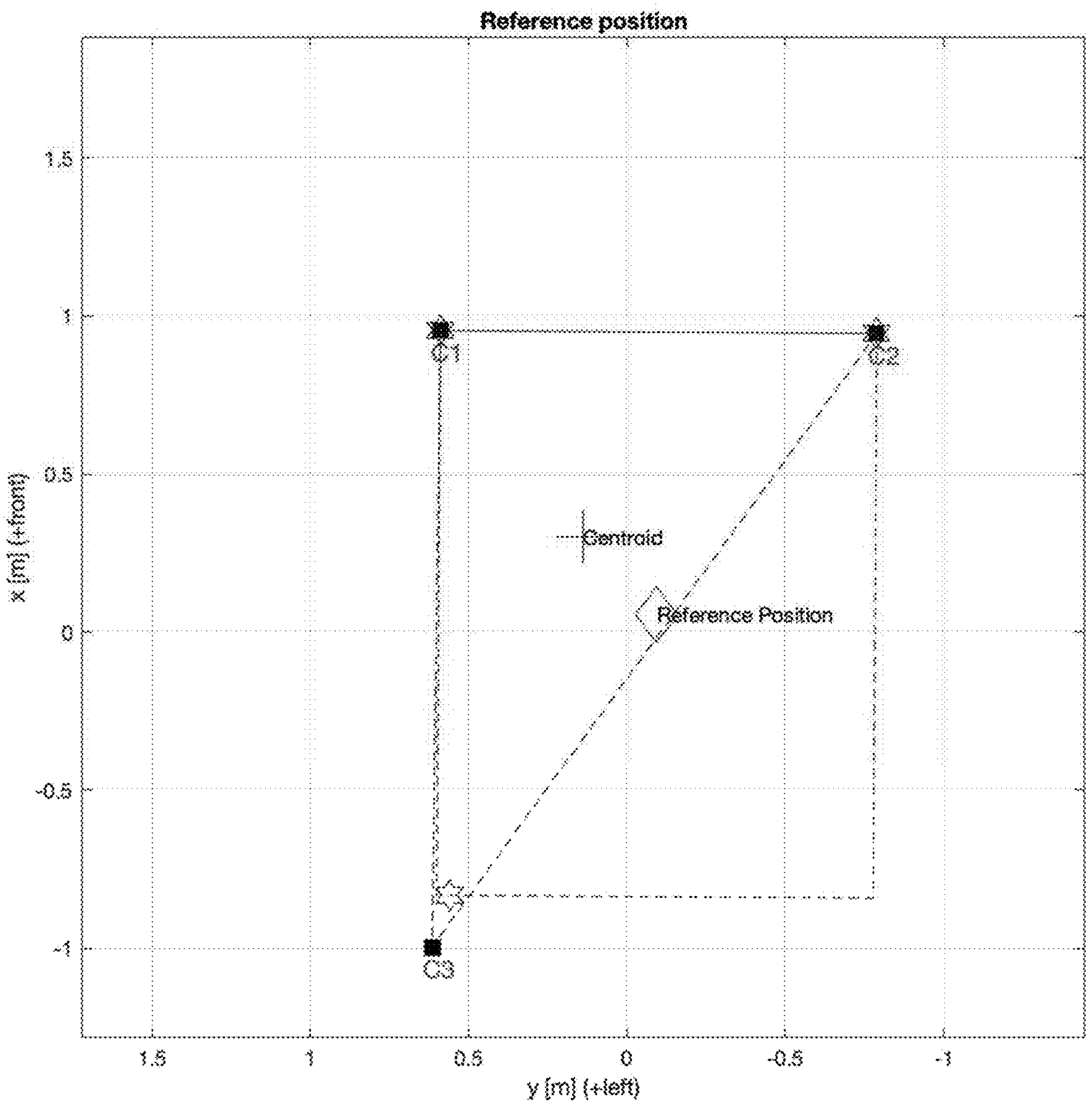
FIG. 9 is a chart illustrating an example reference position for a first arbitrary cell positioning in accordance with an embodiment of the invention.
Figure 10B:
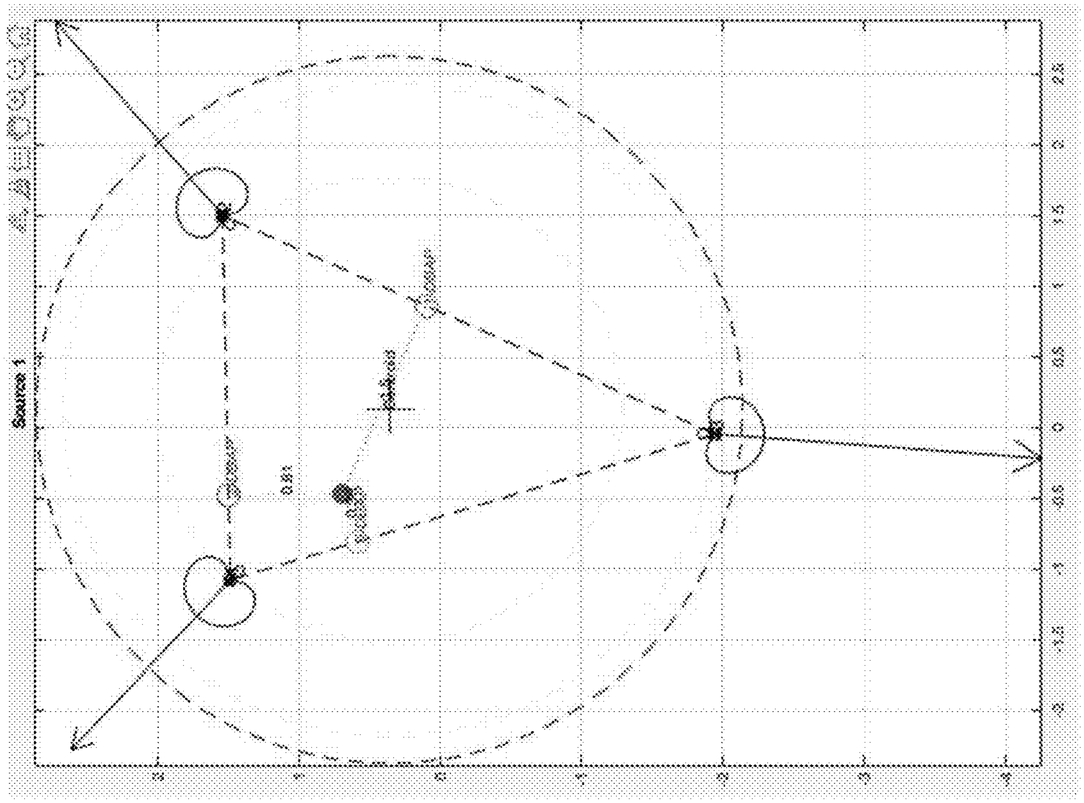
FIGS. 10A and 10B illustrate a source focus parameter value of 0.0 in accordance with an embodiment of the invention.
Figure 10A:
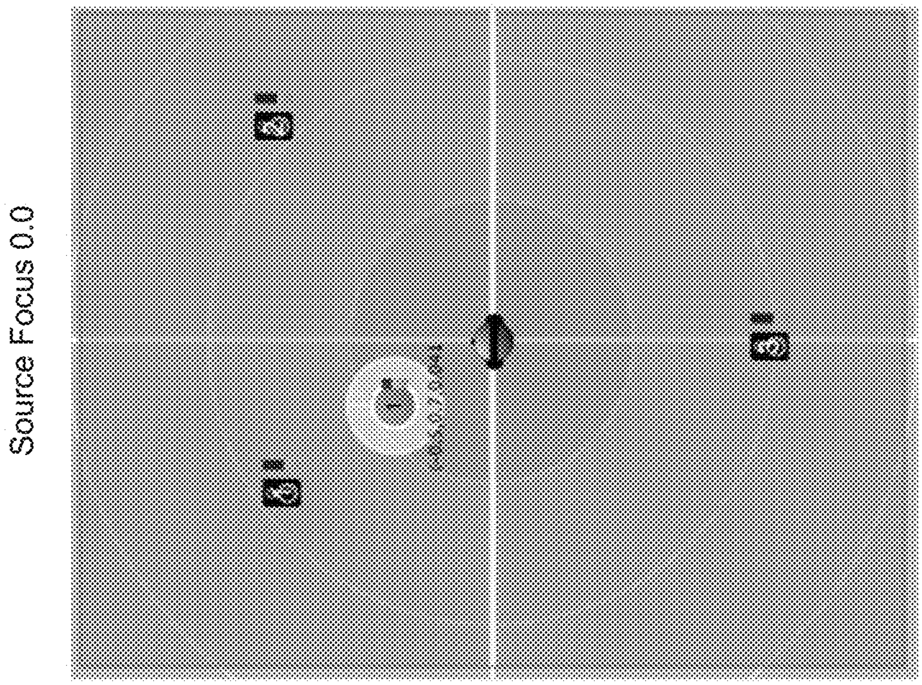
Figure 11B:
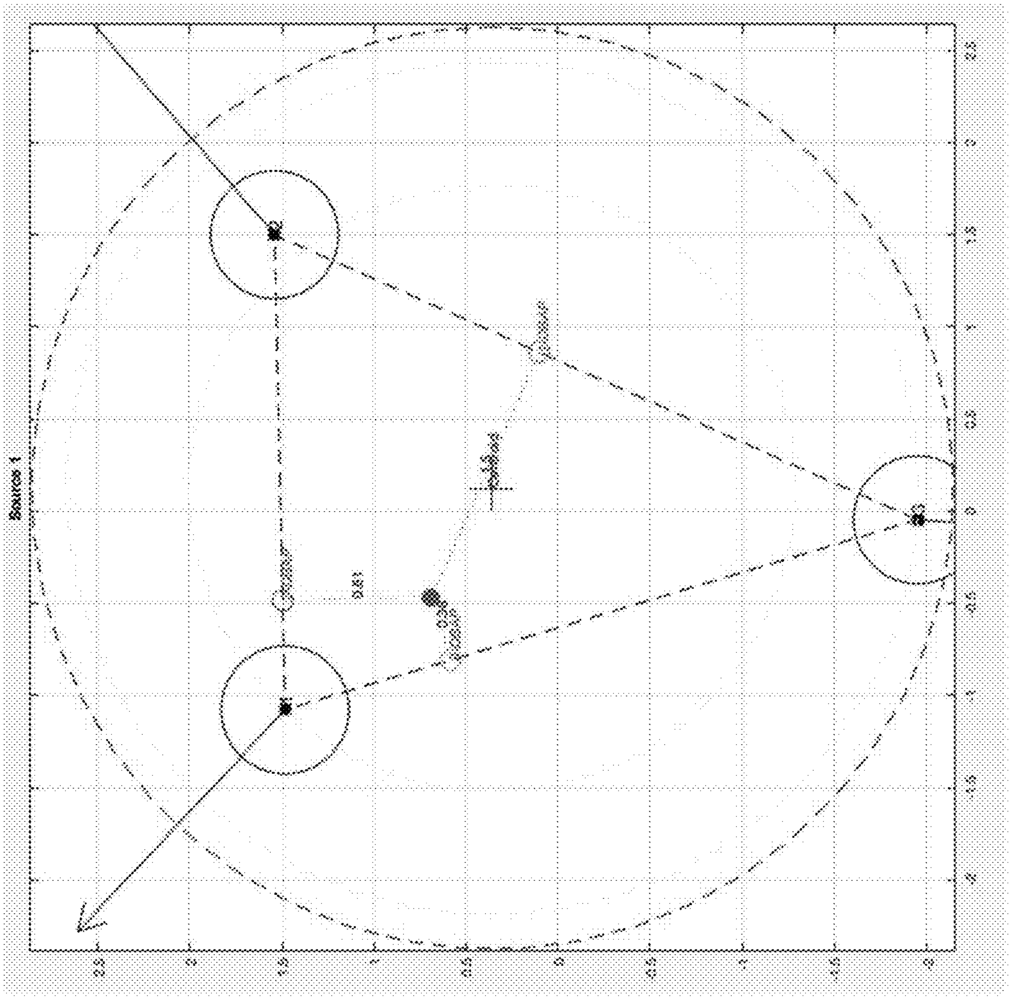
FIGS. 11A and 11B illustrate a source focus parameter value of 0.1 in accordance with an embodiment of the invention.
Figure 11A:
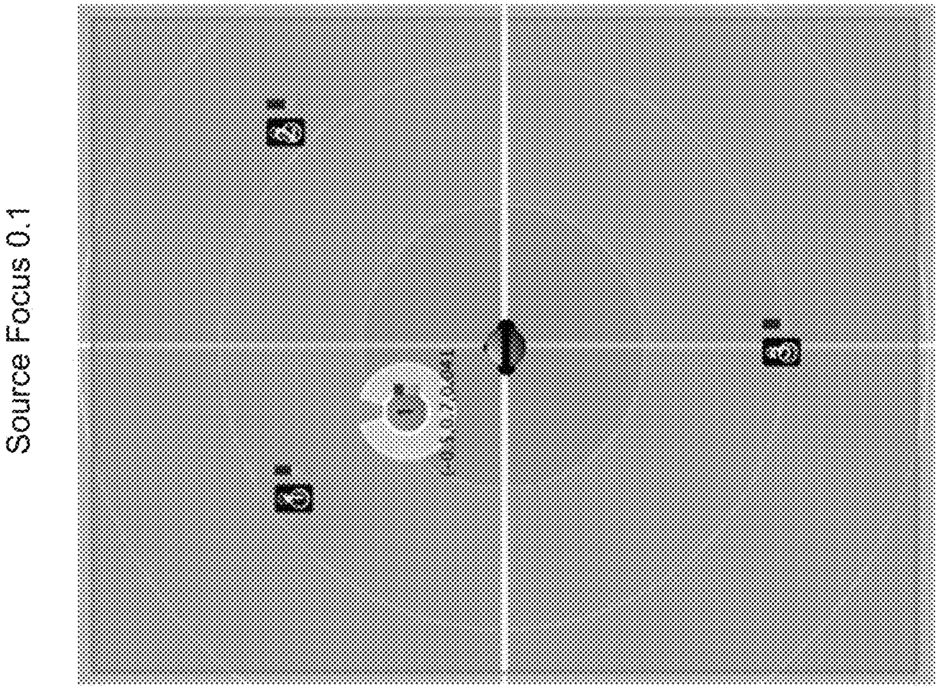
Figure 12B:
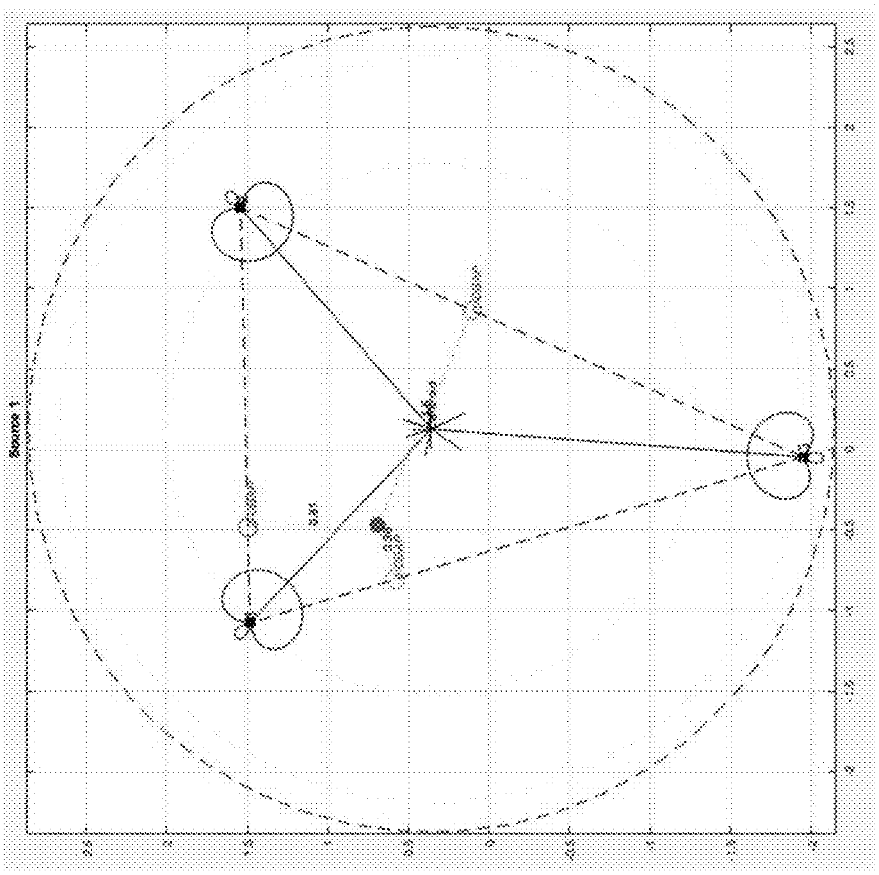
FIGS. 12A and 12B illustrate a source focus parameter value of 0.2 in accordance with an embodiment of the invention.
Figure 12A:
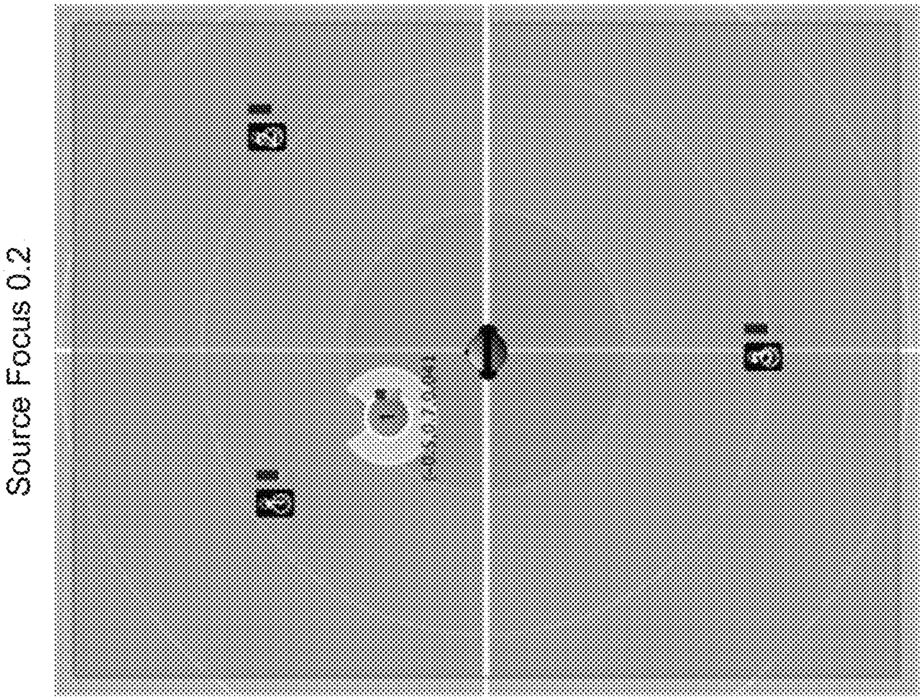
Figure 13B:
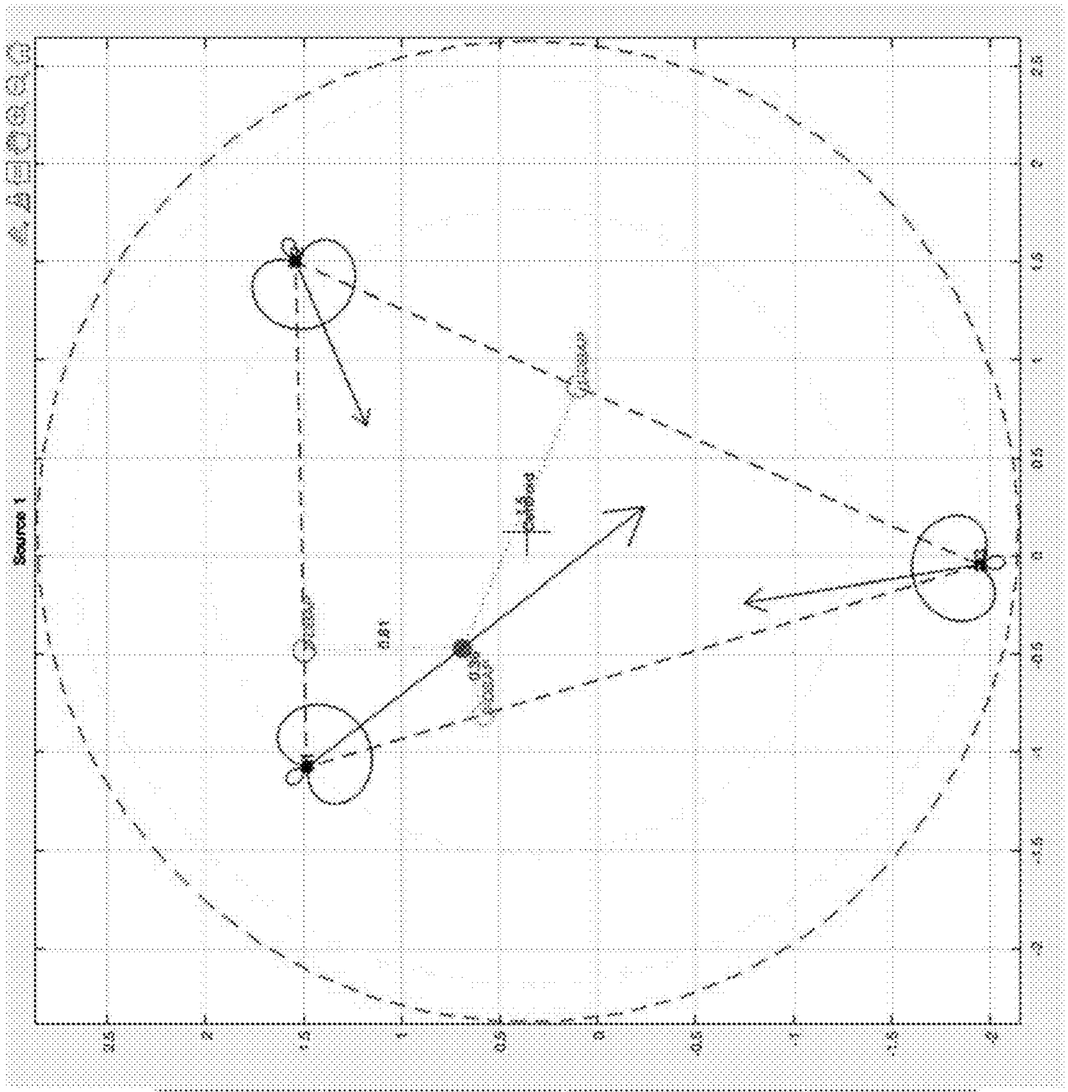
FIGS. 13A and 13B illustrate a source focus parameter value of 0.5 in accordance with an embodiment of the invention.
Figure 13A:
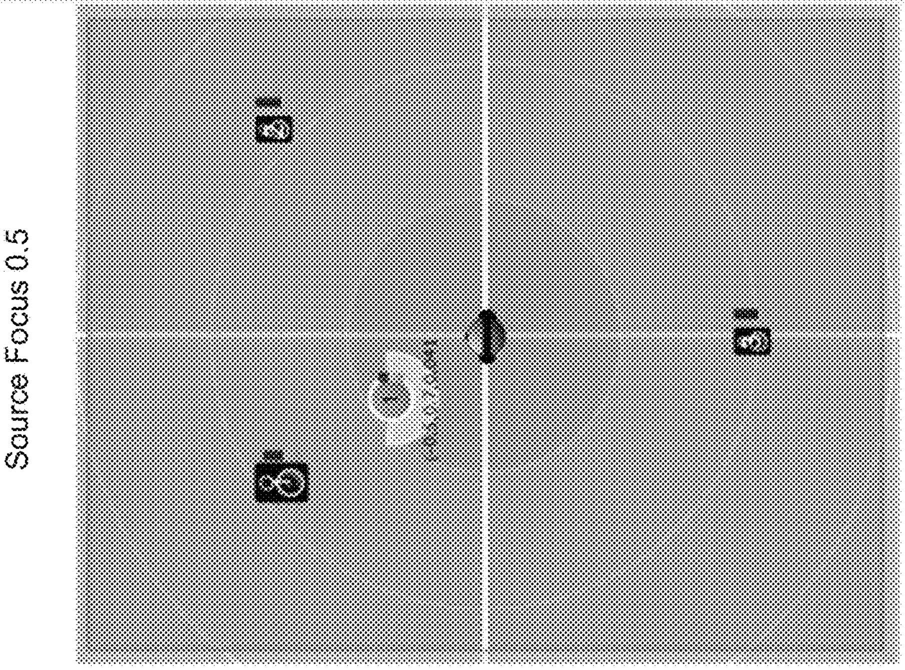
Figure 14B:
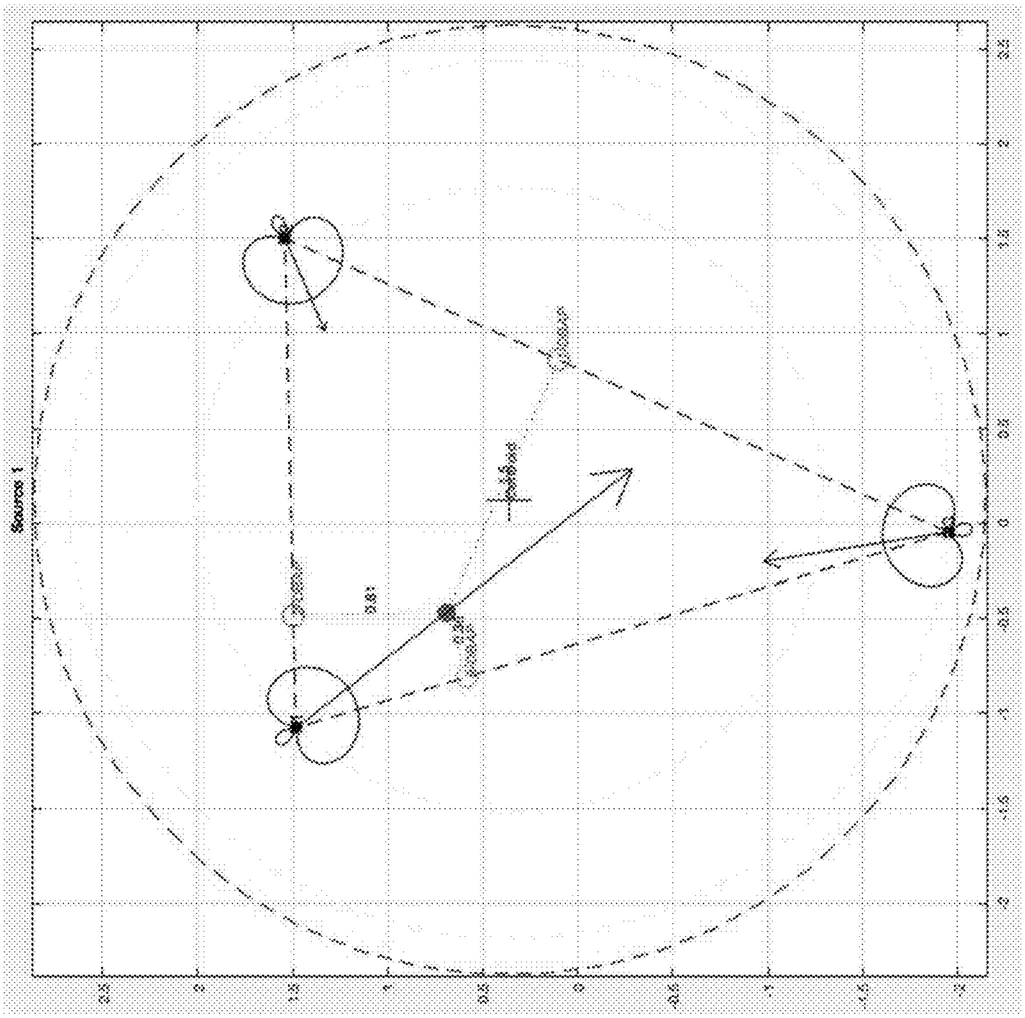
FIGS. 14A and 14B illustrate a source focus parameter value of 0.62 in accordance with an embodiment of the invention.
Figure 14A:
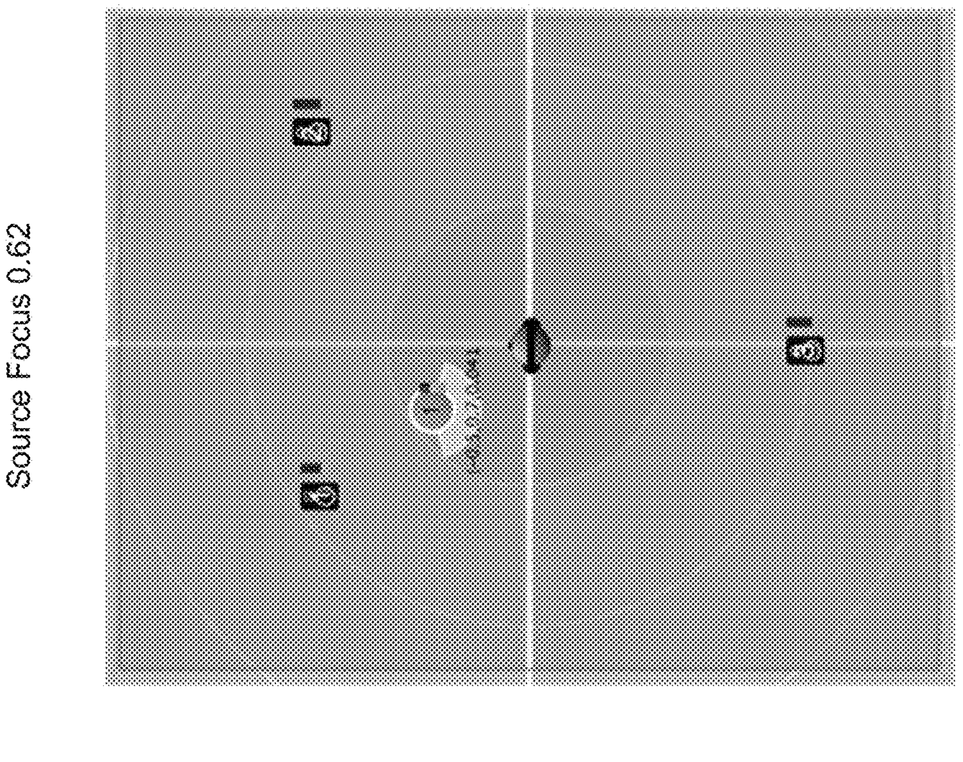
Figure 15A:
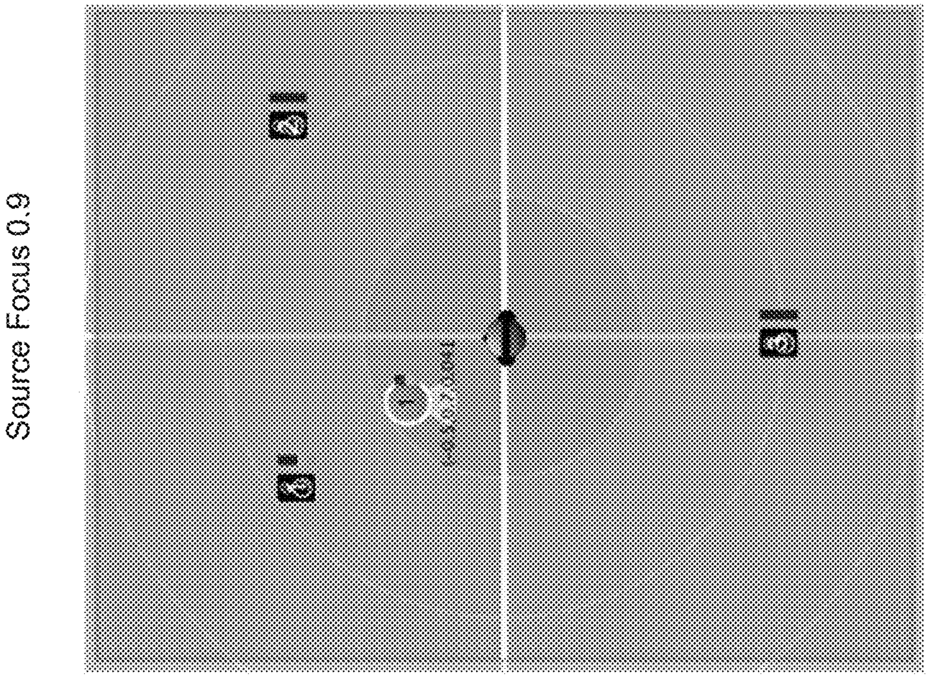
FIGS. 15A and 15B illustrate a source focus parameter value of 0.9 in accordance with an embodiment of the invention.
Figure 15B:
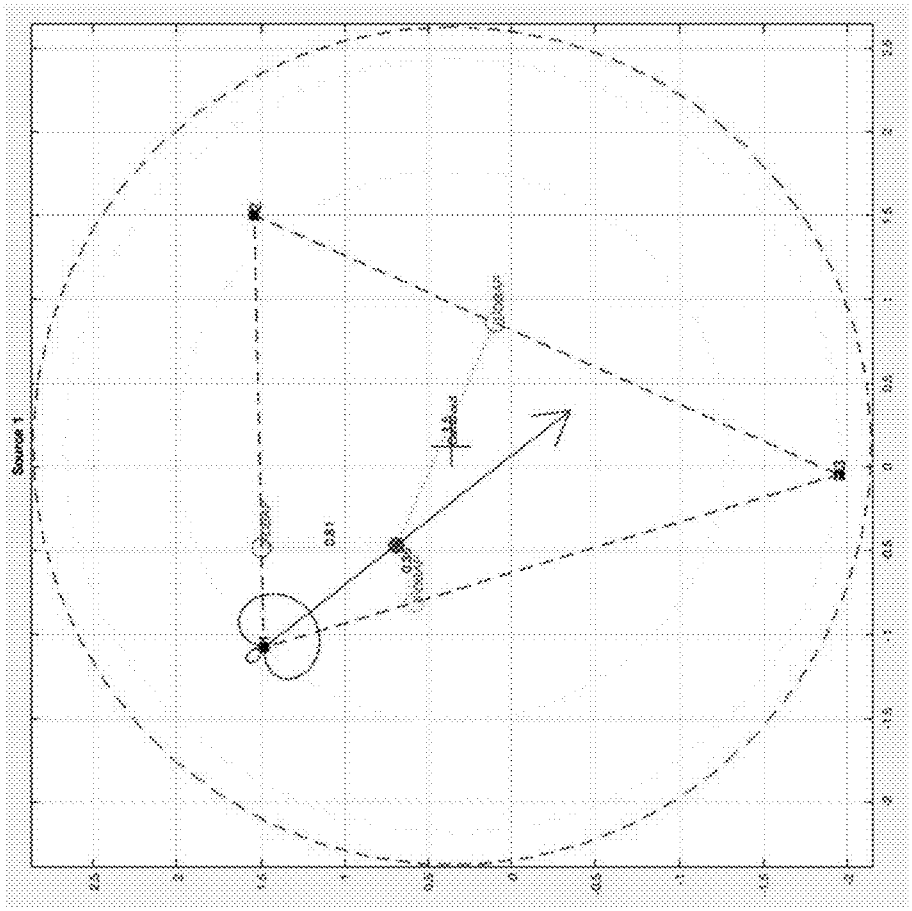

Turning now to FIG. 5, a process for mapping the virtual space of the UI to the real-world cell layout is illustrated. Process 500 includes obtaining (510) cell positions. In many embodiments, the cell positions are obtained as a coordinate map. Example systems and methods for determining cell positions are discussed in U.S. patent application Ser. No. 18/048,768, titled "Systems and Methods for Loudspeaker Layout Mapping" filed Oct. 21, 2022, the disclosure of which is hereby incorporated by reference in its entirety. The position of outlier cells are regularized (520). In many embodiments, outlier cells are identified by having a placement above a threshold distance from any other cell. In various embodiments, clustering techniques can be applied to determine outliers. In some embodiments, any cell which, when removed, would decrease the area minimum bounding box for the set of cells by a threshold percentage can be determined to be an outlier. Indeed, any number of different methods to determine outliers can be used as appropriate to the requirements of specific applications of embodiments of the invention. In a variety of embodiments, the position of the outlier cell is regularized to the nearest point on the minimum bounding box for the remainder of the cells.

A minimum bounding box for the regularized cell positions is computed (530) and the center of this minimum bounding box is assigned (2040) as the reference position, e.g. corresponding to the center point of the virtual space of the UI. The reference position can enable translation from a simple, uniform UI virtual space (e.g. rectangle, square, circle, etc.) to a more complex real-space layout. Various example reference positions with respect to centroids for different cell layouts in accordance with various embodiments of the invention are illustrated in FIGS. 6-9. Specific tuning parameters are discussed in further detail below.

The Source Focus Parameter

In a number of embodiments, a source focus parameter can define the source energy distribution between cells as well as directivity behavior for each cell. In many embodiments, the source focus parameter contains a number of predetermined steps which can be transitioned between depending on the placement of audio objects, which can be determined (for example) by placement of the puck and/or a desired level of directionality from the location of the puck, where each step has a different behavior which is not required to be linear. In many embodiments, the source focus parameter ranges from 0.0 to 1.0, where lower numbers reflect a lack of focus, and higher numbers represent increasing focus. Each step of 0.1 can have a particular behavior, and values between steps of 0.1 can have an interpolated mix of behaviors from the bounding 0.1 step values. For example, a source focus parameter of 0.53 would mix behavior of 0.5 and 0.6, weighing slightly in favor of 0.5. In numerous embodiments, the effect of the source focus parameter can be tuned to the artistic desires of the user. A set of source focus parameter behaviors are described in the table below.

| Focus Parameter | Behavior | Interpolation | Panning | Directivity angle |
|---|---|---|---|---|
| 0 | All Cells play almost same level, fixed cardioid pointing away from convex hull centroid | | add offset to convex hull speaker gains to make most 1.5 dB difference | angle away from centroid |
| | | Fade from cardioid directivity (facing outwards) to omni | → all convex hull speakers are playing | |
| 0.1 | All Cells play almost same level (only convex hull speakers play), fixed Omni | | | angle towards centroid |
| | | Fade from omni directivity to cardioid (facing inwards) | | |
| 0.2 | All Cells play almost same level (only convex hull speakers play), fixed Cardioid towards centroid of convex hull | | | |
| | | offset to all speaker gains in convex hull | | |
| 0.3 | VBAP/DBAP Hybrid, fixed Cardioid towards centroid | | (DBAP/VBAP Hybrid) | |
| | | fade from cardioid to omni | | |
| 0.4 | VBAP/DBAP Hybrid, fixed Omni | | | angle towards source |
| | | distance for which omni is being used changes towards infinity | | |
| 0.5 | VBAP/DBAP Hybrid, Dynamic directivity control | | | |
| | | distance for which omni is being used changes towards 0 | | |

-continued

| Focus Parameter | Behavior | Interpolation | Panning | Directivity angle |
|---|---|---|---|---|
| 0.6 | VBAP/DBAP Hybrid, fixed cardioid towards source | | | |
| | | distance attenuation increases | only a single cell playing | |
| 0.8 | Only one cell, fixed cardioid towards source | | | |
| | | directivity changes from cardioid towards omni | | |
| 0.9 | Only one cell, fixed omni | | | |
| | | directivity changes from omni towards cardioid, beam fixed towards centroid | | angle towards centroid |

Figure 16B:
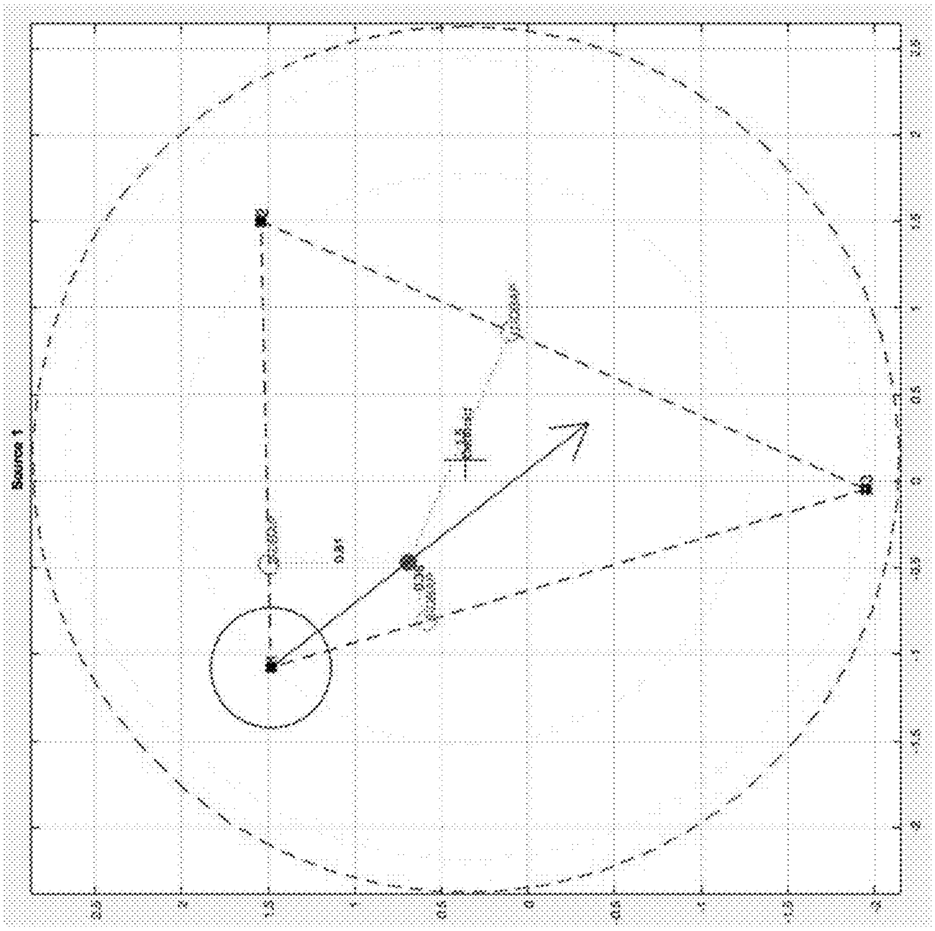
FIGS. 16A and 16B illustrate a source focus parameter value of 1.0 in accordance with an embodiment of the invention.
Figure 16A:
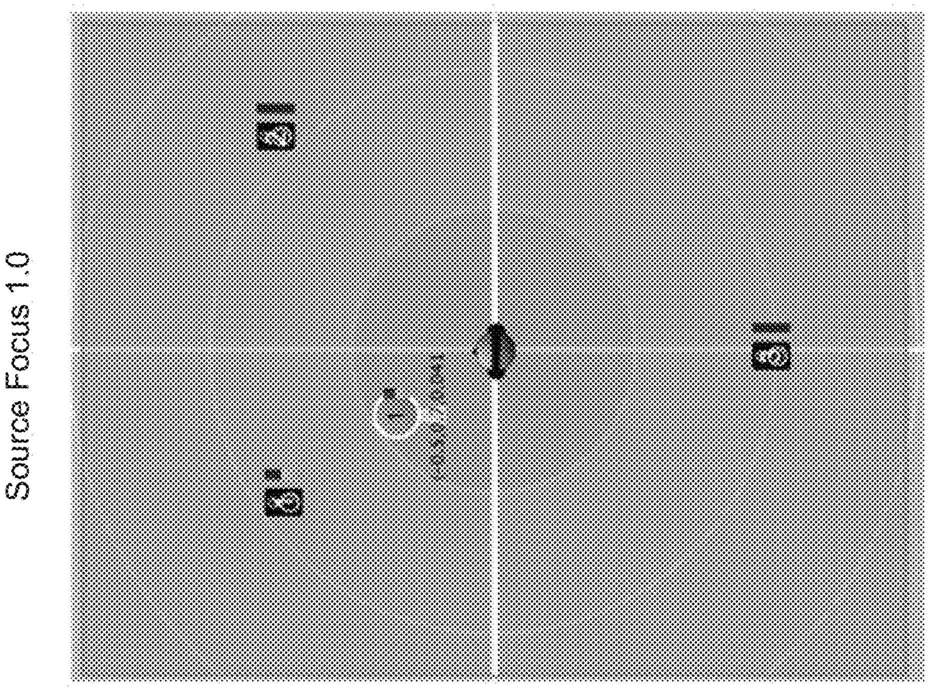

By way of further example, different source focus parameters are illustrated in the series of FIGS. 10A and 10B to FIGS. 16A and 16B. Beginning with FIGS. 10A and 10B, a puck position and resulting sound field with source focus of 0.0 in accordance with an embodiment of the invention are illustrated, respectively. FIGS. 11A and 11B illustrate a puck position and resulting sound field with source focus of 0.1, respectively. FIGS. 12A and 12B illustrate a puck position and resulting sound field with source focus of 0.2, respectively. FIGS. 13A and 13B illustrate a puck position and resulting sound field with source focus of 0.5, respectively. FIGS. 14A and 14B illustrate a puck position and resulting sound field with source focus of 0.62, respectively. FIGS. 15A and 15B illustrate a puck position and resulting sound field with source focus of 0.9, respectively. FIGS. 16A and 16B illustrate a puck position and resulting sound field with source focus of 1.0, respectively.

In a number of embodiments, a VBAP/DBAP hybrid approach is utilized to generate audio signals for audio objects located within particular sub-regions of the region containing a group of cells. In this approach, Distance Based Amplitude Panning (DBAP) is utilized to determine the characteristics of three or more virtual audio sources located on the convex hull of the cells. Vector Based Amplitude Panning (VBAP) and/or pairwise-based panning approaches can then be utilized by pairs of cells (or three cells when an overhead cells is present) to generate audio signals for each of the cells enabling the rendering of audio by the cells in manner corresponding to each of the virtual audio sources determined using DBAP. In some configurations, beamforming can be utilized to generate audio signals directed towards a centroid defined based upon the cell configuration. In other configurations, beamforming can be utilized to generate audio signals directed toward the location of the spatial audio object. Utilizing beamforming in this way can increase the perceived directivity of the spatial audio object. As can readily be appreciated, any of a variety of panning techniques can be utilized to render spatial audio objects and the specific manner in which spatial audio objects are rendered in different regions can be determined and/or modified based upon factors including (but not limited to) the configuration of the cells, the type of audio source, artistic direction and/or any other factor appropriate to the requirements of specific applications.

While particular source focus parameters, values and behaviors are discussed above, as can be readily appreciated, additional behaviors can be added and described behaviors can be removed as appropriate to the requirements of specific applications of embodiments of the invention. Furthermore, the rendering of audio objects in accordance with various embodiments of the invention is not limited to the use of spatial audio parameters in the manner described above, but can instead utilize any of a variety of techniques for modifying the directionality and/or manner in which audio objects are rendered as appropriate to the requirements of specific application. The use of a delay/gain parameter in the rendering of spatial audio in accordance with several embodiments of the invention is discussed below.

The Delay and Gain Parameters

In numerous embodiments, a user may indicate their listening location to a spatial audio system which will shift the sound field to optimize the listening experience for the indicated location. In many situations, when a listener is closer to one cell compared to the others, the spatial image will shift towards the closer cell. This is due to the Precedence effect—spatial perception shifts towards the direction of the first arriving sound. Further, the sound from the nearer cell tends to be less attenuated than far away cells which adds to the spatial dominance of the near cell (also referred to as Amplitude Panning). To compensate for these two phenomena, systems and methods described herein can utilize a gain parameter and a delay parameter for each cell to correct for the different traveling time/distance from each cell to the listener, and perceptually put all cells at the same distance for the listener. In numerous embodiments, delay and gain are used more often when the listener expects to be in a static listening position, e.g. sitting on a couch watching a television. In this situation, a near cell can be made to play more quietly with a slight delay to compensate for the shorter distance.

Figure 17A:
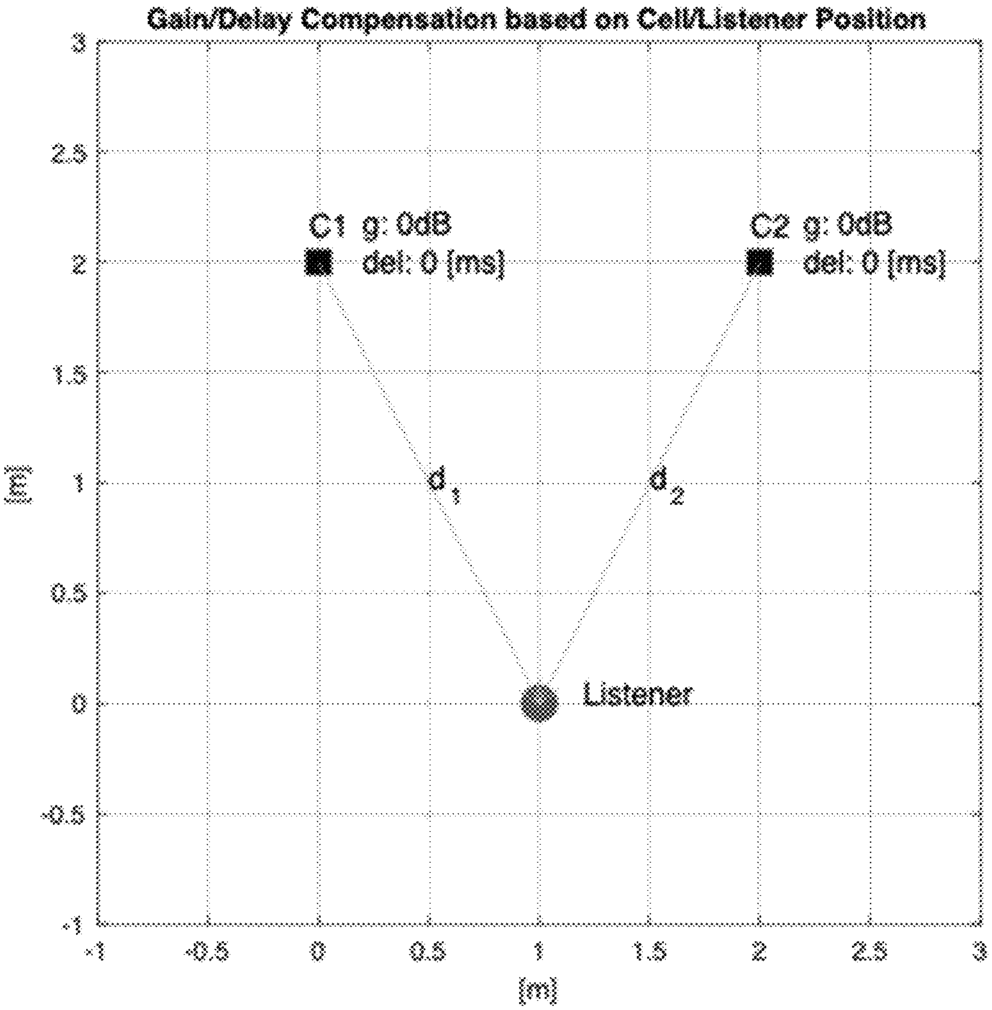
FIGS. 17A and 17B show the difference in gain/delay compensation due to a shift in listener position for an arbitrary two cell system in accordance with an embodiment of the invention.
Figure 17B:
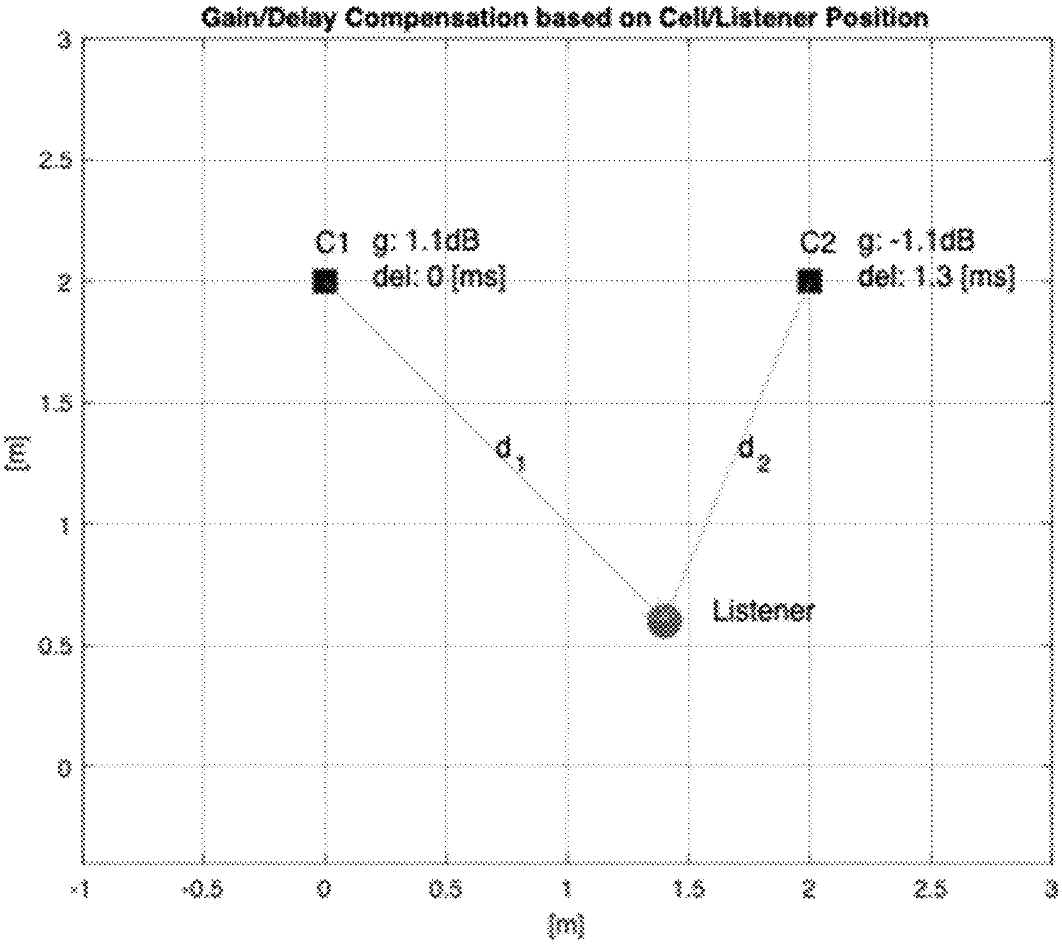

Turning now to FIGS. 17A and 17B, a gain (g) and delay (del) parameter are modified by a spatial shader based on an indicated listening position in a two-cell system. As can be seen in FIG. 17A, when the listener is equidistant from both cells, both gain and delay are set to 0. However, when the listening position is shifted towards cell 2 as shown in FIG. 17B, cell 1 has increased gain, while cell 2 has decreased gain and increased delay. In many embodiments, for a two-cell system, the gain increased for the closer cell to the listener in accordance with the inverse distance law, and the gain is equally decreased for the farther cell in order to preserve loudness. Gain in a two-cell system can be calculated as the distance from the closer cell to the listening position divided by the distance to the farther cell to the listening position. In the illustrated example, $gain_2=d_2/d_1$. Delay for the closer cell is calculated as the distance from the farther cell to the listening position minus the distance from the closer cell to the listening position, all divided by the speed of sound in air. In the illustrated example, $delay_2=(d_2-d_1)/c$.

Figure 18A:
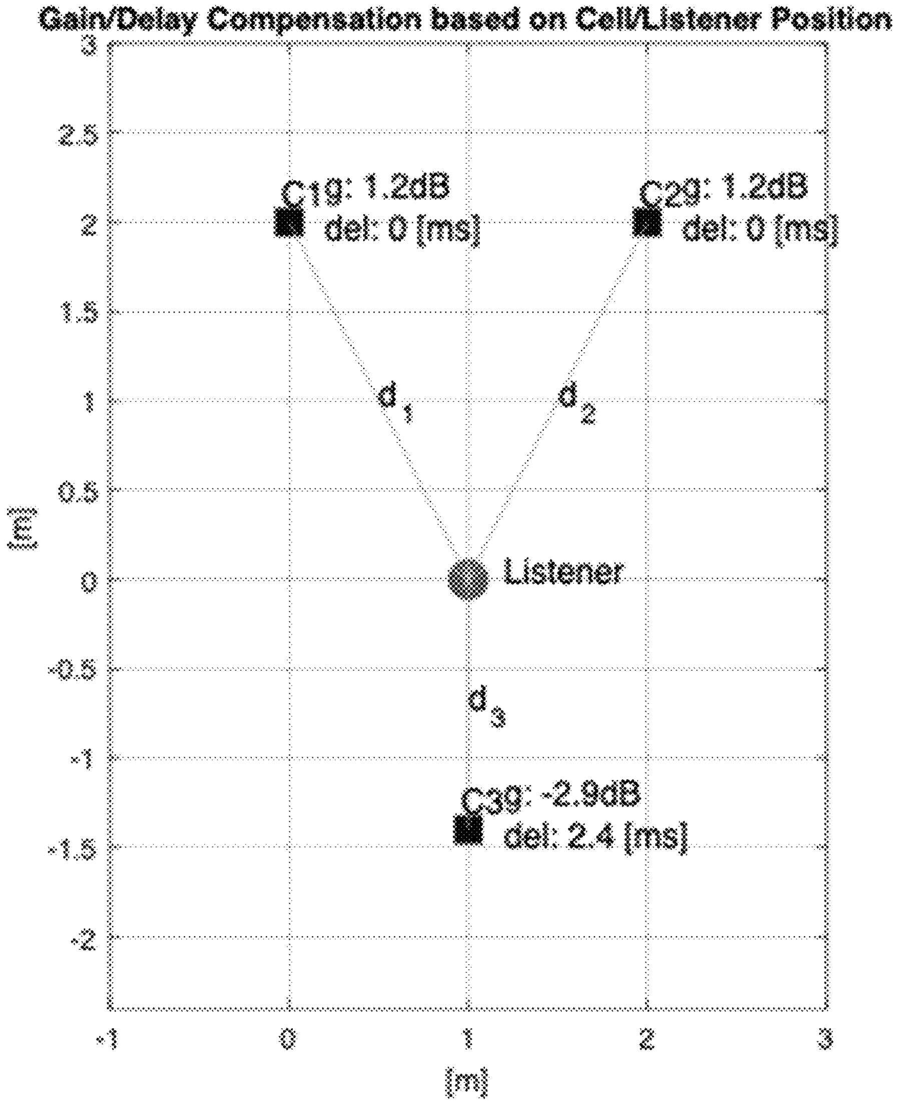
FIGS. 18A, 18B and 18C show the difference in gain/delay compensation due to a shift in listener position for an arbitrary three cell system in accordance with an embodiment of the invention.
Figure 18B:
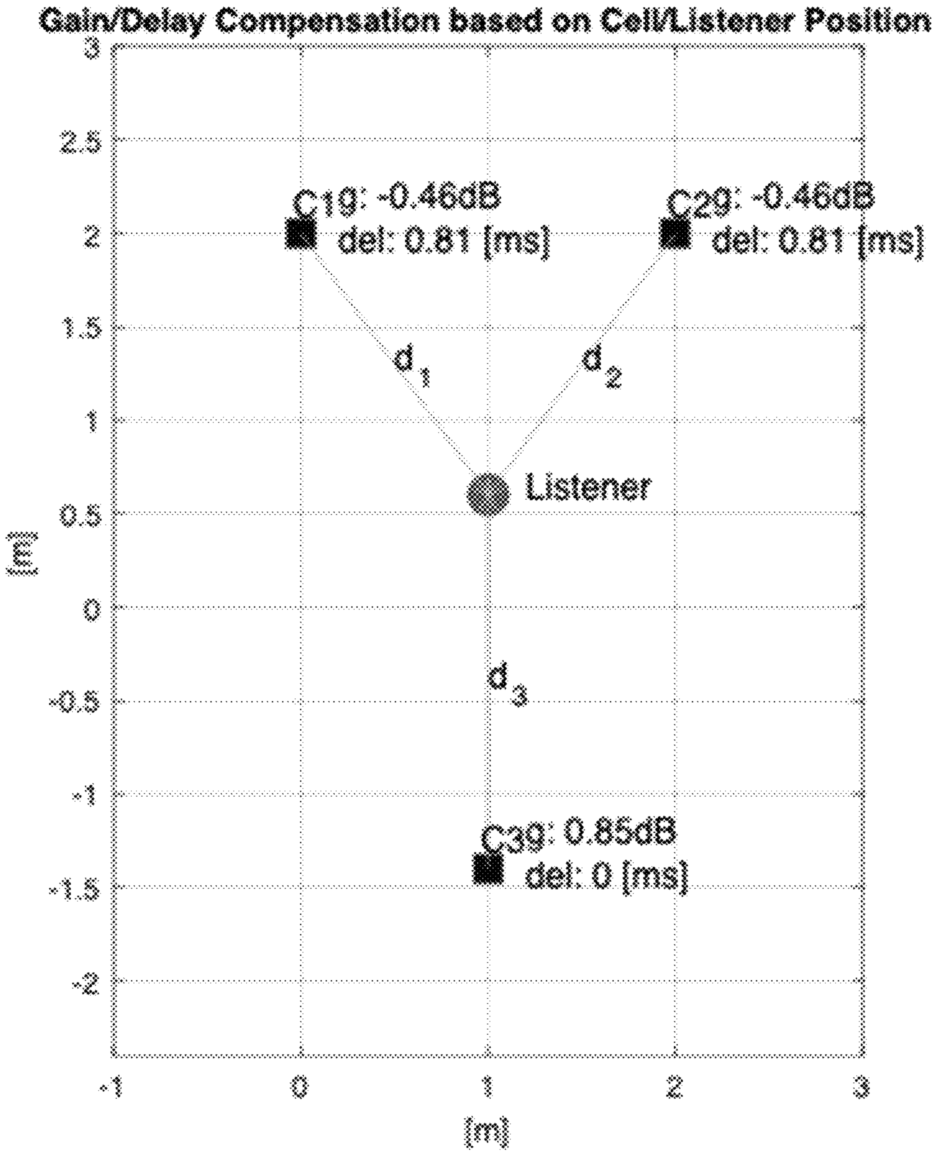

By way of further example, a three-cell system is illustrated in FIGS. 18A, B and C. As can be seen, by shifting the listening position, gain and delay across the cells are modified to make a listener at the designated listening position perceive all cells equally. FIG. 18A illustrates a scenario where Cell3 is closer to the listening position, and therefore needs to be attenuated and delayed. Conversely, FIG. 18B illustrates a scenario where Cell1 and Cell2 are closer to the listening position than Cell3, and therefore they need to be delayed and attenuated. Because two of the distances are equal, similar methods as to the two-cell system can be used to calculate the gain and delay parameters.

Figure 18C:
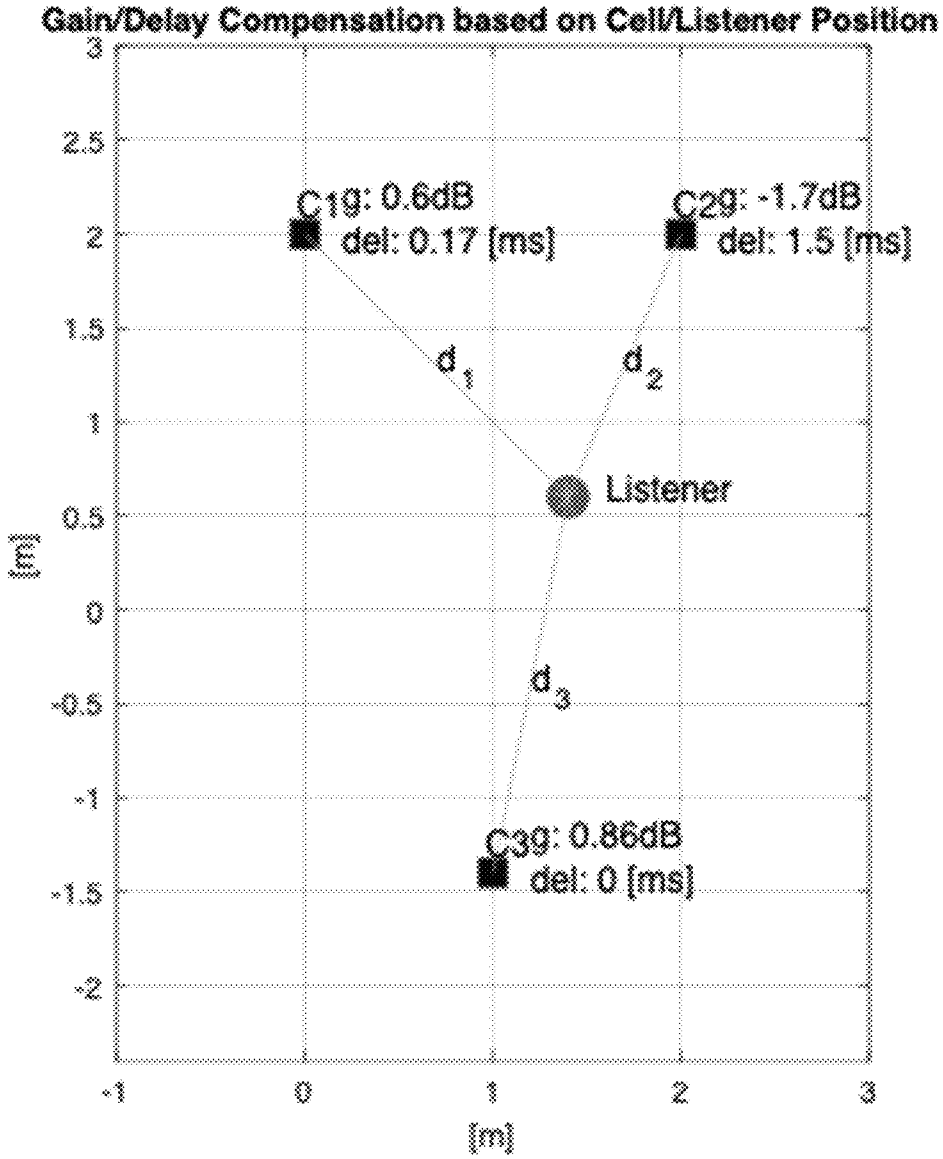

In FIG. 18C, each cell is a different distance from the listening position. In the illustrated example, Cell2 is the closest, followed by Cell1, and then Cell3. To calculate the delay and gain parameter values, first determine the maximum distance from the listening position to the farthest cell. In this case, $d_{max}=d_3$. Then, delay for each given cell in the system can be computed as the distance from the given cell to the listening position minus $d_{max}$ all over the speed of sound in air. Similarly, gain can be computed as the distance from the given cell to the listening position divided by $d_{max}$. As can be readily appreciated, these calculations can be extended for systems that include more than three cells without departing from the scope or spirit of the invention.

Figure 19:
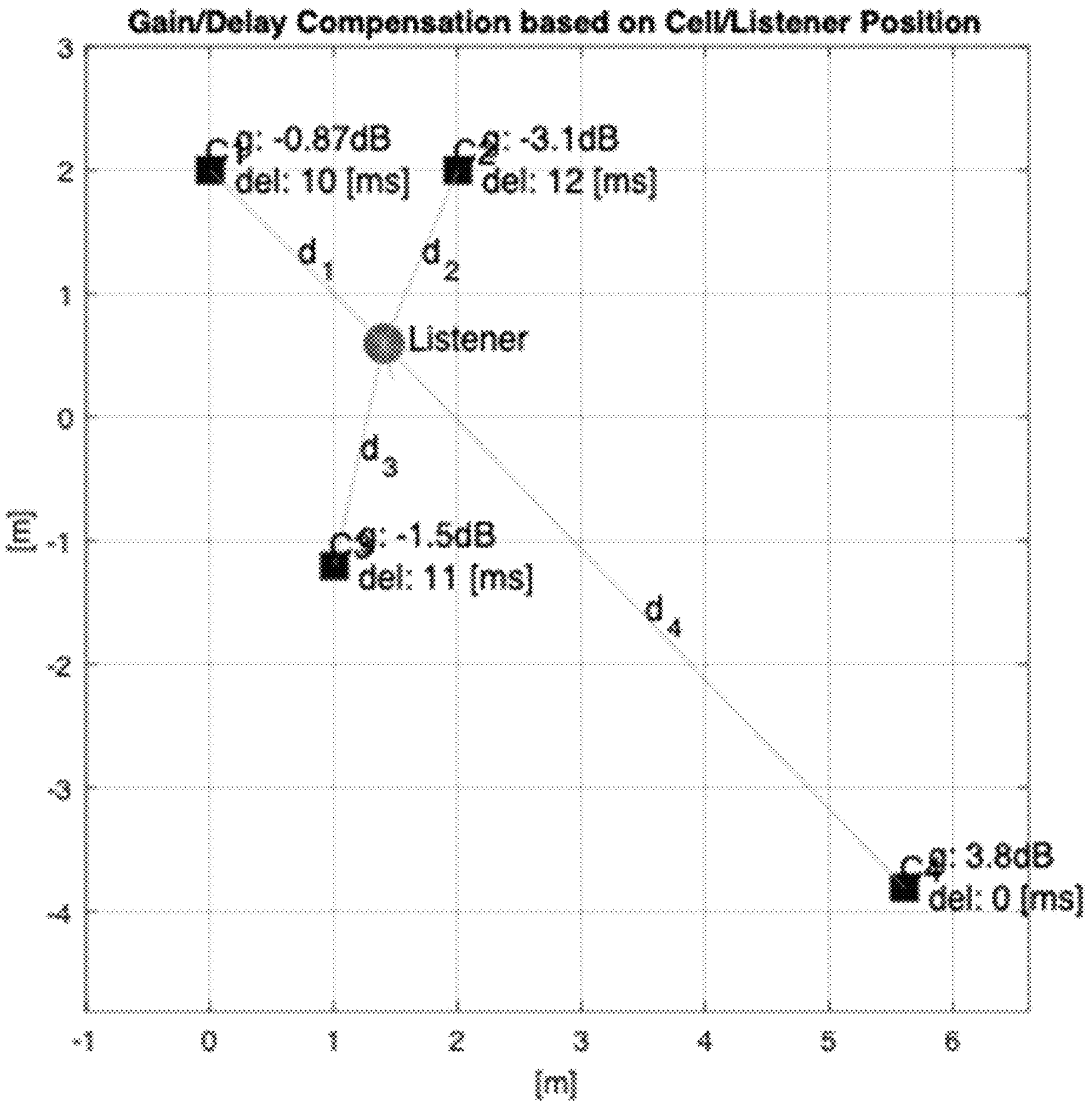
FIG. 19 shows an example gain/delay compensation for a scenario where a fourth cell is distant from a group of three cells in accordance with an embodiment of the invention.

In many situations, cells that are too far from the listening position may not be able to contribute to a 'fused' spatial sound event. In numerous embodiments, if a very far cell were included in the gain and delay computations, unacceptable latency could be introduced. Therefore, in various embodiments, a maximum latency is introduced outside of which cells are not considered for gain and delay with respect to the given listening position. In a variety of embodiments, the maximum latency is between 10 and 14 ms. This situation is illustrated in FIG. 19. The distance of Cell4 to the listening position causes the delay to rise above a threshold of 12 ms, and therefore no delay is introduced. Gain is introduced to normalize volume, although the compensation can be restricted in its dynamic range. While specific calculations for gain and delay parameters are described above, any number of different calculations could be used as appropriate to the requirements of specific applications of embodiments of the invention. Bass-crossfeed parameters are discussed in further detail below.

The Bass-Crossfeed Parameter

In numerous embodiments, there is equal distribution of bass content to all cells. However, in many situations, depending on the layout of cells, bass frequencies can be disproportionately loud near cells that are not being used (or as significantly used) for rendering spatial audio objects. For example, if a listening area on an open floor plan including a kitchen and a living room contains multiple cells, and a user in the kitchen wants to listen to music and therefore places audio objects in the kitchen, an equal bass distribution across all cells equally may disturb the person in the living room by playing only bass near them. To address this scenario, a bass-crossfeed parameter can be used to tune the amount of bass fed from one cell to another. In many embodiments, the bass-crossfeed parameter is a number between 0.0, representing no crossfeed, and 1.0, representing full crossfeed. In many embodiments, the bass-crossfeed parameter can be artistically set by the system architect and/or user.

Figure 20:
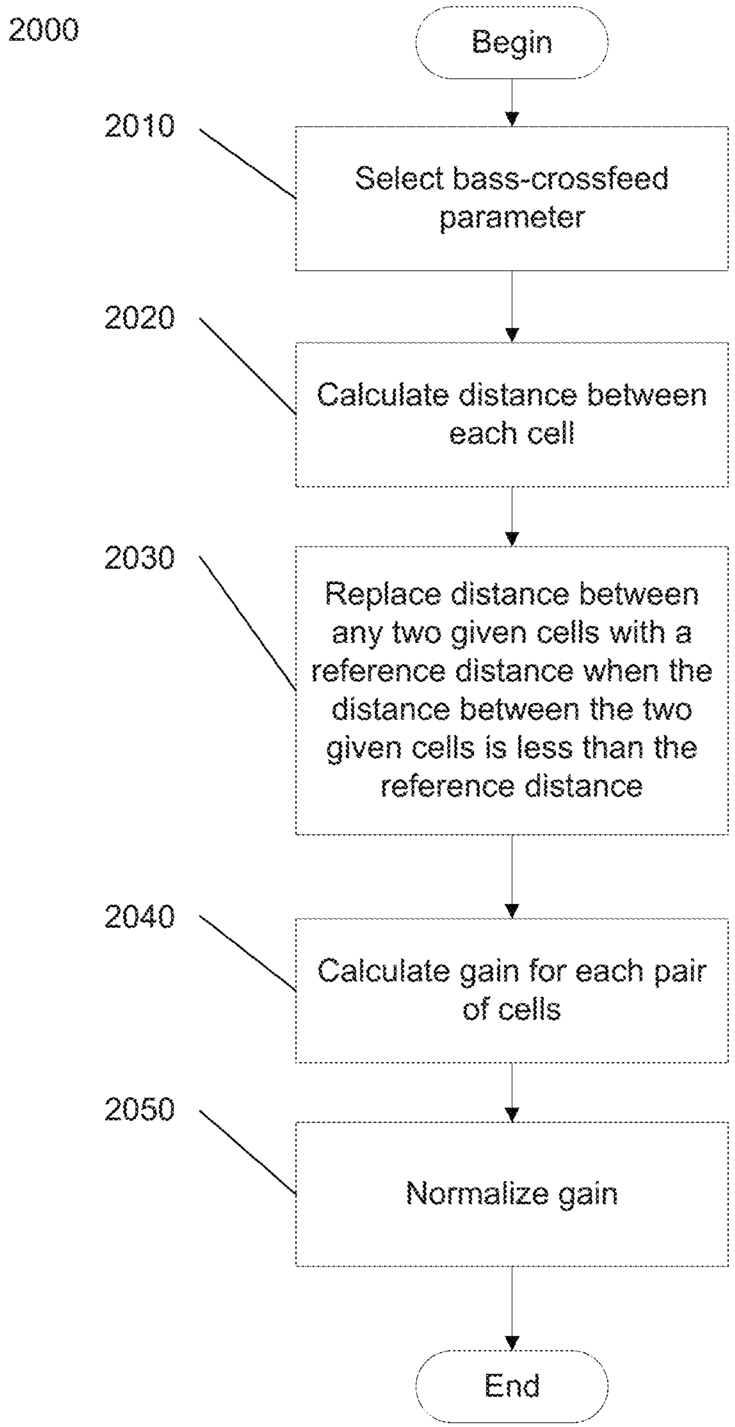
FIG. 20 is a flow chart for using a bass-crossfeed parameter in accordance with an embodiment of the invention.
Figure 21:
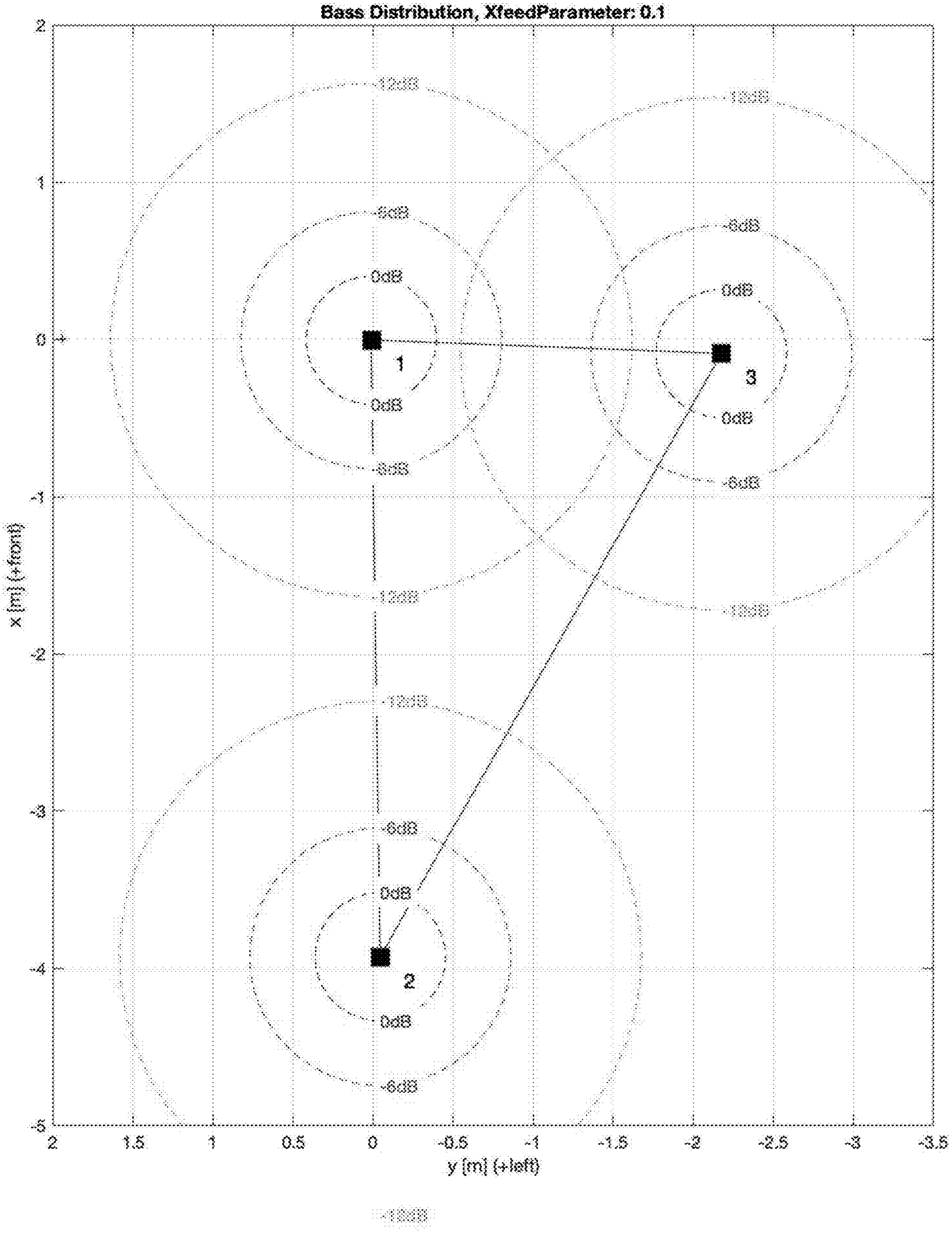
FIG. 21 illustrates a bass distribution with a crossfeed parameter of 0.1 in accordance with an embodiment of the invention.
Figure 22:
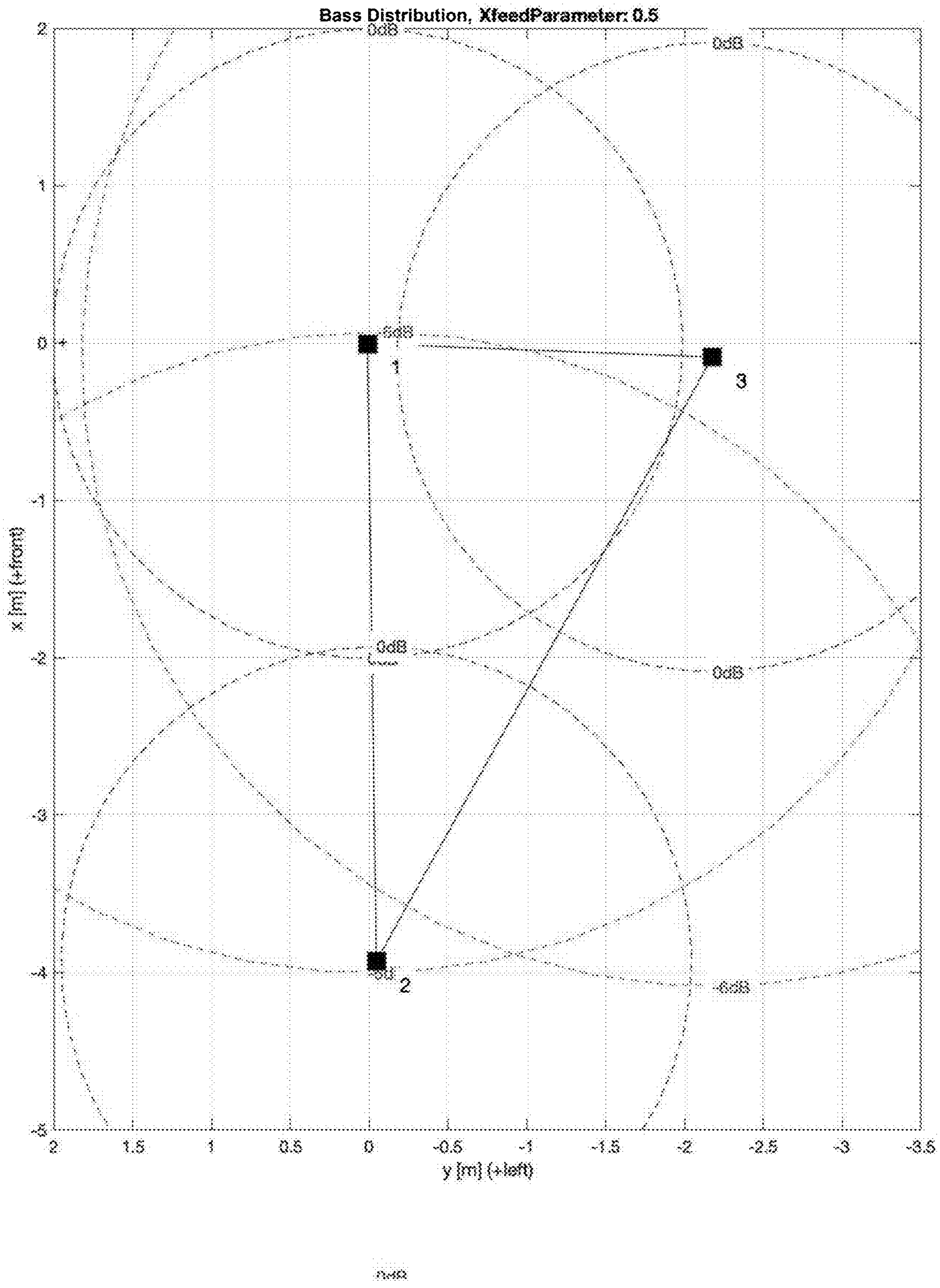
FIG. 22 illustrates a bass distribution with a crossfeed parameter of 0.5 in accordance with an embodiment of the invention.
Figure 23:
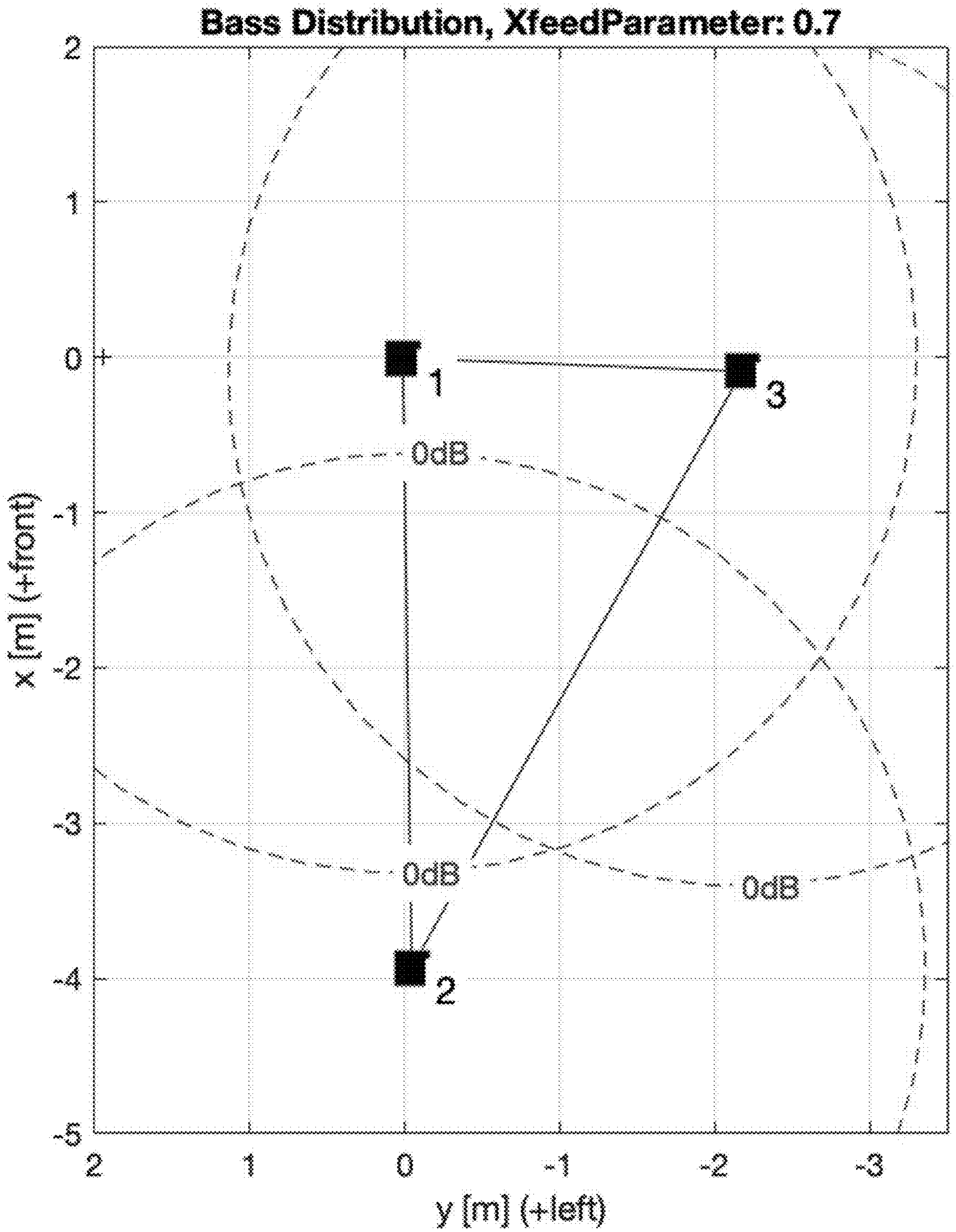
FIG. 23 illustrates a bass distribution with a crossfeed parameter of 0.7 in accordance with an embodiment of the invention.
Figure 24A:
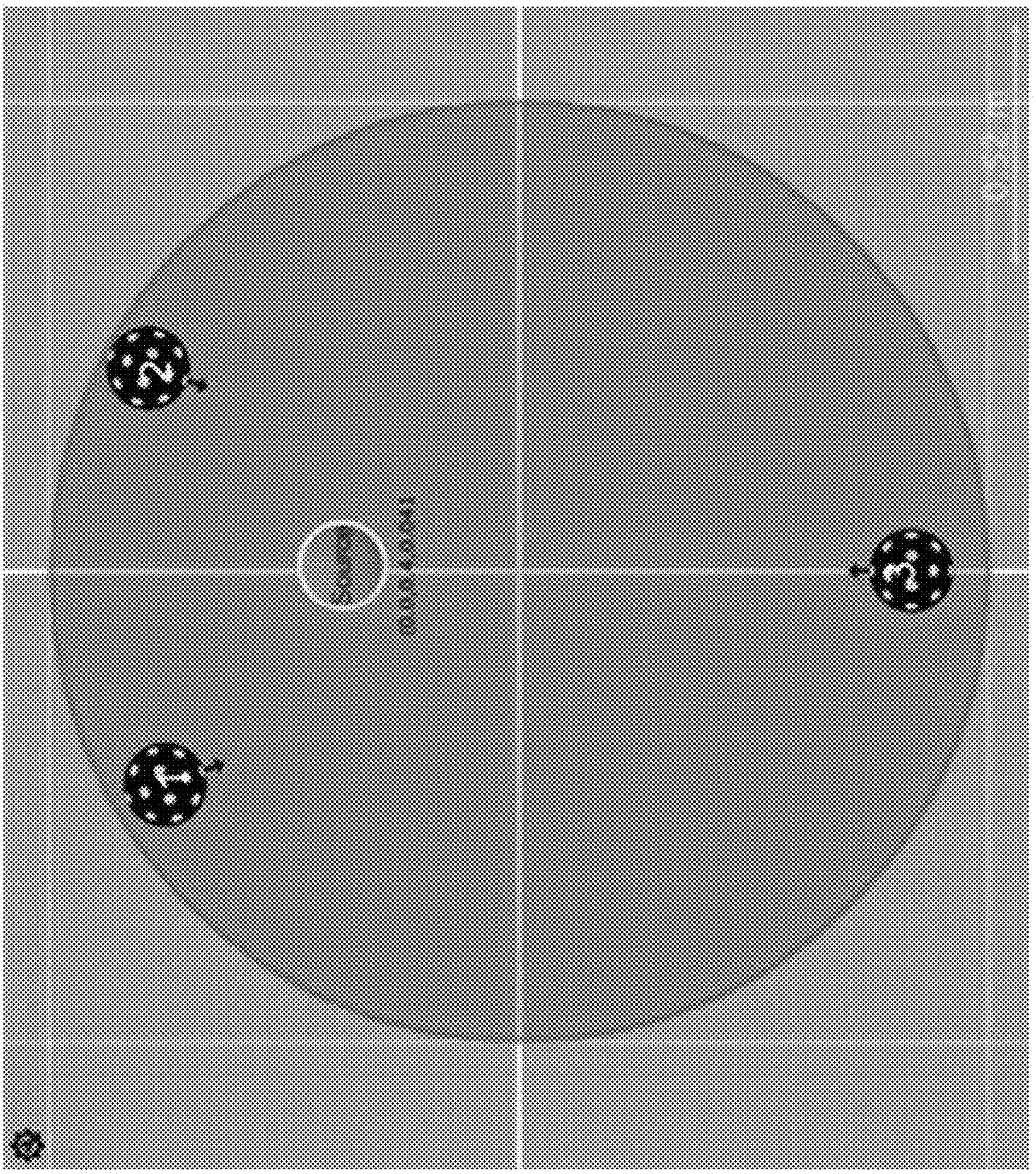
FIGS. 24A and 24B illustrate a first stereo spatial audio rendering in accordance with an embodiment of the invention.
Figure 24B:
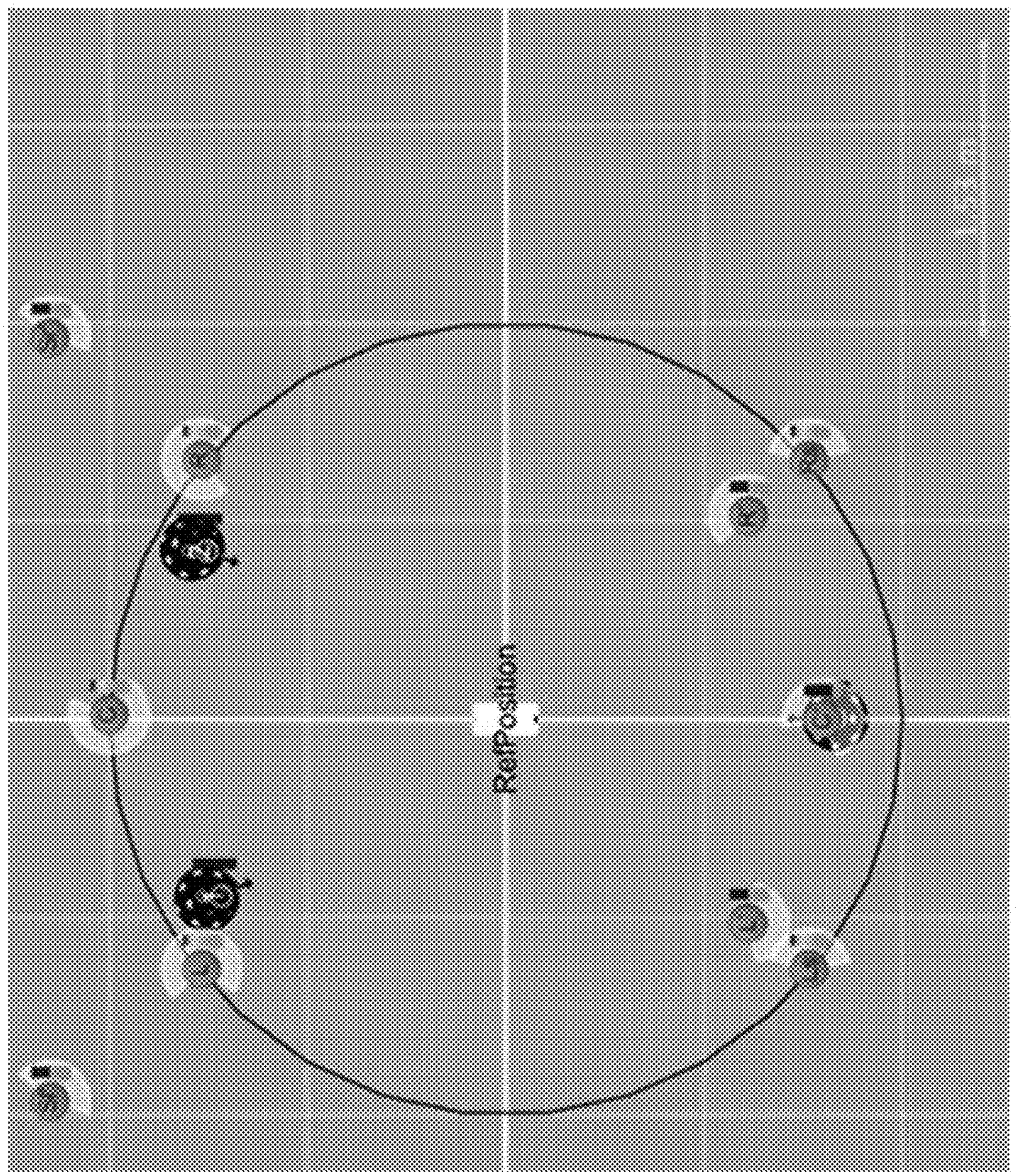
Figure 25A:
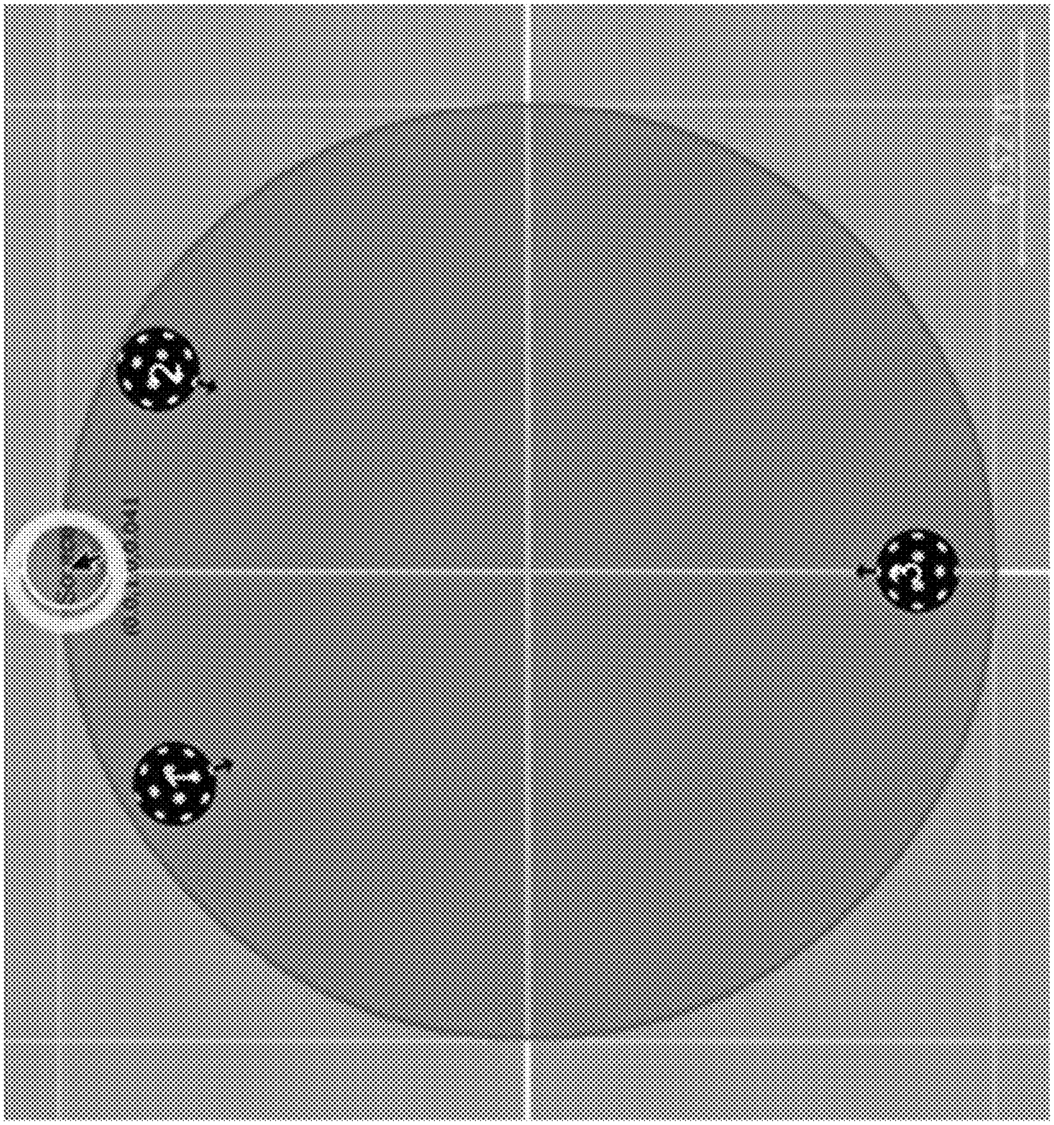
FIGS. 25A and 25B illustrate a second stereo spatial audio rendering in accordance with an embodiment of the invention.
Figure 25B:
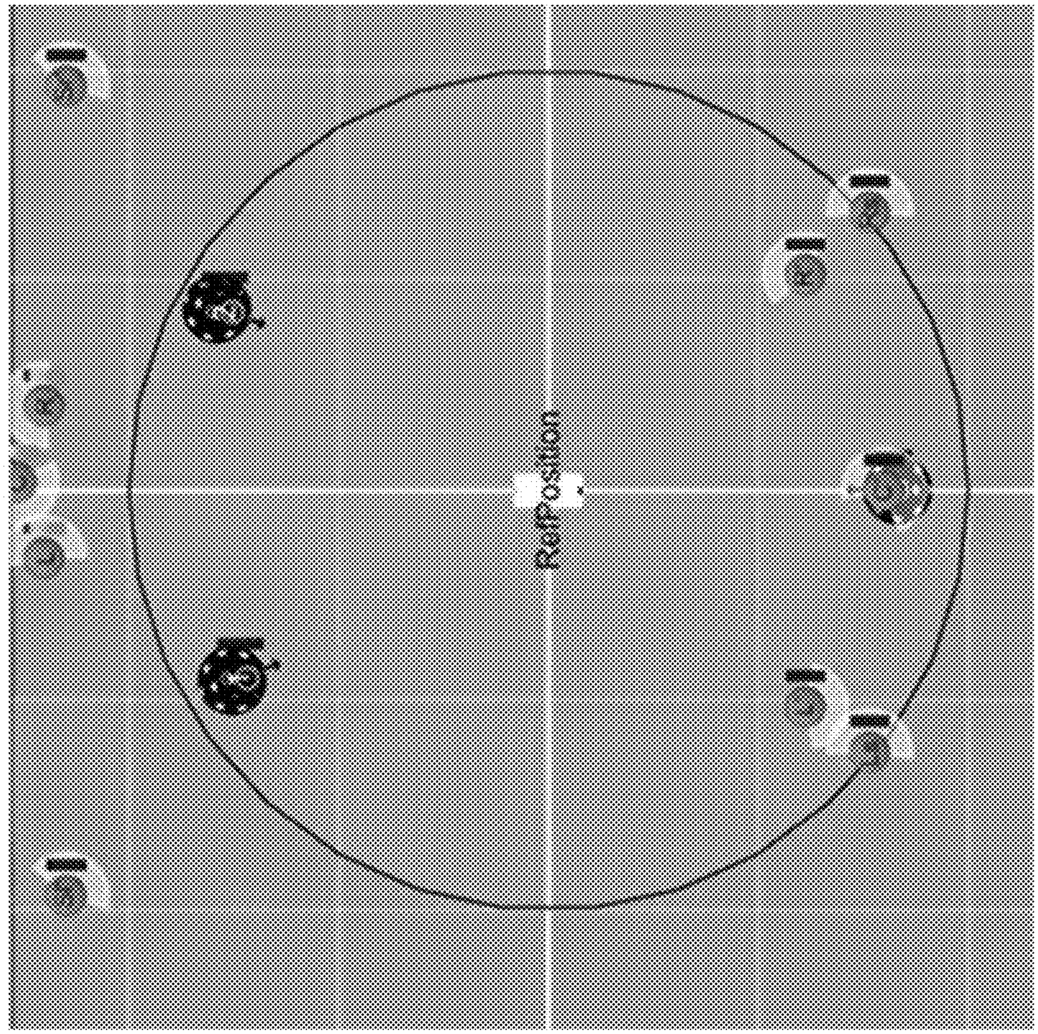
Figure 26A:
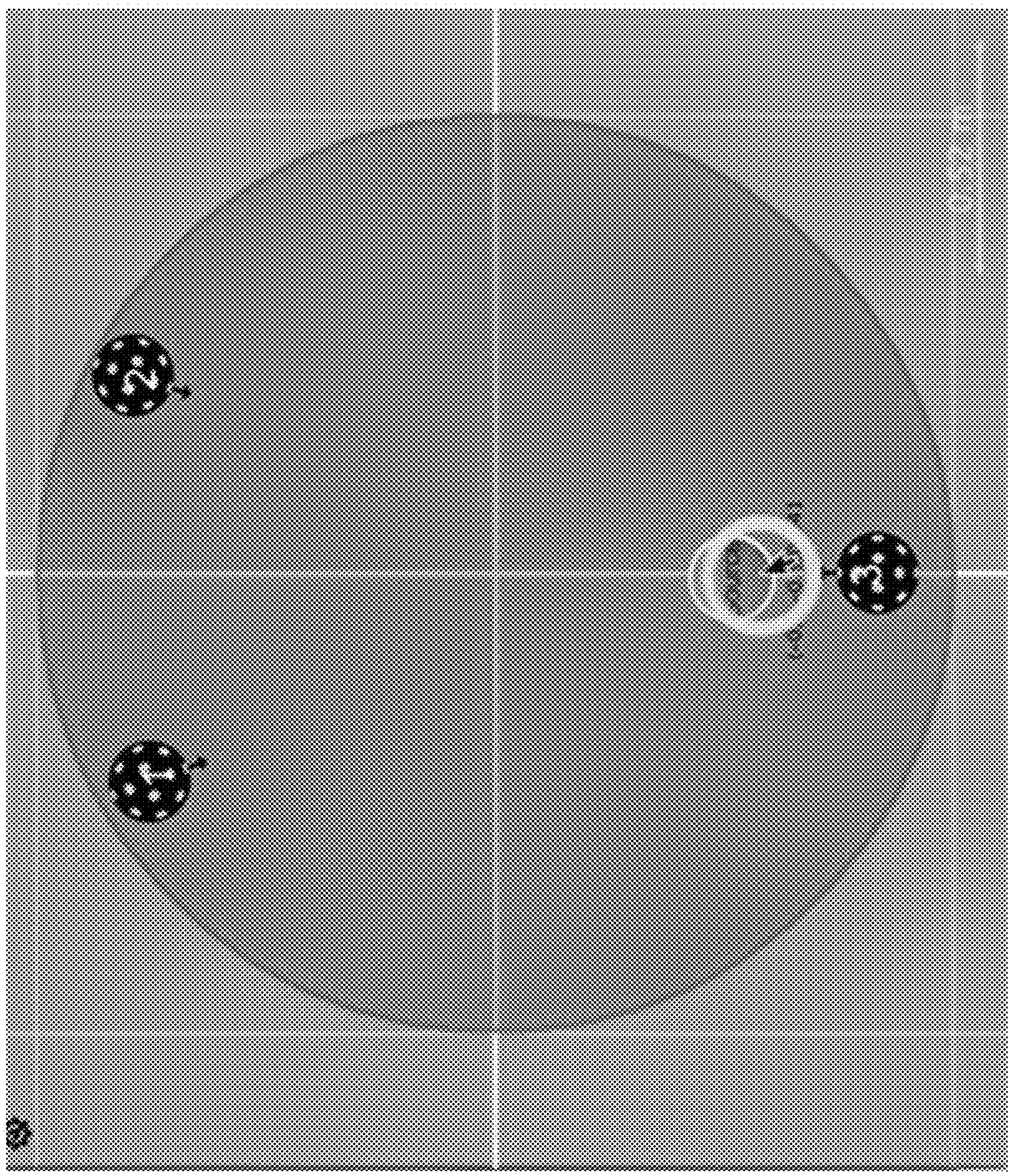
FIGS. 26A and 26B illustrate a third stereo spatial audio rendering in accordance with an embodiment of the invention.
Figure 26B:
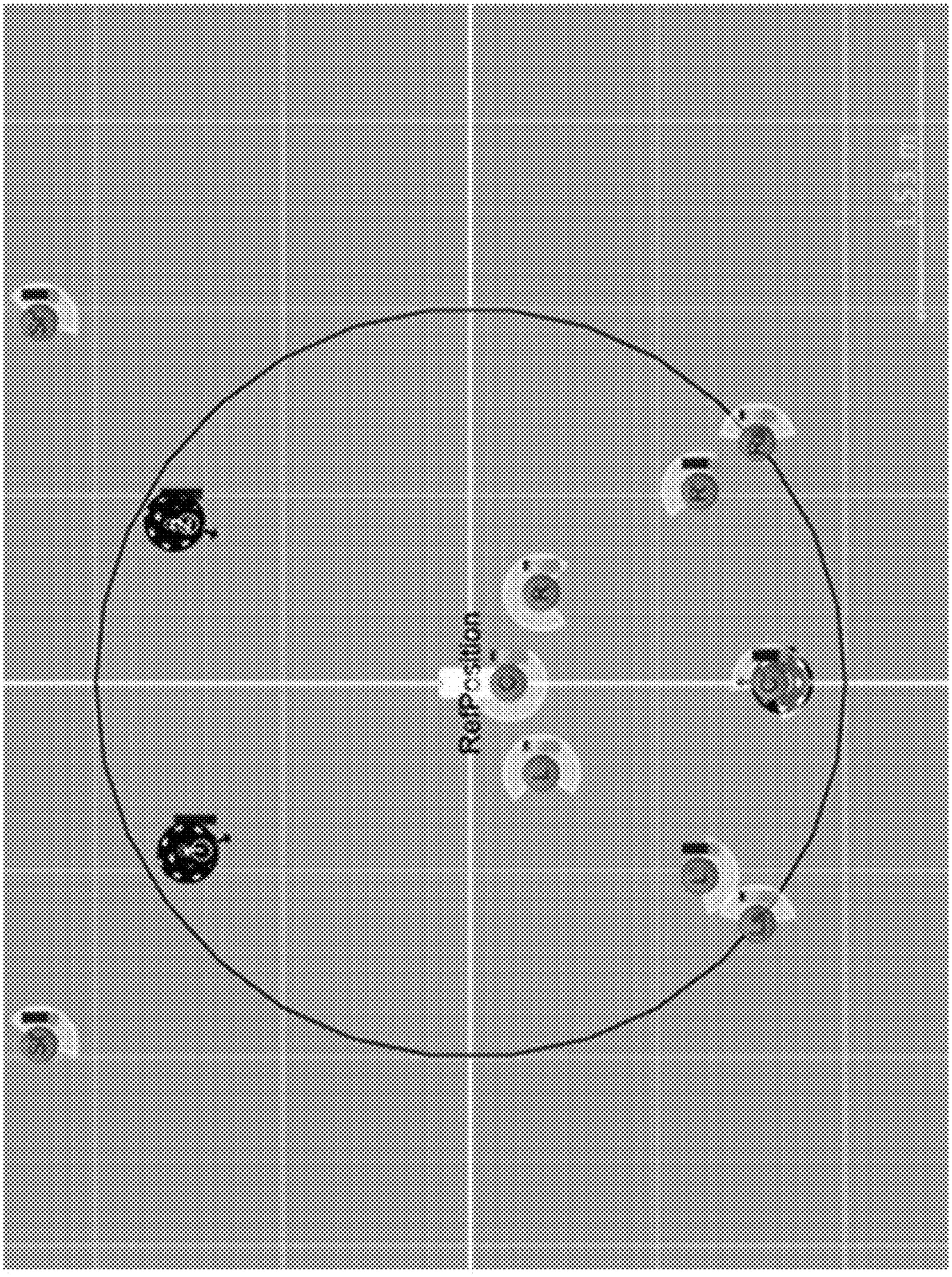

Turning now to FIG. 20, a process for utilizing a bass-crossfeed parameter in accordance with an embodiment of the invention is illustrated. Process 2000 includes selecting (2010) a bass-crossfeed parameter. In numerous embodiments, the bass-crossfeed parameter is preferential, and therefore can be set to taste. The distance between each cell is calculated (2020). In many embodiments, the distance between each cell can be found in a distance matrix generated during speaker placement estimation. For any value less than a reference distance in the distance matrix, it is replaced (2030) by the reference distance. In numerous embodiments, the reference distance is 2 meters, although it can be set to different distances depending on the specific cell audio capabilities and/or user preference. In numerous embodiments, the reference distance is based on the bass-crossfeed parameter, and may be anywhere from 0 to 10 meters, although more is viable depending on the setup and strength of the cells. In various embodiments, this prevents positive gains. The gain for each pair of cells in the matrix can then be calculated (2040) with an attenuation of 1/r. The gains are then normalized (2050) to follow a 4.5 dB panning law. While a specific process for using bass-crossfeed parameters is illustrated in FIG. 20, any number of different modifications can be made without departing from the scope or spirit of the invention. Examples of various attenuations for various bass-crossfeed parameter settings in accordance with embodiment of the invention are illustrated in FIGS. 21-23.

Applying Spatialization Shaders

Figure 27A:
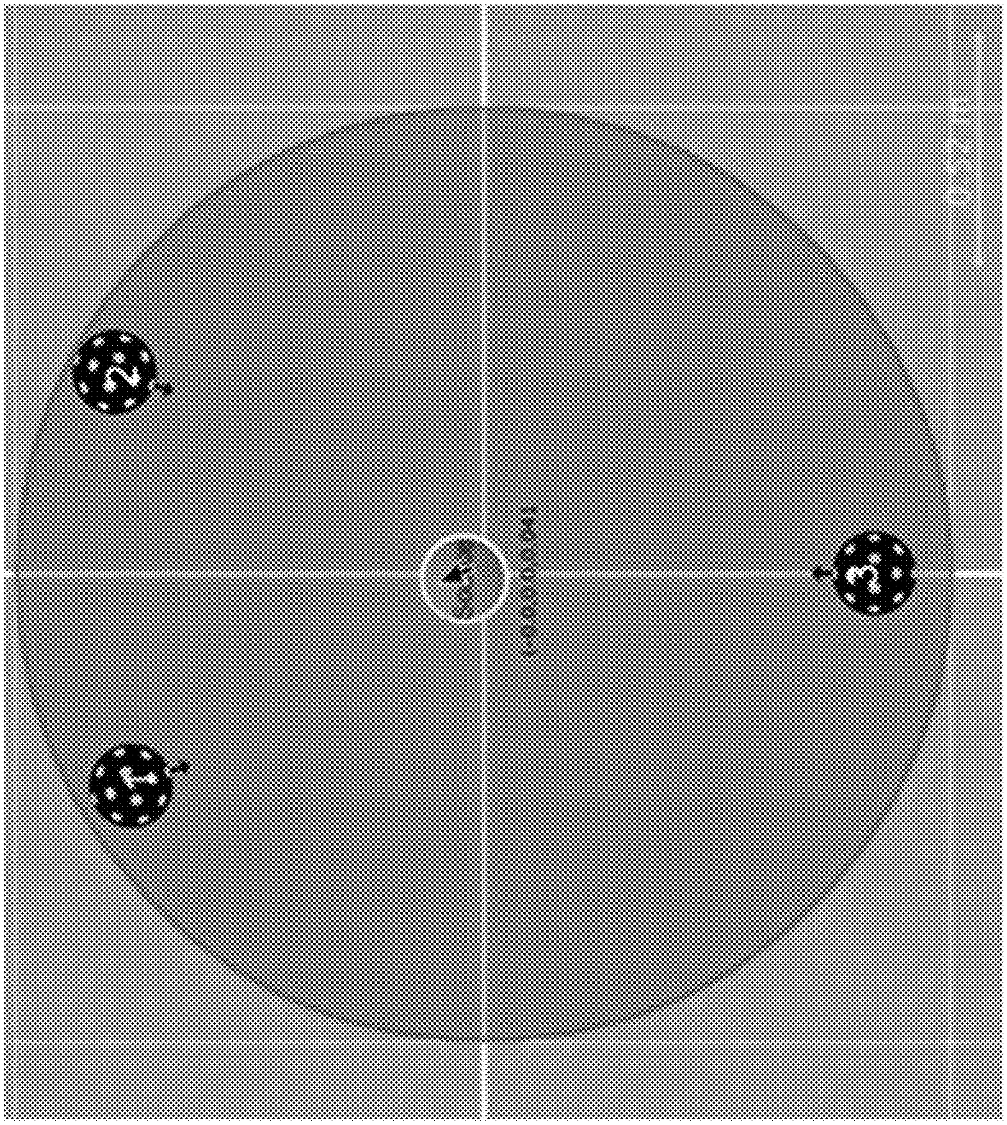
FIGS. 27A and 27B illustrate a first 5.1 channel spatial audio rendering in accordance with an embodiment of the invention.
Figure 27B:
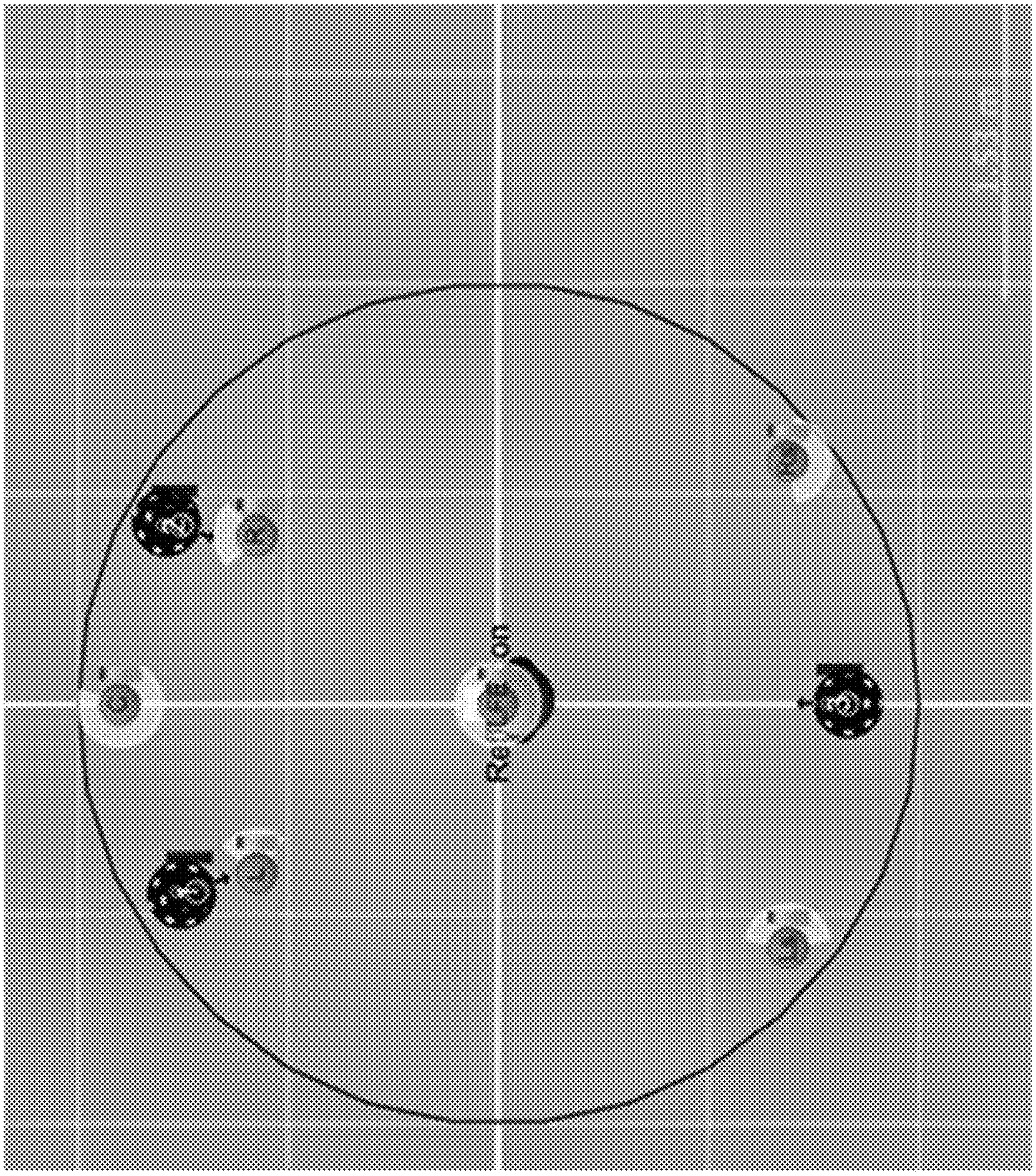
Figure 28A:
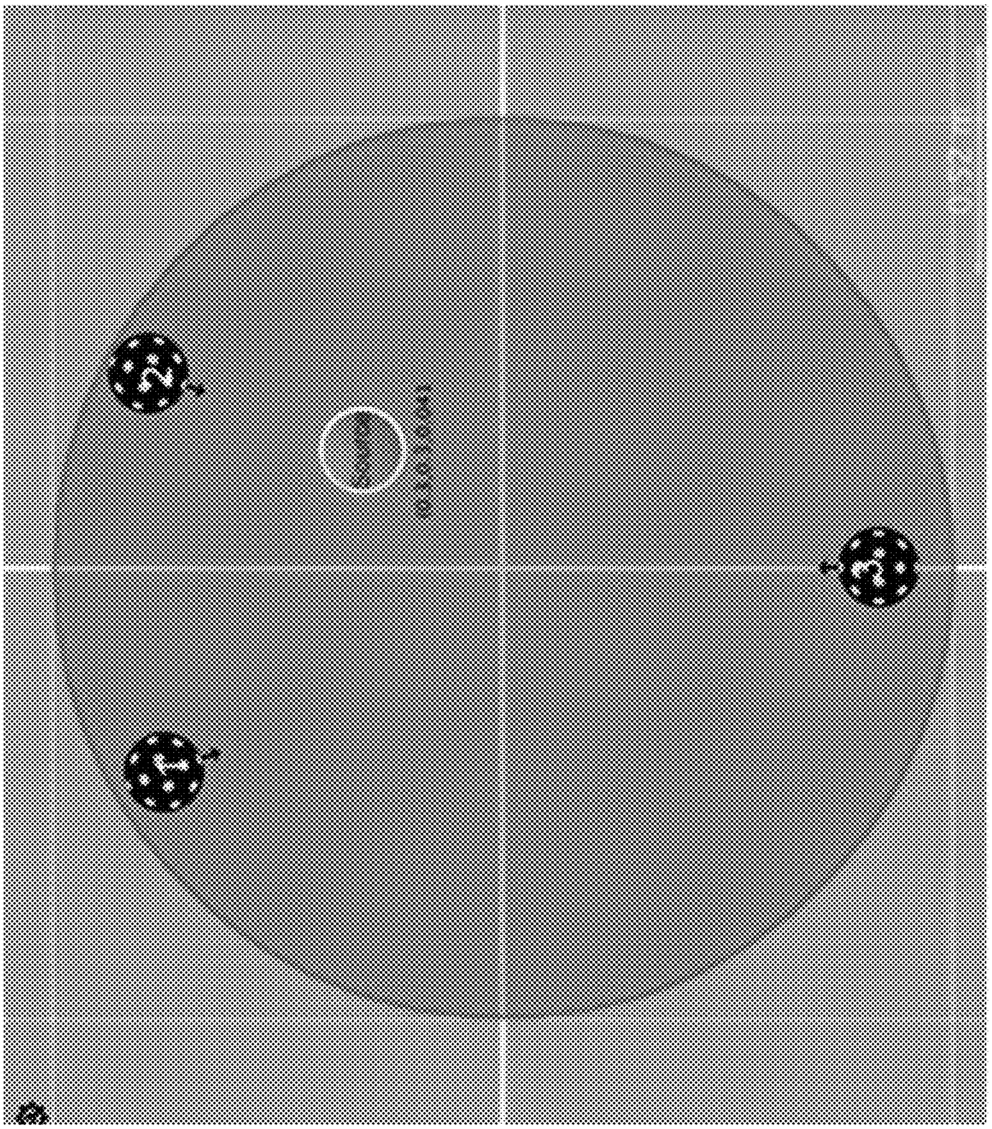
FIGS. 28A and 28B illustrate a second 5.1 channel spatial audio rendering in accordance with an embodiment of the invention.
Figure 28B:
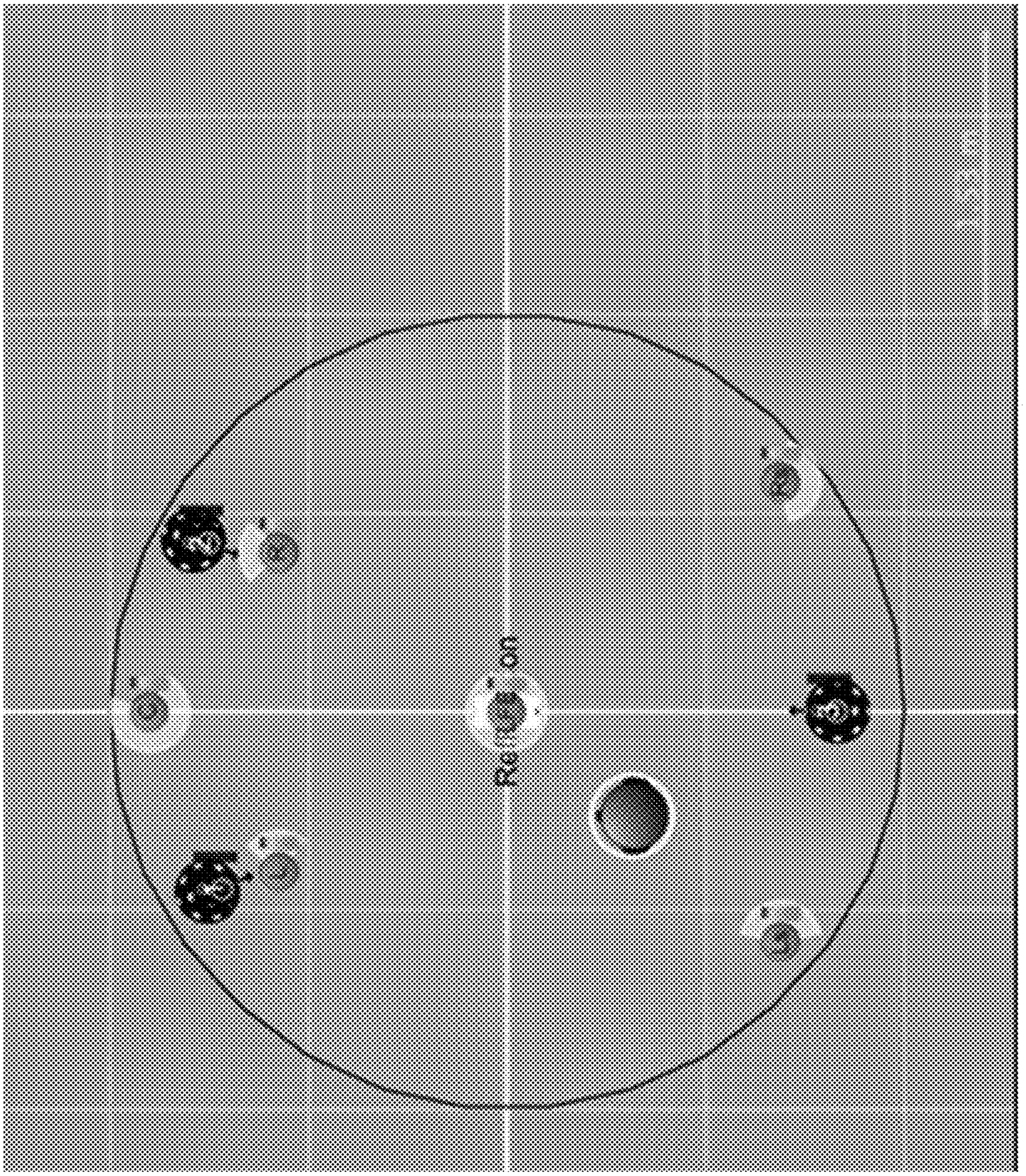

Spatialization shaders can use tuning parameters to place and parameterize audio objects from stems, which in turn can be used to render the desired spatial audio. In many embodiments, spatialization shaders are applied dynamically and can modify audio objects in near-real time based on changes made in the UI. In many embodiments, the spatialization shaders are differentially used depending on the audio source. For example, spatialization shaders may differentially calculate tuning parameters when provided 5.1 channel audio vs. stereo audio. Example puck positions and resulting audio objects for stereo upmixed to 10 channels parameterized by spatialization shaders in accordance with an embodiment of the invention are illustrated in FIGS. 24A-26B, where A figures illustrate the puck positions and B figures illustrate the audio objects. Similarly, FIGS. 27A-16B illustrate puck positions and resulting audio objects parameterized by spatialization shaders for a 5.1 channel audio input in accordance with an embodiment of the invention.

Spatial Audio Rendering

Spatial audio has traditionally been rendered with a static array of speakers located in prescribed locations. While, up to a point, more speakers in the array is conventionally thought of as "better," consumer grade systems have currently settled on 5.1 and 7.1 channel systems, which use 5 speakers, and 7 speakers, respectively in combination with one or more subwoofers. Currently, some media is supported in up to 22.2 (e.g. in Ultra HD Television as defined by the International Telecommunication Union). In order to play higher channel sound on fewer speakers, audio inputs are generally either downmixed to match the number of speakers present, or channels that do not match the speaker arrangement are merely dropped. An advantage to systems and methods described herein is the ability to create any number of audio objects based upon the number of channels used to encode the audio source. For example, an arrangement of three cells could generate the auditory sensation of the presence of a 5.1 speaker arrangement by placing five audio objects in the room, encoding the five audio objects into a spatial representation (e.g. an ambisonic representation such as (but not limited to) B-format), and then rendering a sound field using the three cells by decoding the spatial representation of the original 5.1 audio source in a manner appropriate to the number and placement of cells (see discussion below). In many embodiments, the bass channel can be mixed into the driver signals for each of the cells. Processes that treat channels as spatial audio objects are extensible to any arbitrary number of speakers and/or speaker arrangements. In this way, fewer physical speakers in the room can be utilized to achieve the effects of a higher number of speakers. Furthermore, cells need not be placed precisely in order to achieve this effect.

Conventional audio systems typically have what is often referred to as a "sweet spot" at which the listener should be situated. In numerous embodiments, the spatial audio system can use information regarding room acoustics to control the perceived ratio between direct and reverberant sound in a given space such that it sounds like a listener is surrounded by sound, regardless of where they are located within the space. While most rooms are very non-diffuse, spatial rendering methods can involve mapping a room and determining an appropriate sound field manipulation for rendering diffuse audio (see discussion below). Diffuse sound fields are typically characterized by sound arriving randomly from evenly distributed directions at evenly distributed delays.

In many embodiments, the spatial audio system maps a room. Cells can use any of a variety of methods for mapping a room, including, but not limited to, acoustic ranging, applying machine vision processes, and/or any other ranging method that enables 3D space mapping. Other devices can be utilized to create or augment these maps, such as smart phones or tablet PCs. The mapping can include: the location of cells in the space; wall, floor, and/or ceiling placements; furniture locations; and/or the location of any other objects in a space. In several embodiments, these maps can be used to generate speaker placement and/or orientation recommendations that can be tailored to the particular location. In some embodiments, these maps can be continuously updated with the location of listeners traversing the space and/or a history of the location(s) of listeners. As is discussed further below, many embodiments of the invention utilize virtual speaker layouts to render spatial audio. In several embodiments, information including (but not limited to) any of cell placement and/or orientation information, room acoustic information, user/object tracking information can be utilized to determine an origin location at which to encode a spatial representation (e.g. an ambisonic representation) of an audio source and a virtual speaker layout to use in the generation of driver inputs at individual cells. Various systems and methods for rending of spatial audio using spatial audio systems in accordance with certain embodiments of the invention are discussed further below.

Figure 30:
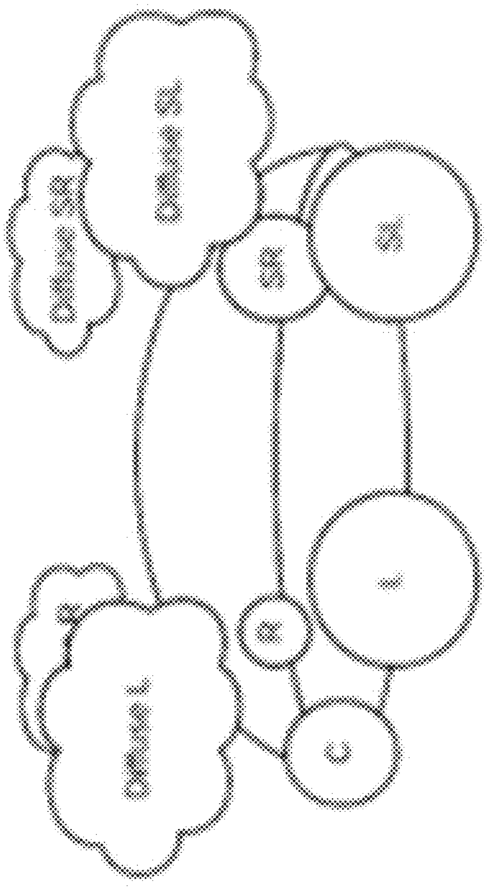
FIG. 30 conceptually illustrates placing audio objects relative to a virtual stage in accordance with an embodiment of the invention.
Figure 29:
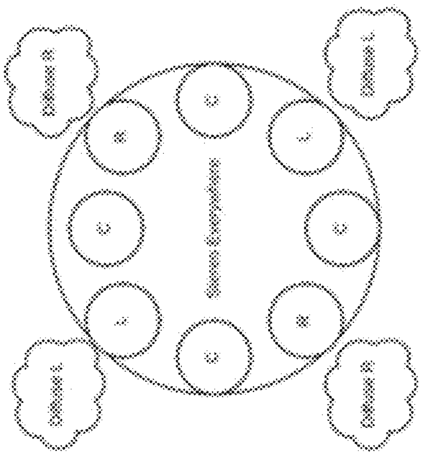
FIG. 29 conceptually illustrates audio objects in a space to create the sensation of stereo everywhere in accordance with an embodiment of the invention.
Figure 31:
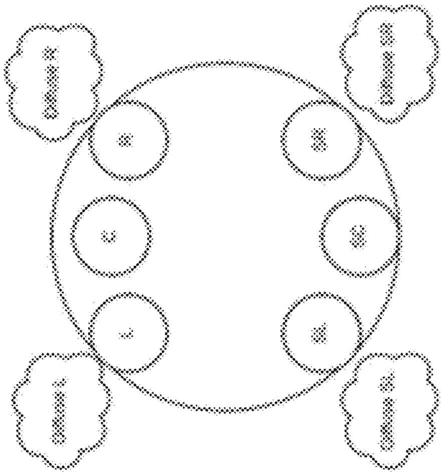
FIG. 31 conceptually illustrates placing audio objects in 3D space in accordance with an embodiment of the invention.

In a number of embodiments, upmixing can be utilized to create a number of audio objects that differs from the number of channels. In several embodiments, a stereo source containing two channels can be upmixed to create a number of left (L), center (C), and right (R) channels. In a number of embodiments, diffuse audio channels can also be generated via upmixing. Audio objects corresponding to the upmixed channels can then be placed relative to a space defined by a number of cells to create various effects including (but not limited to) the sensation of stereo everywhere within the space as conceptually illustrated in FIG. 29. In certain embodiments, upmixing can be utilized to place audio objects relative to a virtual stage as conceptually illustrated in FIG. 30. In a number of embodiments, audio objects can be placed in 3D as conceptually illustrated in FIG. 31. While specific examples of the placement objects are discussed with reference to FIGS. 29-31, any of a variety of audio objects (including audio objects obtained directly the spatial audio system that are not obtained via upmixing) can be placed in any of a variety of arbitrary 1D, 2D, and/or 3D configurations for the purposes of rendering spatial audio as appropriate to requirements of specific applications in accordance with various embodiments of the invention. The rendering of spatial audio from a variety of different audio sources is discussed further below. Furthermore, any of the audio object 2D or 3D layouts described above with reference to FIGS. 29-31 can be utilized in any of the processes for selecting and processing sources of audio within a spatial audio system described herein in accordance with various embodiments of the invention.

Cell Circuitry

Figure 32:
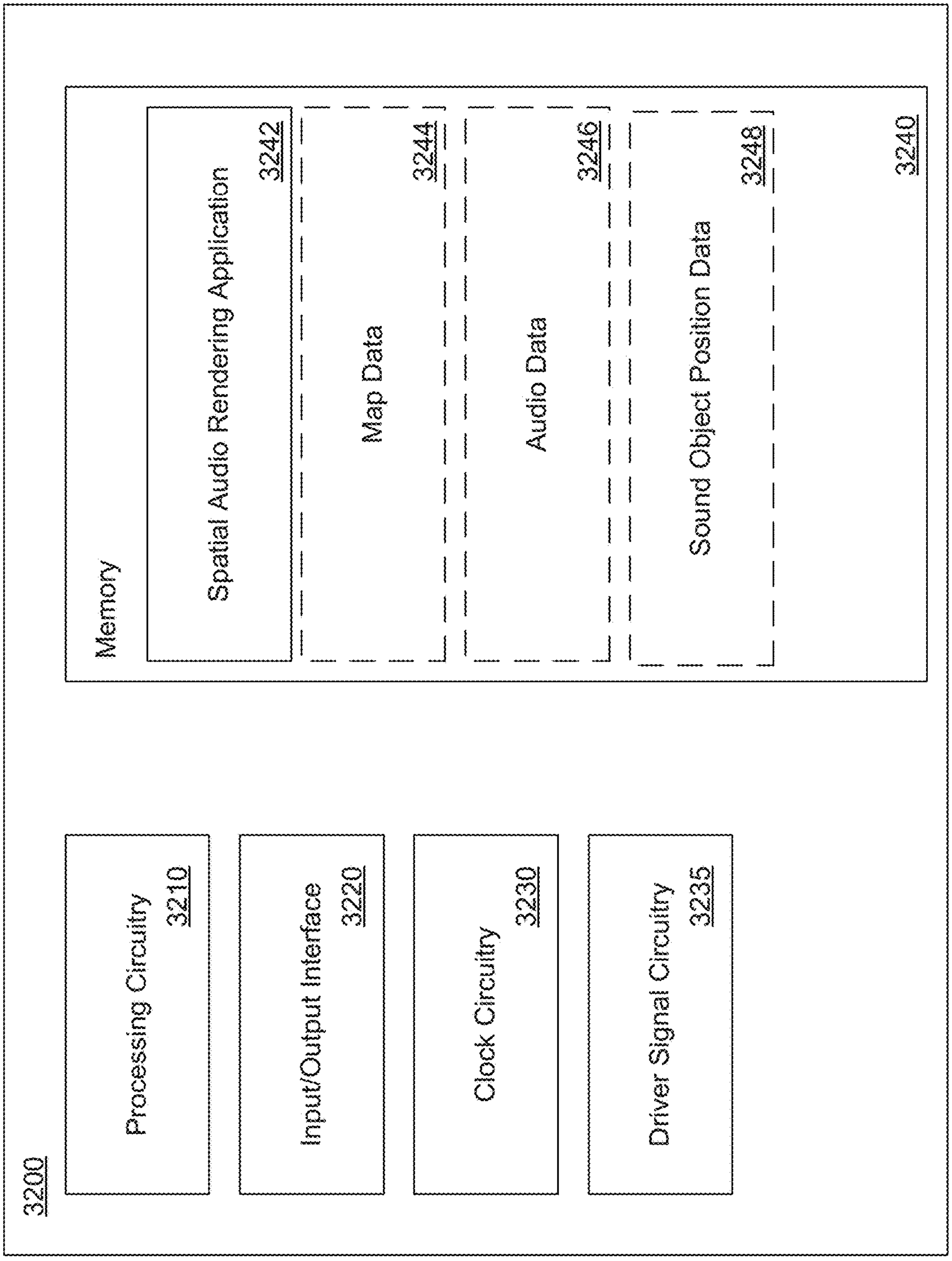
FIG. 32 is a block diagram illustrating cell circuitry in accordance with an embodiment of the invention.

Turning now to FIG. 32, a block diagram for cell circuitry in accordance with an embodiment of the invention is illustrated. Cell 3200 includes processing circuitry 3210. Processing circuitry can include any number of different logic processing circuits such as, but not limited to, processors, microprocessors, central processing units, parallel processing units, graphics processing units, application specific integrated circuits, field-programmable gate-arrays, and/or any other processing circuitry capable of performing spatial audio processes as appropriate to the requirements of specific applications in accordance with various embodiments of the invention.

Cell 3200 can further include an input/output (I/O) interface 3220. In many embodiments, the I/O interface includes a variety of different ports and can communicate using a variety of different methodologies. In numerous embodiments, the I/O interface includes a wireless networking device capable of establishing an ad hoc network and/or connecting to other wireless networking access points. In a variety of embodiments, the I/O interface has physical ports for establishing wired connections. However, I/O interfaces can include any number of different types of technologies capable of transferring data between devices. Cell 3200 further includes clock circuitry 3230. In many embodiments, the clock circuitry includes a quartz oscillator.

Cell 3200 can further include driver signal circuitry 3235. Driver signal circuitry is any circuitry capable of providing an audio signal to a driver in order to make the driver produce audio. In many embodiments, each driver has its own portion of the driver circuitry.

Cell 3200 can also include a memory 3240. Memory can be volatile memory, non-volatile memory, or a combination of volatile and non-volatile memory. Memory 3240 can store an audio player application such as (but not limited to) a spatial audio rendering application 3242. In numerous embodiments, spatial audio rendering applications can direct the processing circuitry to perform various spatial audio rendering tasks such as, but not limited to, those described herein. In numerous embodiments, the memory further includes map data 3244. Map data can describe the location of various cells within a space, the location of walls, floors, ceilings, and other barriers and/or objects in the space, and/or the placement of virtual speakers. In many embodiments, multiple sets of map data may be utilized in order to compartmentalize different pieces of information. In a variety of embodiments, the memory 3240 also includes audio data 3246. Audio data can include one or more pieces of audio content that can contain any number of different audio tracks and/or channels. In a variety of embodiments, audio data can include metadata describing the audio tracks such as, but not limited to, channel information, content information, genre information, track importance information, and/or any other metadata that can describe an audio track as appropriate to the requirements of specific applications in accordance with various embodiments of the invention. In many embodiments, audio tracks are mixed in accordance with an audio format. However, audio tracks can also represent individual, unmixed channels.

Memory can further include sound object position data 3248. Sound object position data describes the desired location of a sound object in the space. In some embodiments, sound objects are located at the position of each speaker in a conventional speaker arrangement ideal for the audio data. However, sound objects can be designated for any number of different audio tracks and/or channels and can be similarly located at any desired point.

Figure 33:
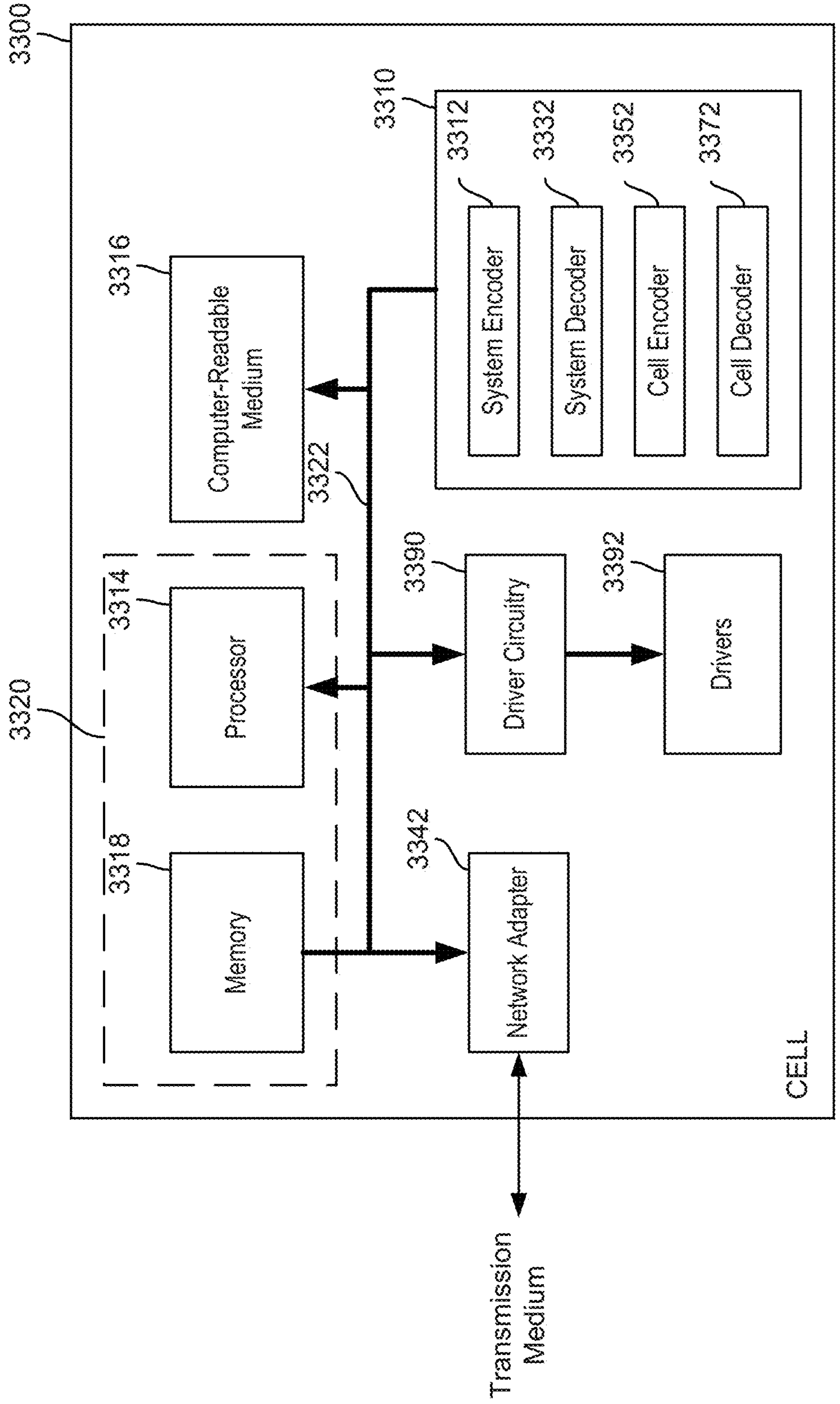
FIG. 33 illustrates an example hardware implementation of a cell in accordance with an embodiment of the invention.

FIG. 33 illustrates an example of a hardware implementation for an apparatus 3300 employing a processing system 3320 that may be used to implement a cell configured in accordance with various aspect of the disclosure for the system and architecture for spatial audio control and reproduction. In accordance with various aspects of the disclosure, an element, or any portion of an element, or any combination of elements in the apparatus 3300 that may be used to implement any device, including a cell, may utilize the spatial audio and approach described herein.

The apparatus 3300 may be used to implement a cell. The apparatus 3300 includes a set of spatial audio control and production modules 3310 that includes a system encoder 3312, a system decoder 3332, a cell encoder 3352, and a cell decoder 3372. The apparatus 3300 can also include a set of drivers 3392. The set of drivers 3392 may include one or more subsets of drivers that include one or more of different types of drivers. The drivers 3392 can be driven by driver circuitry 3390 that generates the electrical audio signals for each of the drivers. The driver circuitry 3390 may include any bandpass or crossover circuits that may divide audio signals for different types of drivers.

In various aspects of the disclosure, as illustrated by the apparatus 3300, each cell may include a system encoder and a system decoder such that system-level functionality and processing of related information may be distributed over the group of cells. This distributed architecture can also minimize the amount of data that needs to be transferred between each of the cells. In other implementations, each cell may only include a cell encoder and a cell decoder, but not a system encoder nor a system decoder. In various embodiments, secondary cells only utilize their cell encoder and cell decoder.

The processing system 3320 can include one or more processors illustrated as a processor 3314. Examples of processors 3314 can include (but is not limited to) microprocessors, microcontrollers, digital signal processors (DSPs), field programmable gate arrays (FPGAs), programmable logic devices (PLDs), state machines, gated logic, discrete hardware circuits, and/or other suitable hardware configured to perform the various functionality described throughout this disclosure.

The apparatus 3300 may be implemented as having a bus architecture, represented generally by a bus 3322. The bus 3322 may include any number of interconnecting buses and/or bridges depending on the specific application of the apparatus 3302 and overall design constraints. The bus 3322 can link together various circuits including the processing system 3320, which can include the one or more processors (represented generally by the processor 3314) and a memory 3318, and computer-readable media (represented generally by a computer-readable medium 3316). The bus 3322 may also link various other circuits such as timing sources, peripherals, voltage regulators, and/or power management circuits, which are well known in the art, and therefore, will not be described any further. A bus interface (not shown) can provide an interface between the bus 3322 and a network adapter 3342. The network adapter 3342 provides a means for communicating with various other apparatus over a transmission medium. Depending upon the nature of the apparatus, a user interface (e.g., keypad, display, speaker, microphone, joystick) may also be provided.

The processor 3314 is responsible for managing the bus 3322 and general processing, including execution of software that may be stored on the computer-readable medium 3316 or the memory 3318. The software, when executed by the processor 3314, can cause the apparatus 3300 to perform the various functions described herein for any particular apparatus. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 3316 or the memory 3318 may also be used for storing data that is manipulated by the processor 3314 when executing software. The computer-readable medium 3316 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. Although illustrated as residing in the apparatus 3300, the computer-readable medium 3316 may reside externally to the apparatus 3300, or be distributed across multiple entities including the apparatus 3300. The computer-readable medium 3316 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 34:
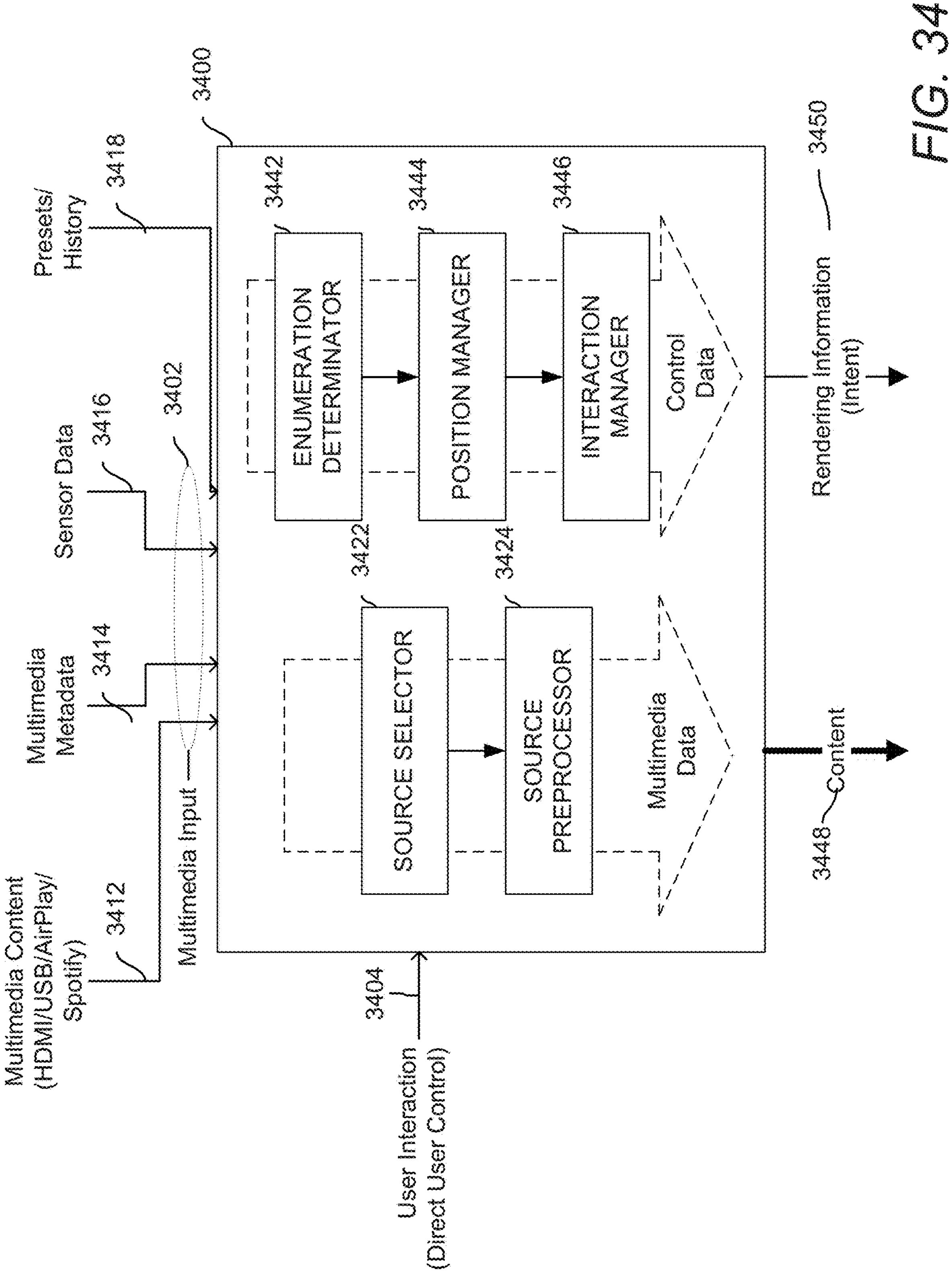
FIG. 34 illustrates a source manager in accordance with an embodiment of the invention.

FIG. 34 illustrates the source manager 3400 configured in accordance with various aspects of the disclosure that receives the multimedia input 3402. The multimedia input 3402 may include multimedia content 3412, multimedia metadata 3414, sensor data 3416, and/or preset/history information 3418. The source manager 3400 can also receive user interaction 3404 that may directly manage playback of the multimedia content 3412, including affecting selection of a source of multimedia content and managing rendering of that source of multimedia content. As further discussed herein, the multimedia content 3412, the multimedia metadata 3414, the sensor data 3416, and the preset/history information 3418 may be used by the source manager 3400 to generate and manage content 3448 and rendering information 3450.

The multimedia content 3412 and the multimedia metadata 3414 related thereto may be referred to herein as "multimedia data." The source manager 3400 includes a source selector 3422 and a source preprocessor 3424 that may be used by the source manager 3400 to select one or more sources in the multimedia data and perform any preprocessing to provide as the content 3448. The content 3448 is provided to the multimedia rendering engine along with the rendering information 3450 generated by the other components of the source manager 3400, as described herein.

The multimedia content 3412 and the multimedia metadata 3414 may be multimedia data from such sources as High-Definition Multimedia Interface (HDMI), Universal Serial Bus (USB), analog interfaces (phono/RCA plugs, stereo/headphone/headset plugs), as well as streaming sources using the Airplay protocol developed by Apple Inc. or the Chromecast protocol developed by Google. In general, these sources may provide sound information in a variety of content and formats, including channel-based sound information (e.g., Dolby Digital, Dolby Digital Plus, and Dolby Atmos, as developed by Dolby Laboratories, Inc.), discrete sound objects, sound fields, etc. Other multimedia data can include text-to-speech (TTS) or alarm sounds generated by a connected device or another module within the spatial multimedia reproduction system (not shown).

The source manager 3400 further includes an enumeration determinator 3442, a position manager 3444, and an interaction manager 3446. Together, these components can be used to generate the rendering information 3450 that is provided to the multimedia rendering engine. As further described herein, the sensor data 3416 and the preset/history information 3418, which may be referred to generally as "control data," may be used by these modules to affect playback of the multimedia content 3412 by providing the rendering information 3450 to the multimedia rendering engine. In one aspect of the disclosure, the rendering information 3450 contains telemetry and control information as to how the multimedia rendering engine should playback the multimedia in the content 3448. Thus, the rendering information 3450 may specifically direct how the multimedia rendering engine is to reproduce the content 3448 received from the source manager 3400. In other aspects of the disclosure, the multimedia rendering engine may make the ultimate determination as to how to render the content 3448.

The enumeration determinator module 3442 is responsible for determining the number of sources in the multimedia information included in the content 3448. This may include multiple channels from a single source, such as, for example, two channels from a stereo sound source, as well as TTS or alarm/alert sounds such as those that may be generated by the system. In one aspect of the disclosure, the number of channels in each content source is part of the determination of the number of sources to produce the enumeration information. The enumeration information may be used in determining the arrangement and mixing of the sources in the content 3448.

Figure 35:
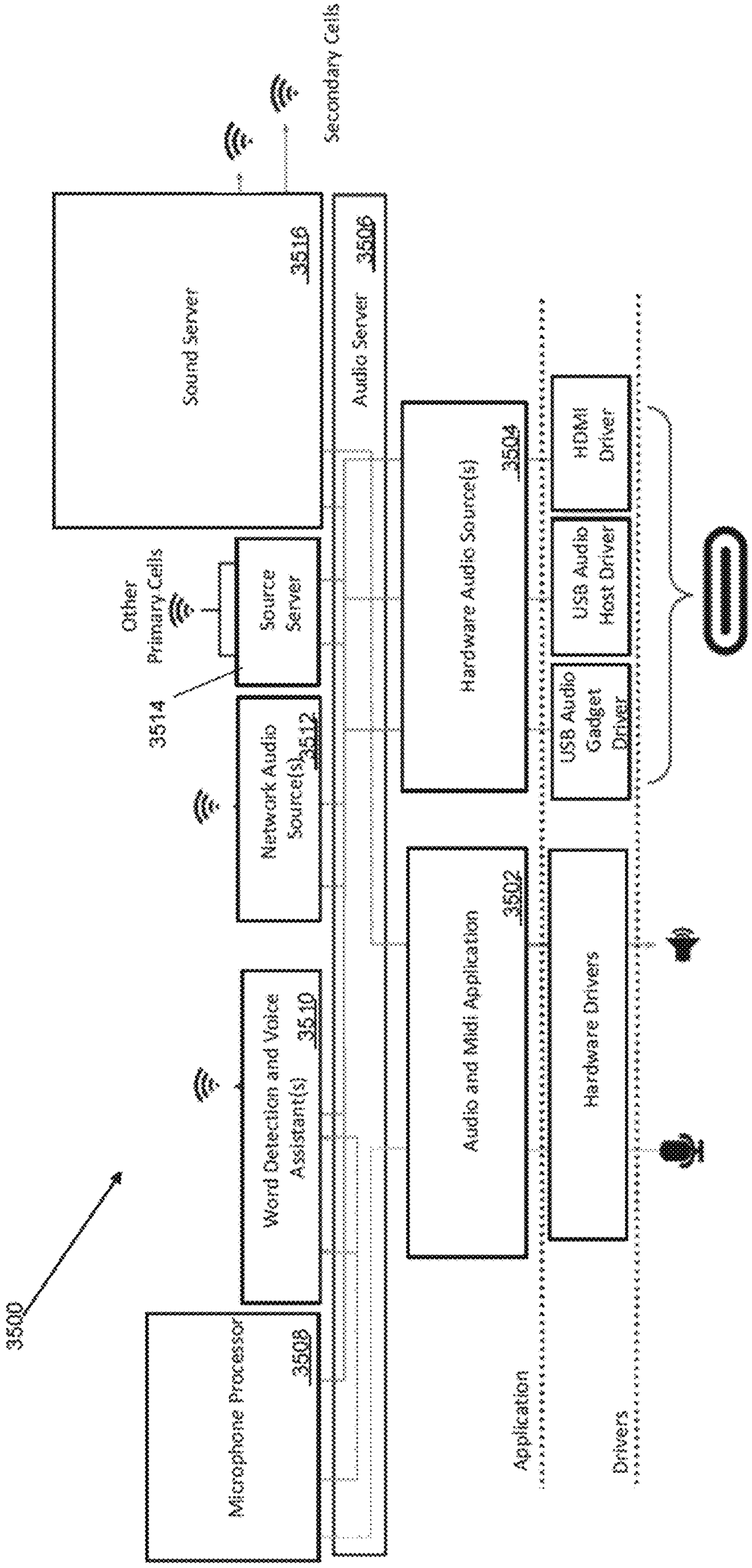
FIG. 35 conceptually illustrates software of a cell that can be configured to act as a primary cell or a secondary cell in accordance with an embodiment of the invention.

The position manager 3444 can manage the arrangement of reproduction of the sources in the multimedia information included in the content 3448 using a desired position of reproduction for each source. A desired position may be based on various factors, including the type of content being played, positional information of the user or an associated device, and historical/predicted position information. With reference to FIG. 35, the position manager 3544 may determine position information used for rendering multimedia sources based on information from a user voice input 3512, an object augmented reality (NR) input 3514, a UI position input 3516, and last/predicted position information associated for a particular input type 3518. The positional information may be generated in a position determination process using such approaches as a simultaneous localization and mapping (SLAM) algorithm. For example, the desired position for playback in a room may be based on a determination of a user's location in the room. This may include detecting the user voice 3512 or, alternatively, a received signal strength indicator (RSSI) of a user device (e.g., a user's smartphone).

The playback location may be based on the object A/R 3514, which may be information for an AR object in a particular rendering for a room. Thus, the playback position of a sound source may match the NR object. In addition, the system may determine where cells are using visual detection and, through a combination of scene detection and view of the NR object being rendered, the playback position may be adjusted accordingly.

The playback position of a sound source may be adjusted based on a user interacting with a user interface through the UI position input 3516. For example, the user may interact with an app that includes a visual representation of the room in which a sound object is to be reproduced as well as the sound object itself. The user may then move the visual representation of the sound object to position the playback of the sound object in the room. In numerous embodiments, the position of the sound object is moved relative to the position of a listener based on tracked listener movement. In numerous embodiments, listeners can be tracked using any of a variety of tracking methods including (but not limited to) ultrawideband (UWB) tracking, radio-frequency identification (RFID) tracking, and/other tracking and/or triangulation modality as appropriate to the requirements of specific applications of embodiments of the invention.

The location of playback may also be based on other factors such as the last playback location of a particular sound source or type of sound source 3518. In general, the playback location may be based on a prediction based on factors including (but not limited to) type of the content, time of day, and/or other heuristic information. For example, the position manager 3544 may initiate playback of an audio book in a bedroom because the user plays back the audio book at night, which is the typical time that the user plays the audio book. As another example, a timer or reminder alarm may be played back in the kitchen if the user requests a timer be set while the user is in the kitchen.

In general, the position information sources may be classified into active or passive sources. Active sources refer to positional informational sources provided by a user. These sources may include user location and object location. In contrast, passive sources are positional informational sources that are not actively specified by users but used by the position manager 3544 to predict playback position. These passive sources may include type of content, time of day, day of the week, and based on heuristic information. In addition, a priority level may be associated with each content source. For example, alarms and alerts may have a higher level of associated priority than other content sources, which may mean that these are played at higher volumes if they are being played in a position next to other content sources.

The desired playback location may be dynamically updated as the multimedia is reproduced by the multimedia rendering engine. For example, playback of music may "follow" a user around a room by the spatial multimedia reproduction system receiving updated positional information of the user or a device being carried by the user.

An interaction manager 3446 can manage how each of the different multimedia sources are to be reproduced based on their interaction with each other. In accordance with one aspect of the disclosure, playback of a multimedia source such as a sound source may paused, stopped, or reduced in volume (also referred as "ducked"). For example, where an alarm needs to be rendered during playback of an existing multimedia source, such as a song, an interaction manager may pause or duck the song while the alarm is being played.

Cells as a Platform

The components of a nested architecture of spatial encoders and spatial decoders can be implemented within individual cells within a spatial audio in a variety of ways. Software of a cell that can be configured act as a primary cell or a secondary cell within a spatial audio system in accordance with an embodiment of the invention is conceptually illustrated in FIG. 35. The cell 3500 includes a series of drivers including (but not limited to) hardware drivers, and interface connector drivers such as (but not limited to) USB and HDMI drivers. The drivers enable the software of the cell 3500 to capture audio signals using one or more microphones and to generate driver signals (e.g. using a digital to analog converter) for the one or more drivers in the cell. As can readily be appreciated, the specific drivers utilized by a cell are largely dependent upon the hardware of the cell.

In the illustrated embodiment, an audio and midi application D #402 is provided to manage information passing between various software processes executing on the processing system of the cell and the hardware drivers. In several embodiments, the audio and midi application is capable of decoding audio signals for rendering on the sets of drivers of the cell. Any of the processes described herein for decoding audio for rendering on a cell can be utilized by the audio and midi application including the processes discussed in detail below.

A hardware audio source processes 3504 manage communication with external sources via the interface connector drivers. The interface connector drivers can enable audio sources to be directly connected to the cell. Audio signals can be routed between the drivers and various software processes executing on the processing system of the cell using an audio server 3506.

As noted above, audio signals captured by microphones can be utilized for a variety of applications including (but not limited to) calibration, equalization, ranging, and/or voice command control. In the illustrated embodiment, audio signals from the microphone can be routed from the audio and midi application 3502 to a microphone processor 3508 using the audio server 3506. The microphone processor can perform functions associated with the manner in which the cell generates spatial audio such as (but not limited to) calibration, equalization, and/or ranging. In several embodiments, the microphone is utilized to capture voice commands and the microphone processor can process the microphone signals and provide them to word detection and/or voice assistant clients 3510. When command words are detected, the voice assistant clients 3510 can provide audio and/or audio commands to cloud services for additional processing. The voice assistant clients 3510 can also provide response from the voice assistant cloud services to the application software of the cell (e.g. mapping voice commands to controls of the cell). The application software of the cell can then implement the voice commands as appropriate to the specific voice command.

In several embodiments, the cell receives audio from a network audio source. In the illustrated embodiment, a network audio source process 3512 is provided to manage communication with one or more remote audio sources. The network audio source process can manage authentication, streaming, digital rights management, and/or any other processes that the cell is required to perform by a particular network audio source to receive and playback audio. As is discussed further below, the received audio can be forwarded to other cells using a source server process 3514 or provided to a sound server 3516.

The cell can forward a source to another cell using the source server 3514. The source can be (but is not limited to) an audio source directly connected to the cell via a connector, and/or a source obtained from a network audio source via the network audio source process 3512. Sources can be forwarded between a primary in a first group of cells and a primary in second group of cells to synchronize playback of the source between the two groups of cells. The cell can also receive one or more sources from another cell or a network connected source input device via the source server 3514.

The sound server 3516 can coordinate audio playback on the cell. When the cell is configured as a primary, the sound server 3516 can also coordinate audio playback on secondary cells. When the cell is configured as a primary, the source server 3516 can receive an audio source and process the audio source for rendering using the drivers on the cell. As can readily be appreciated any of a variety of spatial audio processing techniques can be utilized to process the audio source to obtain spatial audio objects and to render audio using the cell's drivers based upon the spatial audio objects. In a number of embodiments, the cell software implements a nested architecture similar to the various nested architectures described above in which the source audio is used to obtain spatial audio objects. The sound server 3516 can generate the appropriate source audio objects for a particular audio source and then spatially encode the spatial audio objects. In several embodiments, the audio sources can already be spatially encoded (e.g. encoded in an ambisonic format) and so the sound server 3516 need not perform spatial encoding. The sound server 3516 can decode spatial audio to a virtual speaker layout. The audio signals for the virtual speakers can then be used by the sound server to decode audio signals specific to the location of the cell and/or locations of cells within a group. In several embodiments, the process of obtaining audio signals for each cell involves spatially encoding the audio inputs of the virtual speakers based upon the location of the cell and/or other cells within a group of cells. The spatial audio for each cell can then be decoded into separate audio signals for each set of drivers included in the cell. In a number of embodiments, the audio signal for the cell can be provided to the audio and midi application 3502, which generates the individual driver inputs. Where the cell is primary cell within a group of cells, the sound server 3516 can transmit the audio signals for each of the secondary cells over the network. In many embodiments, the audio signals are transmitted via unicast. In several embodiments, some of the audio signals are unicast and at least one signal is multicast (e.g. a bass signal that is used for rendering by all cells within a group). In a number of embodiments, the sound server 3516 generates direct and diffuse audio signals that are utilized by the audio and midi application 3502 to generate inputs to the cell's drivers using the hardware drivers. Direct and diffuse signals can also be generated by the sound server 3516 and provided to secondary cells.

When the cell is a secondary cell, the sound server 3502 can receive an audio signals that were generated on a primary cell and provided to the cell via a network. The cell can route the received audio signals to the audio and midi application 3502, which generates the individual driver inputs in the same manner as if the audio signals had been generated by the cell itself.

Various potential implementations of sound servers can be utilized in cells similar to those described above with reference to FIG. 35 and/or in any of a variety of other types of cells that can be utilized within spatial audio systems in accordance with certain embodiments of the invention. A sound server software implementation that can be utilized in a cell within a spatial audio system in accordance with an embodiment of the invention is conceptually illustrated in FIG. 36. The sound server 3600 utilizes source graphs 3602 to process particular audio sources for input into appropriate spatial encoders 3604 as appropriate to the requirements of specific applications. In several embodiments, multiple sources can be mixed. In the illustrated embodiment, a mix engine 3606 mixes spatially encoded audio from each of the sources. The mixed spatially encoded audio is provided to at least a local decoder 3608, which decodes the spatially encoded audio into audio signals specific to the cell that can be utilized to render driver signals for the sets of drivers within the cell. The mixed spatially encoded audio signal can be provided to one or more secondary decoders 3610. Each secondary decoder is capable of decoding spatially encoded audio into audio signals specific to a particular secondary cell based upon on the location of the cell and/or the layout of the environment in which the group of cells is located. In this way, a primary cell can generate audio signals for each cell in a group of cells. In the illustrated embodiment, a secondary send process 3612 is utilized to transmit the audio signals via a network to the secondary cells.

The source graphs 3602 can be configured in a variety of different ways depending upon the nature of the audio. In several embodiments, the cell can receive sources that mono, stereo, any of a variety of multichannel surround sound formats, and/or audio encoded in accordance with an ambisonic format. Depending upon the encoding of the audio, the source graph can map an audio signal or an audio channel to an audio object. As discussed above, the received source can be upmixed and/or downmixed to create a number of audio objects that is different to the number of audio signals/audio channels provided by the audio source. When the audio is encoded in an ambisonic format, the source graph may be able to forward the audio source directly to the spatial encoder. In several embodiments, the ambisonic format may be incompatible with the spatial encoder and the audio source must be reencoded in an ambisonic format that is an appropriate input for the spatial encoder. As can readily be appreciated, an advantage of utilizing source graphs to process sources for input to a spatial encoder is that additional source graphs can be developed to support additional formats as appropriate to the requirements of specific applications.

Figure 36:
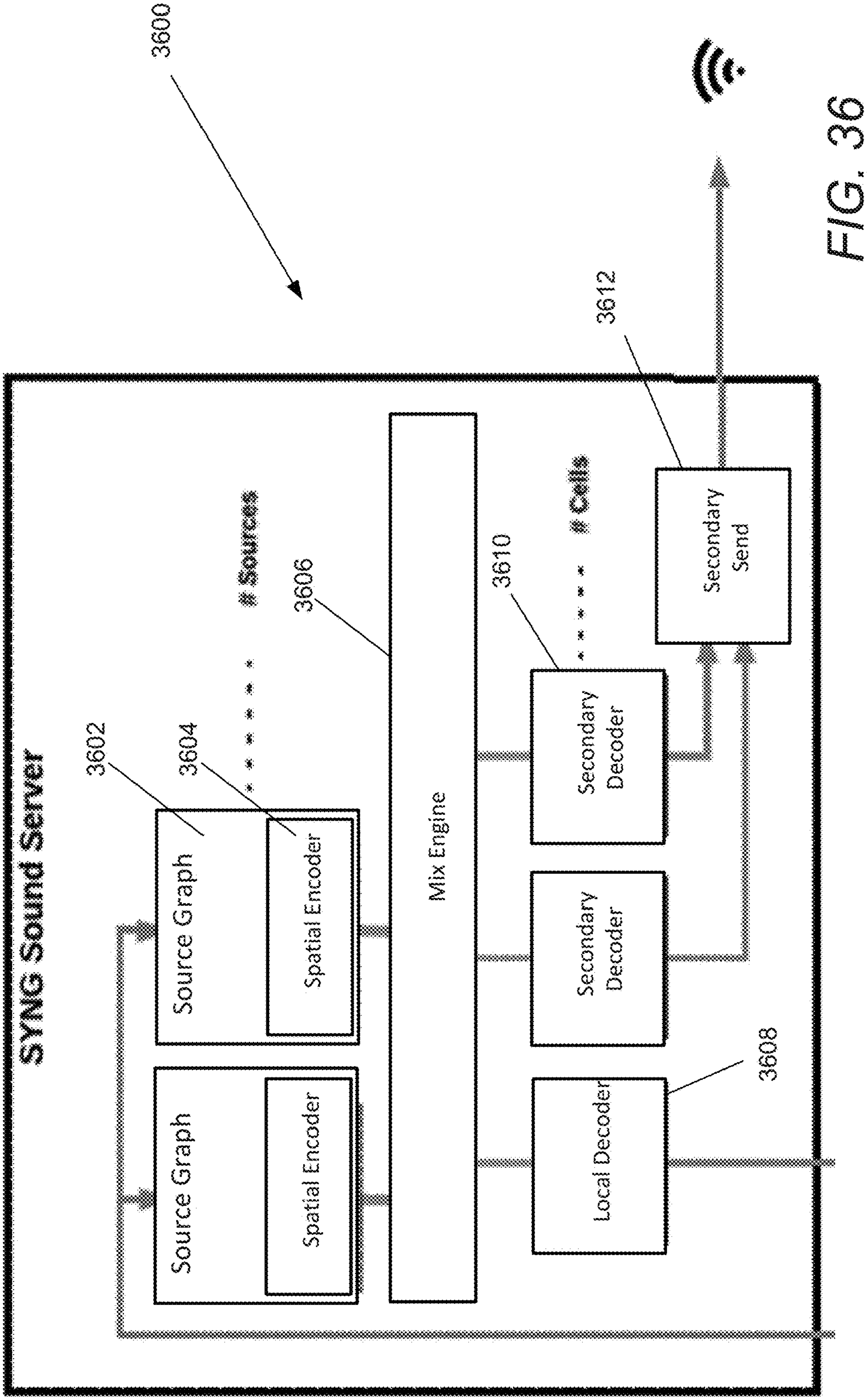
FIG. 36 conceptually illustrates a sound server software implementation in accordance with an embodiment of the invention.

A variety of spatial encoders can be utilized in sound servers similar to the sound server shown in FIG. 36. Furthermore, a specific cell may include a number of different spatial encoders that can be utilized based upon factors including (but limited to) any one or more of: the type of audio source, the number of cells, and/or the placement of cells. For example, the spatial encoding utilized can vary depending upon whether the cells are grouped in a configuration in which multiple cells are substantially on the same plane and in a second configuration when the group of cells also includes at least one cell mounted overhead (e.g. ceiling mounted).

Figure 37:
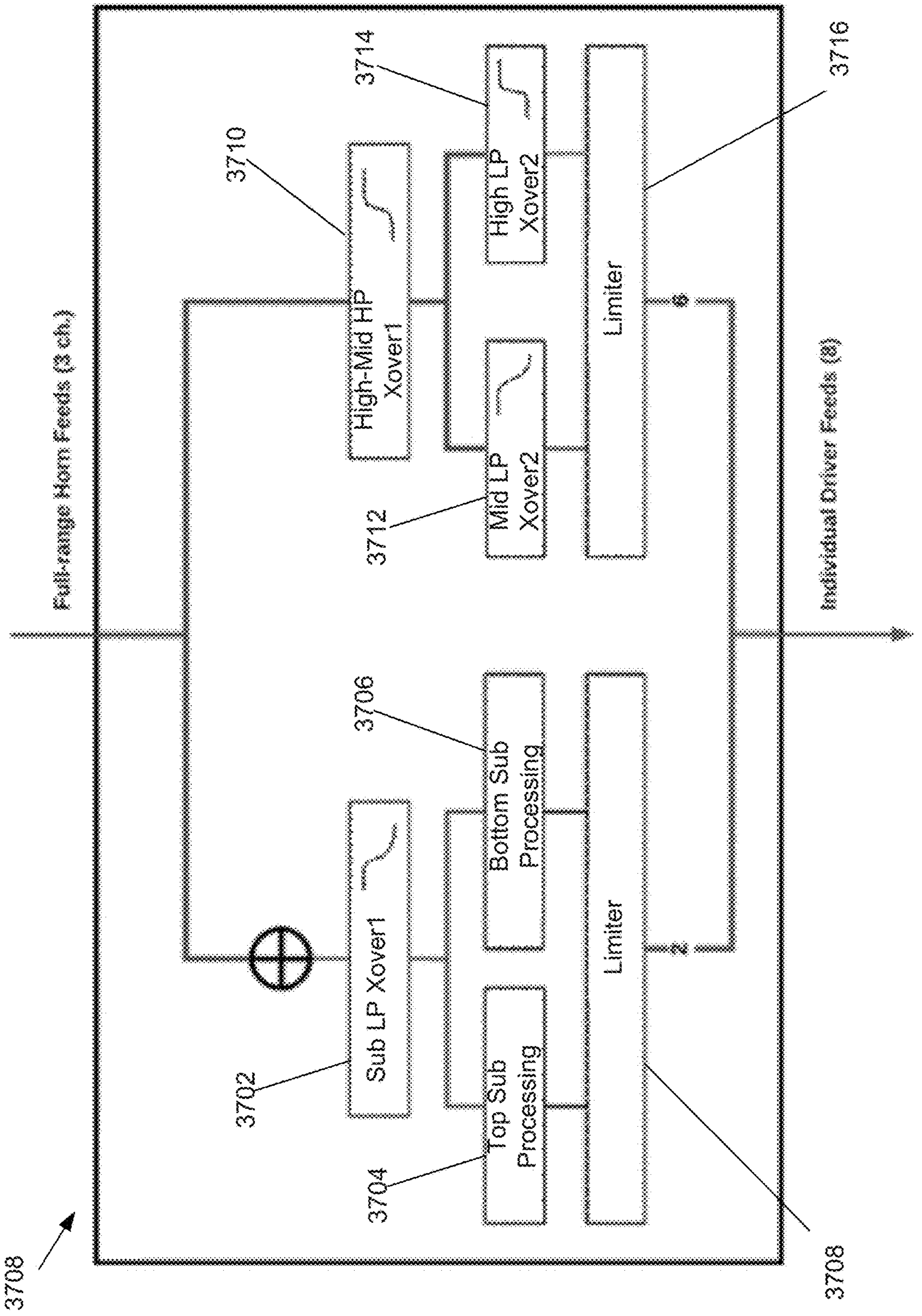
FIG. 37 is a graph showing generation of individual driver feeds based upon three audio signals corresponding to feeds for each of a set of three horns in accordance with an embodiment of the invention.

A graph for generating individual driver feeds based upon three audio signals corresponding to feeds for each of the set of drivers associated with each of the horns is illustrated in FIG. 37. In the illustrated embodiment, the graph 3700 generates drivers for each of the tweeters and mids (six total) and the two woofers. The bass portions of each of the three feed signals is combined and low pass filtered 3702 to produce a bass signal to drive the woofers. In the illustrated embodiment, sub-processing is separately performed 3704, 3706 for each of the top and bottom sub-woofers and the resulting signals are provided to a limiter 3708 to ensure that the resulting signals will not cause damage to the drivers. Each of the feed signals is separately processed with respect to the higher frequency portions of the signal. The mid-frequencies and the high frequencies are separated using a set of frequencies 3710, 3712, and 3714, and the signals are provided to limiters 3716 to generate the 6 driver signals for the mid and tweeter drivers in each of the three horns. While a specific graph is shown in FIG. 37, any of a variety of graphs can be utilized as appropriate to the specific drivers utilized within a cell based upon separate feed signals for each set of drivers. In a number of embodiments, a separate low frequency feed can be provided to the cell that is used to drive the sub-woofers. In certain embodiments, the same low frequency feed is provided to all cells within a group. As can readily be appreciated, the specific feeds and particular manner in which a cell implements a graph to generate driver feeds are largely dependent upon the requirements of specific applications in accordance with various embodiments of the invention.

While various nested architectures employing a variety of spatial audio encoding techniques are described above, any of a number of spatial audio reproduction processes including (but not limited to) distributed spatial audio reproduction processes and/or spatial audio reproduction processes that utilize virtual speaker layouts to determine the manner in which to render spatial audio can be utilized as appropriate to the requirements of different applications in accordance with various embodiments of the invention. Furthermore, a number of different spatial location metadata formats and components are described above. It should be readily appreciated that the spatial layout metadata generated and distributed within a spatial audio system is not in any way limited to specific pieces of data and/or specific formats. The components and/or encoding of spatial layout metadata largely is largely dependent upon the requirements of a given application. Accordingly, it should be appreciated that any of the above nested architectures and/or spatial encoding techniques can be utilized in combination and are not limited to specific combinations. Furthermore, specific techniques can be utilized in processes other than those specifically disclosed herein in accordance with certain embodiments of the invention.

Although specific methods for using spatialization shaders are discussed above, many different methods such as (but not limited to) those that use different tuning parameters, can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A spatial audio system, comprising:
 a plurality of loudspeakers capable of rendering spatial audio, where each loudspeaker comprises at least one driver;
 a processor; and
 a memory containing a spatial audio rendering application, where the spatial audio rendering application directs the processor to:
  obtain a plurality of audio stems;
  obtain a position and a rotation of each loudspeaker in the plurality of loudspeakers, where the position of three given loudspeakers in the plurality of loudspeakers form a scalene triangle;
  obtain a relative location for each audio stem to be rendered;
  calculate a plurality of tuning parameters for each of the three given loudspeakers in the plurality of loudspeakers, where the plurality of tuning parameters comprises a delay parameter and a gain parameter, and where to calculate the delay parameter and the gain parameter, the spatial audio rendering application directs the processor to:
   determine a position $d_{max}$ as the longest distance from a listener position to any of the three given loudspeakers;
   calculate the delay parameter for each of the three given loudspeakers as distance from the given loudspeaker to the listening position minus $d_{max}$, all divided by the speed of sound in air; and
   calculate the gain parameter for each of the three given loudspeakers as distance from the given loudspeaker to the listening position divided by $d_{max}$;
  provide the plurality of tuning parameters, the position and rotation of each loudspeaker to a spatialization shader;
  generate a driver feed for each driver in the plurality of loudspeakers using the spatialization shader; and
  render each audio stem at their respective location using the plurality of loudspeakers and the driver feeds.

2. The spatial audio system of claim 1, wherein the plurality of tuning parameters comprises a source focus parameter that defines energy distribution between loudspeakers in the plurality of loudspeakers and directivity behavior for each loudspeaker in the plurality of loudspeakers.

3. The spatial audio system of claim 1, wherein the plurality of tuning parameters comprises a bass-crossfeed parameter.

4. The spatial audio system of claim 1, wherein the spatial audio rendering application further directs the processor to:
 track a listener position; and
 move the location of each audio stem to maintain relative position to the tracked listener position.

5. The spatial audio system of claim 1, wherein the spatial audio rendering application further directs the processor to:
 regularize the loudspeaker positions in a virtual map;
 calculate a minimum bounding box for the regularized loudspeaker positions in the virtual map;
 denote the center of the minimum bounding box as a reference position, where the reference position reflects the centroid of a polygon defined by the positions of the loudspeakers; and
 use the reference position to translate the virtual space of a user interface to the location of the loudspeaker positions.

6. A method for spatial audio rendering, comprising:
 obtaining a plurality of audio stems;
 obtaining a position and a rotation for each loudspeaker in a plurality of loudspeakers, where each loudspeaker has at least one driver, and where the position of three given loudspeakers in the plurality of loudspeakers form a scalene triangle;
 obtaining a location for each audio stem is to be rendered;
  calculating a plurality of tuning parameters, the plurality of tuning parameters comprising a delay parameter and a gain parameter, for each of the three given loudspeakers in the plurality of loudspeakers by:
   determining a position $d_{max}$ as the longest distance from a listener position to any of the three given loudspeakers;
   calculating the delay parameter for each of the three given loudspeakers as distance from the given loudspeaker to the listening position minus $d_{max}$, all divided by the speed of sound in air; and
   calculating the gain parameter for each of the three given loudspeakers as distance from the given loudspeaker to the listening position divided by $d_{max}$;
 providing the plurality of tuning parameters, the position and rotation of each loudspeaker to a spatialization shader;
 generating a driver feed for each driver in the plurality of loudspeakers using the spatialization shader; and
 rendering each audio stem at their respective location using the plurality of loudspeakers and the driver feeds.

7. The method of spatial audio rendering of claim 6, wherein the plurality of tuning parameters comprises a source focus parameter that defines energy distribution between loudspeakers in the plurality of loudspeakers and directivity behavior for each loudspeaker in the plurality of loudspeakers.

8. The method of spatial audio rendering of claim 6, wherein the plurality of tuning parameters comprises a bass-crossfeed parameter.

9. The method of spatial audio rendering of claim 6, further comprising:
 tracking a listener position; and
 moving the location of each audio stem to maintain relative position to the tracked listener position.

10. The method of spatial audio rendering of claim 6, further comprising:

regularizing the loudspeaker positions in a virtual map;

calculating a minimum bounding box for the regularized loudspeaker positions in the virtual map;

denoting the center of the minimum bounding box as a reference position, where the reference position reflects the centroid of a polygon defined by the positions of the loudspeakers; and using the reference position to translate the virtual space of a user interface to the location of the loudspeaker positions.

11. A loudspeaker for spatial audio rendering, comprising:

at least one driver;

a processor; and a memory containing a spatial audio rendering application, where the spatial audio rendering application directs the processor to:

obtain a plurality of audio stems;

obtain a position and a rotation of each loudspeaker in a plurality of secondary loudspeakers communicatively coupled to the loudspeaker, where each secondary loudspeaker comprises at least one driver, and where the position of the loudspeaker and at least two given secondary loudspeakers in the plurality of secondary loudspeakers form a scalene triangle;

obtain a location for where each audio stem is to be rendered;

calculate a plurality of tuning parameters for each of the loudspeaker and the at least two given secondary loudspeakers in the plurality of secondary loudspeakers, where the plurality of tuning parameters comprises a delay parameter and a gain parameter, and where to calculate the delay parameter and the gain parameter, the spatial audio rendering application directs the processor to:

determine a position $d_{max}$ as the longest distance from a listener position to any of the at least two given secondary loudspeakers and the loudspeaker;

calculate the delay parameter for each of the at least two given secondary loudspeakers and the loudspeaker as distance from the loudspeaker or at least two given secondary loudspeakers, respectively to the listening position minus $d_{max}$, all divided by the speed of sound in air; and calculate a gain parameter for each of the at least two given secondary loudspeakers and the loudspeaker as distance from the loudspeaker or the at least two secondary loudspeakers, respectively to the listening position divided by $d_{max}$;

provide the plurality of tuning parameters, the position and rotation of each loudspeaker to a spatialization shader;

generate a driver feed for each driver in the plurality of loudspeakers using the spatialization shader;

transmit the driver feed to its respective driver; and render each audio stem at their respective location using the plurality of loudspeakers and the driver feeds.

12. The loudspeaker for spatial audio rendering of claim 11, wherein the plurality of tuning parameters comprises a source focus parameter that defines energy distribution between loudspeakers in the plurality of loudspeakers and directivity behavior for each loudspeaker in the plurality of loudspeakers.

13. The loudspeaker for spatial audio rendering of claim 11, wherein the spatial audio rendering application further directs the processor to:

track a listener position; and move the location of each audio stem to maintain relative position to the tracked listener position.

14. The loudspeaker for spatial audio rendering of claim 11, wherein the spatial audio rendering application further directs the processor to:

regularize the loudspeaker positions in a virtual map;

calculate a minimum bounding box for the regularized loudspeaker positions in the virtual map;

denote the center of the minimum bounding box as a reference position, where the reference position reflects the centroid of a polygon defined by the positions of the loudspeakers; and use the reference position to translate the virtual space of a user interface to the location of the loudspeaker positions.

* * * * *